(12) United States Patent
Tsujimoto

(10) Patent No.: US 7,436,532 B2
(45) Date of Patent: Oct. 14, 2008

(54) PRINT CONTROL APPARATUS, PRINT CONTROL METHOD, AND COMPUTER-EXECUTABLE PROGRAM

(75) Inventor: Takuya Tsujimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 970 days.

(21) Appl. No.: 10/412,419

(22) Filed: Apr. 14, 2003

(65) Prior Publication Data

US 2005/0111015 A1    May 26, 2005

(30) Foreign Application Priority Data

Apr. 16, 2002  (JP)  ............................. 2002-113336
Apr. 24, 2002  (JP)  ............................. 2002-122404

(51) Int. Cl.
*G06F 15/00*  (2006.01)
*G03G 15/00*  (2006.01)

(52) U.S. Cl. .......................................... 358/1.15; 399/1
(58) Field of Classification Search ................ 358/1.15, 358/1.13, 3.19; 702/27, 196; 399/1, 401; 271/65, 270
See application file for complete search history.

(56) References Cited

U.S. PATENT DOCUMENTS

| | | | |
|---|---|---|---|
| 5,467,434 A * | 11/1995 | Hower et al. ................ 358/1.15 |
| 5,633,670 A | 5/1997 | Kwak ........................... 347/188 |
| 6,606,107 B2 * | 8/2003 | Minowa et al. ............... 347/193 |
| 2002/0130942 A1 * | 9/2002 | Walker et al. ................ 347/105 |
| 2005/0084314 A1 * | 4/2005 | Anderson et al. ............ 400/625 |

FOREIGN PATENT DOCUMENTS

| | | |
|---|---|---|
| CN | 1106749 | 8/1995 |
| CN | 1059391 C | 12/2000 |
| JP | 3-67824 | 3/1991 |
| JP | 5-281874 | 1/1993 |
| JP | 6-15935 | 1/1994 |
| JP | 8-317198 | 11/1996 |
| JP | 11-10853 | 1/1999 |
| JP | 2000-25209 | 1/2000 |
| JP | 2001-58448 | 3/2001 |
| JP | 2001-78128 | 3/2001 |
| JP | 2002-86853 | 3/2002 |

* cited by examiner

*Primary Examiner*—Saeid Ebrahimi Dehkordy
(74) *Attorney, Agent, or Firm*—Fitzpatrick, Cella, Harper & Scinto

(57) ABSTRACT

A printer detects characteristics of a sheet before the sheet is conveyed and outputs sheet information to a PC. The PC specifies a type and the like of the sheet on the basis of the sheet information, decides print quality, and performs print setting. Print quality information selected by the user from a plurality of predetermined print quality is received. Whether a mismatch has occurred between the print quality information and the decided print quality or not is discriminated. If it is determined that no mismatch occurs, print data is formed.

18 Claims, 52 Drawing Sheets

FIG. 6

| MEDIA TYPE |
| --- |
| PLAIN PAPER |
| COATING PAPER |
| GLOSSY PAPER |
| GLOSSY FILM |
| OHP |
| CLOTH |
| TRANSFER PAPER |
| BPF |
| THICK PAPER |
| ENVELOPE |

FIG. 7

| MEDIA SIZE TYPE |
| --- |
| A3 |
| A4 |
| A4 LANDSCAPE |
| A5 |
| A5 LANDSCAPE |
| B4 |
| B5 |
| B5 LANDSCAPE |
| POSTCARD |
| POSTCARD LANDSCAPE |
| PHOTOCARD |
| LETTER |
| LETTER LANDSCAPE |
| LEGAL |
| LEGAL LANDSCAPE |
| USER DEFINITION |

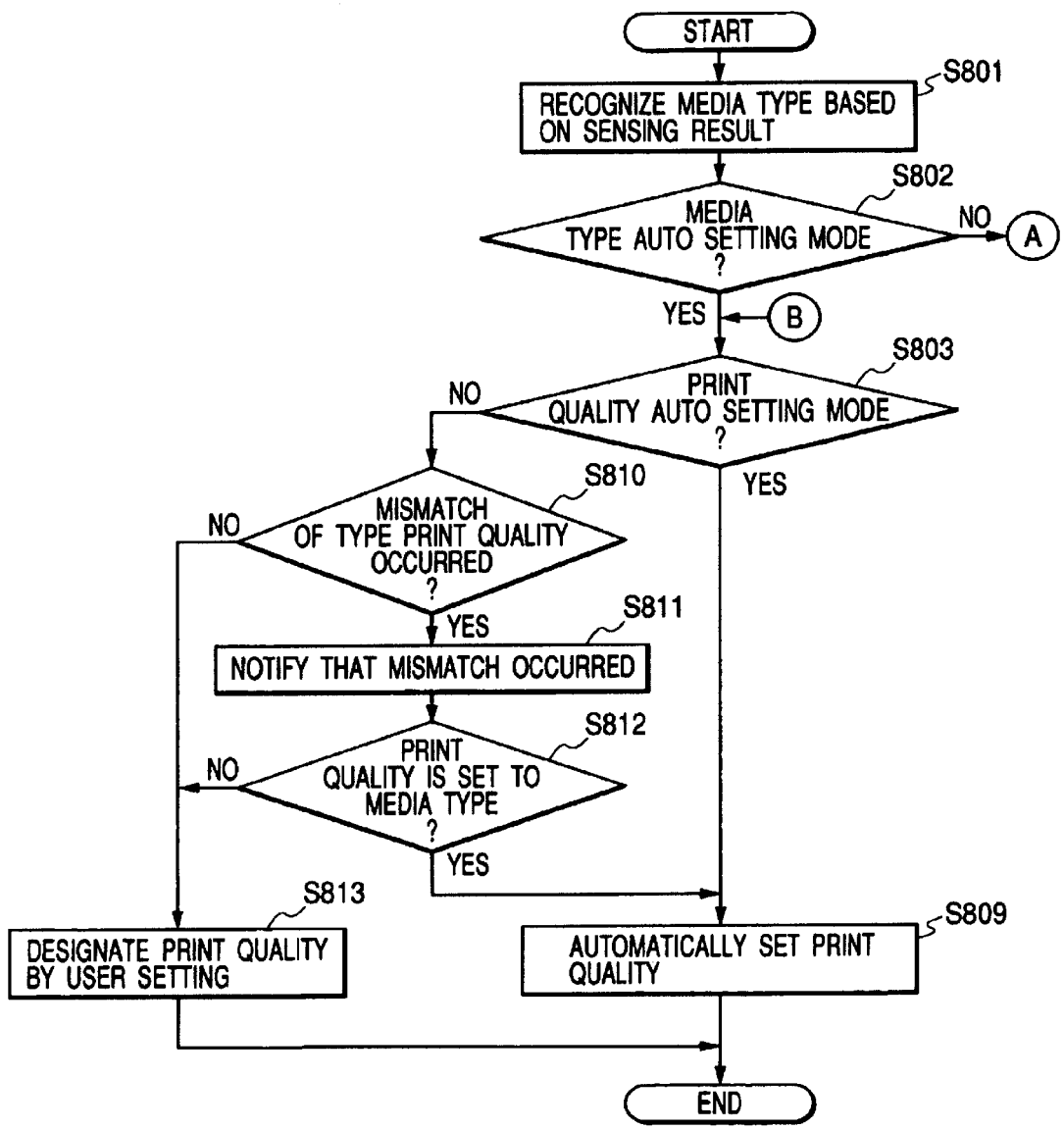

FIG. 9

| MEDIA TYPE | PRINT QUALITY | | |
|---|---|---|---|
| | HIGH QUALITY | STANDARD | HIGH SPEED |
| PLAIN PAPER, THICK PAPER | △ | ◎ | ○ |
| COATING PAPER | ◎ | ○ | × |
| GLOSSY PAPER | ◎ | ○ | × |
| GLOSSY FILM | ◎ | △ | × |
| OHP | × | ◎ | ○ |
| T-SHIRT TRANSFER PAPER, CLOTH | × | ◎ | × |

◎ : DEFAULT DESIGNATION △ : SETTING ATTENTION
○ : CAN BE SET × : CANNOT BE SET

FIG. 10

| MEDIA TYPE | PRINT QUALITY | | |
|---|---|---|---|
| | HIGH QUALITY | STANDARD | HIGH SPEED |
| PLAIN PAPER, THICK PAPER, OTHERS | △ | ◎ | ○ |
| COATING PAPER | ◎ | ○ | × |
| GLOSSY PAPER, GLOSSY FILM | ◎ | △ | × |
| OHP | × | ◎ | ○ |

◎ : DEFAULT DESIGNATION    △ : SETTING ATTENTION
○ : CAN BE SET             × : CANNOT BE SET

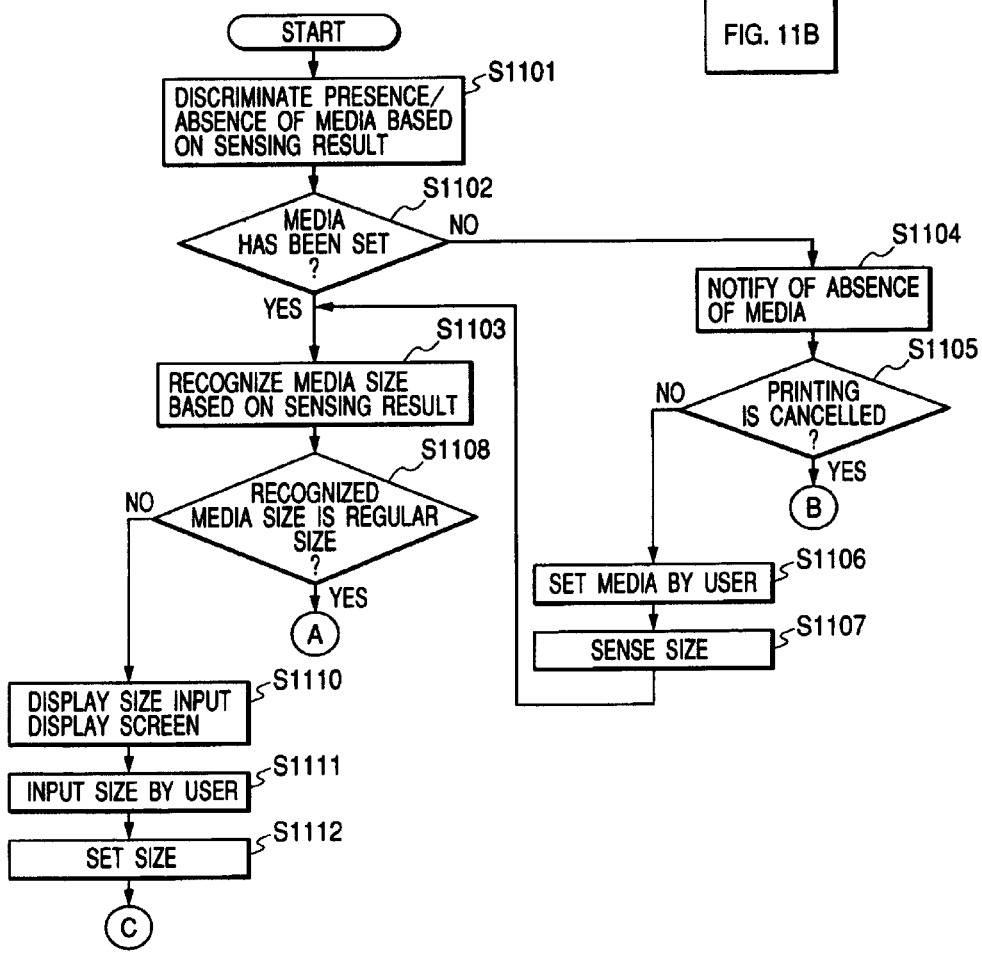

PRINT CONTROL APPARATUS, PRINT CONTROL METHOD, AND COMPUTER-EXECUTABLE PROGRAM

BACKGROUND OF THE INVENTION

1. Field of the Invention

The invention relates to a printing system in which a printer or an image forming apparatus is used as an output side. More particularly, the invention relates to a print control apparatus having a function such that information regarding a recording medium serving as a target of printing is obtained before the conveyance of a sheet and when a trouble occurs in creation of print data based on the obtained information,. print control, or print setting, the user is notified of its contents, a printing system, a print control method, a computer-readable program, and a recording medium in which such a program has been stored.

2. Related Background Art

Hitherto, generally, a printing system for forming a color image and obtaining printed matter at an office or in personal use has been constructed by: a printer which can output the color image; a host computer for controlling the printer and forming print data; and a communication interface for connecting both of them. Among color printers, an ink jet printer directly injects ink from a recording head onto a recording medium and has advantages such that its running costs are low, it is also suitable for color recording, the recording operation is quiet, and the like, so that such a printer is drawing attention and used in a wide market ranging from business to home use.

A large variety of sheets are selectively used in the ink jet printer in accordance with its application. There are: plain paper which is used in a copying apparatus or the like; coating paper whose surface has been coated with silica or the like in order to improve coloring by suppressing a blur of ink; glossy paper which is used to form a photograph-toned image such as a silver salt photograph; an OHP film for a transparent original; transfer paper to be iron-printed onto a T-shirt; a back print film; and the like. Further, there is a postcard for a New Year card as a type of coating paper which can be printed only by the ink jet printer. As mentioned above, a really large variety of sheets exist.

When those sheets are printed, the user previously selects or inputs a type and a size of a recording medium (sheet) serving as a print target as print settings on a printer driver and executes the proper printing onto the sheet on the basis of the settings.

A flow of processes of such a general ink jet printer will be described hereinbelow with reference to FIG. 37.

In step 3701, the user instructs a PC to make a print request. Generally, the print request is instructed by using a mouse or a keyboard. It can be instructed via an audio input device such as a microphone or the like.

In step 3702, the printer driver for managing the print settings or the like is activated. Actually, it is activated when a display screen is shifted from a print setting display screen displayed in response to the instruction of the print request to a display screen for performing a detail setting operation.

In step 3703, print set contents which have previously been set in the printer driver are displayed by using a display apparatus such as a monitor or the like.

In step 3704, when the user wants to obtain a status of the printer, he instructs to make a status request. It is not always necessary to make the status request.

In step 3705, when the status obtaining request is actually instructed in step 3704, the status request is made to the printer.

In step 3706, when the status request is made in step 3705, various status information showing the presence or absence of sheets, a residual amount of ink, a state of the communication interface between the PC and the printer, and the like is returned to the PC.

In step 3707, when the user requests obtainment of the status information, its contents are displayed onto the monitor or the like.

In step 3708, the status information which is displayed in step 3707 and the preset print settings which are displayed in step 3703 are confirmed and, if they are changed, a change instruction is given.

In step 3709, when there is the change instruction in step 3708, update information of the print setting to which changed contents have been reflected is displayed onto the monitor or the like. The user can repeat the processes in steps 3708 and 3709 and execute desired setting if he wants to.

In step 3710, the user instructs to start the printing. Thus, the actual printing operation is started. If the printing is directly started without displaying the detail setting display screen of the printing from an application which is being operated on the PC, the process is started from this step.

In step 3711, the printer driver on the PC receives the print start instruction and forms print data corresponding to the print setting. Specifically speaking, various image processes such as color conversion, binarization, and the like, command creation for printer control, and the like are executed.

In step 3712, the print start request is made to the printer by the PC.

In step 3713, in response to the print start request, paper feed is started to convey the sheet set in a tray or a cassette of the printer to a print position. If no sheet is set, its information is grasped and notified to the PC when it inquires the status.

In step 3714, the paper feeding operation is executed. In this instance, the sheet is conveyed to a print start position.

In step 3715, the status request depending on the intention of the user in step 3704 is certainly made here, thereby obtaining various status information such as presence or absence of the sheets, and the like.

In step 3716, the status information is returned to the PC.

In step 3717, when the status information obtained in step 3716 indicates the occurrence of a fault such as absence of the sheets, power-off, or the like which becomes a problem upon printing, the user is warned of the generation of an error. The warning can be made by a display onto a monitor or the like or an audio output using a sound source.

In step 3718, the print data formed in step 3711 is transmitted to the printer. Although the transmission is performed at one certain point and completed by the transfer of once in the diagram, actually, the print data is divided and transmitted in accordance with a memory capacity or data processing ability on the printer side or transmitted during its creation.

In step 3719, the printer transmits the received print data to the printer engine and prints.

The above processes are the flow of schematic processes of the general ink jet printer.

When selection from a number of types of sheets mentioned above is left to a judgment of the user, if he feels no necessity to select the sheet type, the print data is printed in a print mode set by a default. A case of printing without calling the detail setting display screen of the printing from the application corresponds to such default printing. There is also a case where the printing suitable for the type of sheet cannot be performed because the user feels it tiring to select the proper type of sheet from many selection items every printing, an input different from his selection intention is made, he lacks knowledge of the sheet which becomes a target of printing, or the like. An expression "the printing suitable for the type of sheet" shows the convenience of the printer vendor, and it does not mean that the user is willing to make the selection. Regardless of the sheet type, the user desires the printing of high quality and a high speed.

If the printing which is improper to the sheet as that in a state where the sheet type has erroneously been set, that in the default setting, or the like is executed, there is a possibility of occurrence of the following problems. That is, if the printing is executed to plain paper in the setting of coating paper or glossy paper which is meant for the printing of high quality, since an ink consumption is large, the ink blurs and is wasted, and at the same time, it takes surplus time to print. If the printing is executed to a media such as glossy paper or the like which is relatively expensive in the setting of the plain paper which is not accompanied with the high print quality, since desired image quality is not obtained, the sheet is used in vain.

In consideration of those drawbacks, there is a printer equipped with a sensor called a media sensor for specifying the type of sheet.

A flow of processes of the ink jet printer with the media sensor will be described hereinbelow with reference to FIG. 38.

Since processes in steps 3801 to 3810 are similar to those in steps 3701 to 3710 in FIG. 37, respectively, their description is omitted here.

In step 3811, the printer driver on the PC receives the print start instruction and forms primary data corresponding to the print setting. Unlike the example of the general ink jet printer, in this system, the creation of the print data according to the type of sheet is performed by the printer main body instead of the PC serving as a host computer. The system is limited to the creation of the data which does not depend on the type of sheet here. Specifically speaking, since various image processes such as color conversion, binarization, and the like are executed by the printer main body, the system is limited to the positioning of a print object, creation of a command for printer control, or the like. Upon printing of image data such as a photograph or the like, multivalue data of RGB is transmitted to the printer.

In step 3812, the print start request is made by the PC to the printer.

In step 3813, in response to the print start request, the paper feed is started in order to convey the sheet set in the tray or cassette of the printer to a sensing position.

In step 3814, the paper feeding operation is executed in response to the start of the paper feed in step 3813. At this time, the sheet is conveyed to a position where it can be sensed by the media sensor.

In step 3815, the type of the conveyed sheet (media type) is sensed. It is assumed that the media sensor has been attached onto a carriage on which an ink cartridge or a print head has been mounted or halfway of a conveying path.

In step 3816, the type of sheet which is at present being conveyed is specified from an output result of the media sensor. It can be specified by an arithmetic operation based on obtained parameters or by referring to a table. A kind of principle of sensing the media type is not limited so long as an output which enables the media type to be specified is obtained. It is assumed here that an optical sensor has been provided.

In step 3817, the status request depending on the intention of the user in step 3804 is certainly made here, thereby obtaining various status information such as presence or absence of the sheets, and the like.

In step 3818, the obtained status information is returned to the PC.

In step 3819, when the status information obtained in step 3818 indicates the occurrence of the fault such as absence of the sheets, power-off, or the like which becomes a problem upon printing, the user is warned of the generation of an error. An arbitrary method of notifying the user can be used in a manner similar to the case of FIG. 37.

In step 3820, the primary data formed in step 3811 is transmitted to the printer. A method of transferring the data is similar to that in FIG. 37.

In step 3821, secondary data according to the corresponding type of sheet is formed on the basis of information which specifies the sheet in step 3816. Specifically speaking, a process for converting transmitted RGB data into YMCK data or a process for converting multivalue data into binary data is executed.

In step 3822, the printer sends the print data (secondary data) formed by the printer itself to the printer engine and executes the printing. In this instance, control of the printing according to the media type is also made by the printer main body.

The above processes are the flow of schematic processes of the ink jet printer with the media sensor.

A flow of processes of a laser beam printer with the media sensor will be described hereinbelow with reference to FIG. 39.

Since processes in steps 3901 to 3910 are similar to those in steps 3701 to 3710 in FIG. 37, respectively, their description is omitted here.

In step 3911, the printer driver on the PC receives the print start instruction and forms print data corresponding to the print setting. Generally, in a page printer of an electrophotographic type using a laser beam or the like, the print data is frequently described by a page description language such as a postscript or the like. The data is also similarly formed by using the page description language (PDL) corresponding to the printer.

In step 3912, the print start request is made to the printer by the PC.

In step 3913, in response to the print start request, the paper feed is started in order to convey the sheet set in the cassette or tray of the printer to the sensing position or the image forming position.

In step 3914, the paper feeding operation is executed in response to the start of the paper feed in step 3913. At this time, the sheet is conveyed to the position where the media type can be sensed by the media sensor or the image forming position (specifically speaking, transfer position).

In step 3915, the type of the conveyed sheet (media type) is sensed. It is assumed that the media sensor has been provided halfway of the conveying path. Unlike the case of the ink jet printer, output information of the sensor is not used to correct the print data itself but used to optimize conditions of the image forming process according to the electrophotograph, specifically speaking, a transfer voltage, fixing temperature adjustment, and the like.

In step 3916, the type of sheet which is at present being conveyed is specified from an output result of the media sensor. A specifying method, a type of sensor, and the like are not particularly limited so long as they can be realized in a manner similar to that in FIG. 38.

In step 3917, the status request depending on the intention of the user in step 3904 is certainly made here, thereby obtaining various status information such as presence or absence of the sheets, and the like.

In step 3918, the obtained status information is returned to the PC.

In step 3919, when the status information obtained in step 3918 indicates the occurrence of the fault such as absence of the sheets, power-off, or the like which becomes a problem upon printing, the user is warned of the generation of an error. An arbitrary method of notifying the user can be used in a manner similar to the case of FIG. 37 or 38.

In step 3920, the print data formed in step 3911 is transmitted to the printer. A method of transferring the data is similar to that in FIGS. 37 and 38.

In step 3921, various conditions of the electrophotographic process are changed on the basis of information which specifies the sheet type obtained in step 3916.

In step 3922, an image is formed by using the received print data in accordance with the process conditions set in step 3921.

The above processes are the flow of processes of the laser beam printer with the media sensor.

An outline of the processes in the case where the media sensor is provided for the printer of the ink jet type or the electrophotographic type will be described with reference to FIG. 40.

In step 4001, the print start is instructed. At this stage, the information of the sheet is not obtained until the print start is instructed.

In step 4002, print data and a control command are formed in accordance with the print setting conditions.

In step 4003, the printing is started after the creation of the print data. The printing can be started even if the data creation is not finished. The conveyance of the sheet as a recording medium is started simultaneously with the print start.

In step 4004, the sensing operation by the media sensor is executed in order to obtain the information which specifies the sheet type during the conveyance or in a state where the sheet is stopped in a specific position of the conveying path.

In step 4005, a result of the sensing operation is reflected to each printer in accordance with the information obtained in step 4004. If the printer is the ink jet printer, correction of the print data or the print control method is changed. If it is the laser beam printer, the various conditions of the electrophotographic process are changed.

In step 4006, image creation as an actual printing operation is executed.

The image creation according to the sheet type is executed on the basis of the information obtained by using the media sensor as mentioned above.

However, the foregoing conventional techniques have the following problems.

In the general ink jet printer without the media sensor, that is, in the ink jet printer which cannot automatically detect the sheet type, the user has to preset the type and print quality of the sheet serving as a print target as mentioned above. If nothing is specified, the printing is performed under the conditions set by defaults. In this case, it is difficult to form the image that is optimum for the sheet. There is also a case where the printing suitable for the type of sheet cannot be performed because the user feels it tiring to select the proper type of sheet from many selection items, an input different from his selection intention is made, he lacks a knowledge of the sheet which becomes a target of printing, or the like. Consequently, there is a case where an expensive media or ink is wasted or the print time is unnecessarily prolonged. Further, there is also a problem such that in the ordinary flow, until the printing is started, unless the user requires, he is not informed of the printer status for example, whether the printer is in a state to make communication or not, whether the sheets have been set or not, whether the ink still remains or not, or the like.

Although a printer which is equipped with the media sensor that can specify the type of sheet and which automatically sets the print mode suitable for the sheet has been devised to solve a part of the above problems, even in this case, there are the following problems.

1. In the printer with the media sensor, generally, since the creation of the print data suitable for the sheet, that is, a process of a heavy load such as an image process or the like is executed after the reception of the data which does not depend on the sheet type, an arithmetic operation processing apparatus of a high speed and high performance is necessary. Specifically speaking, there is a problem such that since dedicated hardware such as high-speed CPU, DSP, ASIC, or the like is indispensable, ability of the PC of a high speed and high performance as one of the component elements of the printing system is not fully exploited. Therefore, it is necessary to provide such ability for the printer main body, and the costs also increase largely.

2. To specify the sheet type on the printer side, it is necessary that an internal ROM has a reference table serving as a discrimination reference or parameter for comparison. Since the change in specific conditions is accompanied with rewriting of contents in the ROM, they cannot be easily changed. This is because there is a risk such that the rewriting of the ROM of a peripheral apparatus such as a printer or the like makes the apparatus inoperative when it fails.

3. Once the printing is started, it is executed in the mode that is most suitable for the sheet. Although it is advantageous, for example, in the case where the user wants to print a print target which does not need very high print quality and is usually printed onto the plain paper, if glossy paper is set to the printer side and the sensing result of the sheet by the media sensor indicates the glossy paper, the high-quality printing suitable for the glossy paper is arbitrarily executed. Although the print quality obtained after the print-out is sufficient, the ink is wasted and the print time is prolonged. It is unlikely that the user desires that the printing which is enough on the plain paper is executed on such relatively expensive paper. One of the reasons for those problems which can be considered is that the system does not have means or a procedure for specifying the sheet type, thereafter, notifying the user of a specified result, and confirming his intention.

4. Since the operation to specify the sheet type is executed after the printing is started, the total print time consequently increases. Although there is no problem if the sheet type can be sensed during the conveyance of the sheet, if a construction such that the conveyance is stopped halfway and the sheet type is sensed is used, a time which is required from the stop of the conveyance to the end of the sensing operation becomes a problem. In the case of printing a plurality of pages, if a certain time is necessary to sense one sheet, it is not practical to specify the sheet each time it is printed in consideration of the print time. In the case of printing a plurality of pages, there is also a possibility that only the first page is sensed, or the like and the subsequent processes are omitted. In such a case, if the type of sheet is changed halfway of the stacked sheets, it is impossible to cope with it. Also in the case of sensing the sheet type during the conveyance, since it is necessary to immediately feedback the sensing result to the processing system of the printer main body, a load of the process increases.

5. There are many cases where the sheet type cannot be recognized until the sheet is fed depending on the construction on the printer side. This is because the optical sensor is often used as a media sensor which is installed and since it is necessary that a distance between the sheet and the media sensor lies within a range of a proper predetermined value, a state where the sheet existing halfway of the conveying path is pressed has to be set to the sensing position.

6. According to the type of sheet, a conveyance amount in motor drive control by the same torque differs. This is because a friction amount between the sheet and a roller differs in dependence on the type of sheet. If there is no means for previously grasping the sheet type, a sensor for determining a head position of the sheet is separately necessary. There is also a case where upon image creation of high quality, a slight difference of the conveyance amount affects in the image quality and becomes a problem.

7. In the case of the printer of the electrophotographic type, although the data is formed on the PC side, since it is necessary to finish the sheet specifying process in a very short time during the conveyance, a load of processes increases largely. To realize such an object, an arithmetic operation processing apparatus of a higher speed and higher performance has to be provided for the printer main body.

SUMMARY OF THE INVENTION

The invention is made to solve the foregoing problems and it is an object of the invention to provide a data processing apparatus, a printing apparatus, a printing system, a data processing method, a printing method, and a program, in which information necessary for setting a sheet among print settings such as type, size, and the like of the sheet is obtained in a state where the sheet has been set in a tray, a cassette, or the like, that is, at a stage before a paper feed and used, thereby enabling the print setting suitable for the sheet to be automatically executed.

Another object of the invention is to provide a data processing apparatus, a printing apparatus, a printing system, a data processing method, a printing method, and a program, in which by providing information of a sheet to the user, print setting suitable for the sheet in which ink and a media are not wasted can be automatically performed without burdening the user and excellent operability and use convenience are obtained.

Particularly, in the case where the creation of print data and control of a printer are performed on the side of a data processing apparatus of a high speed and high performance such as a PC or the like-, a higher-speed printing system of a low price can be constructed.

Further another object of the invention is to provide a printing system in which by discriminating a mismatch between print setting based on sheet information obtained as a sensing result and print quality which has arbitrarily been set by the user, the intention of the user is reflected more and improper printing is reduced as much as possible, that is, the preferable image can be certainly formed at anytime.

To accomplish the above objects, according to the invention, there is provided a print control apparatus for outputting print data to a printing apparatus for conveying a sheet and printing it onto the sheet, comprising: characteristics information obtaining means for obtaining characteristics information of the sheet detected prior to conveying the sheet; sheet specifying means for specifying a standard of the sheet on the basis of the characteristics information; print data forming means for forming the print data on the basis of the standard of the sheet; and output means for outputting the print data formed by the print data forming means to the printing apparatus.

BRIEF DESCRIPTION OF THE DRAWINGS

FIG. 6 is a table showing types of sheets (media types) in the first embodiment;

FIG. 7 is a table showing sizes of sheets (media sizes) in the first embodiment;

FIG. 9 is a diagram showing Example 1 of a table for reference of the media type in the first embodiment (six types);

FIG. 10 is a diagram showing Example 2 of the table for reference of the media type in the first embodiment (four types);

DETAILED DESCRIPTION OF THE PREFERRED EMBODIMENTS

First Embodiment

The first embodiment for realizing the invention will be described with reference to the diagrams.

Figure 3:
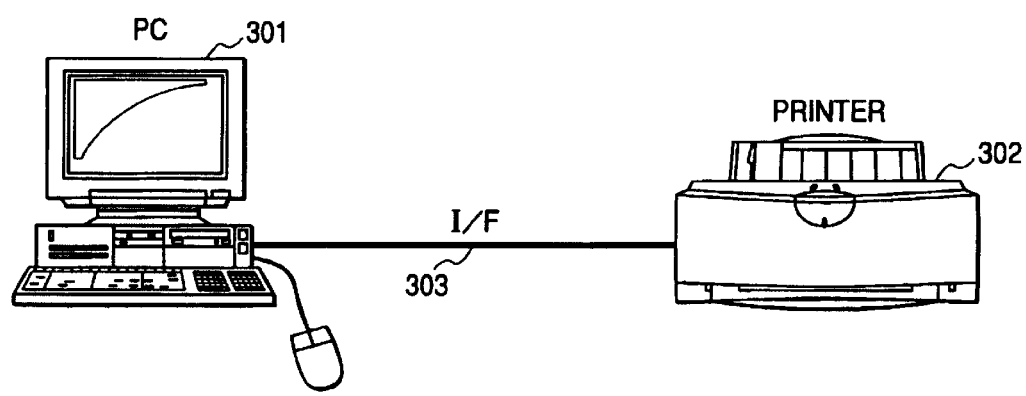
FIG. 3 is a diagram showing a construction of a printing system in the first embodiment.

FIG. 3 is a diagram showing a construction of a printing system in the first embodiment.

Reference numeral 301 denotes a data processing apparatus for forming print data and controlling a connected printer. A personal computer (PC) is presumed here. The PC 301 also has a function for receiving an instruction or an input from the user regarding print setting.

Reference numeral 302 denotes a color printer connected to the PC 301. The color printer 302 forms an image on the basis of the print data formed by the PC 301. Although a type of printer is not particularly limited, a color printer of the ink let type is presumed here.

Reference numeral 303 denotes a communication interface for connecting the PC 301 and the color printer 302. A plurality of types such as USB, IEEE1394, Ethernet (R), IrDA, IEEE802.11, electric power line, and the like are presumed as serial interfaces. A plurality of types of interfaces such as Centronics, SCSI, and the like are presumed as parallel interfaces. An arbitrary interface can be used irrespective of a wire or wireless interface so long as bidirectional communication can be realized.

The "printing system" mentioned here is not an apparatus of a single body but has a construction in which the data processing apparatus and the color printer for forming an image are connected by a specific bidirectional interface.

Figure 4:
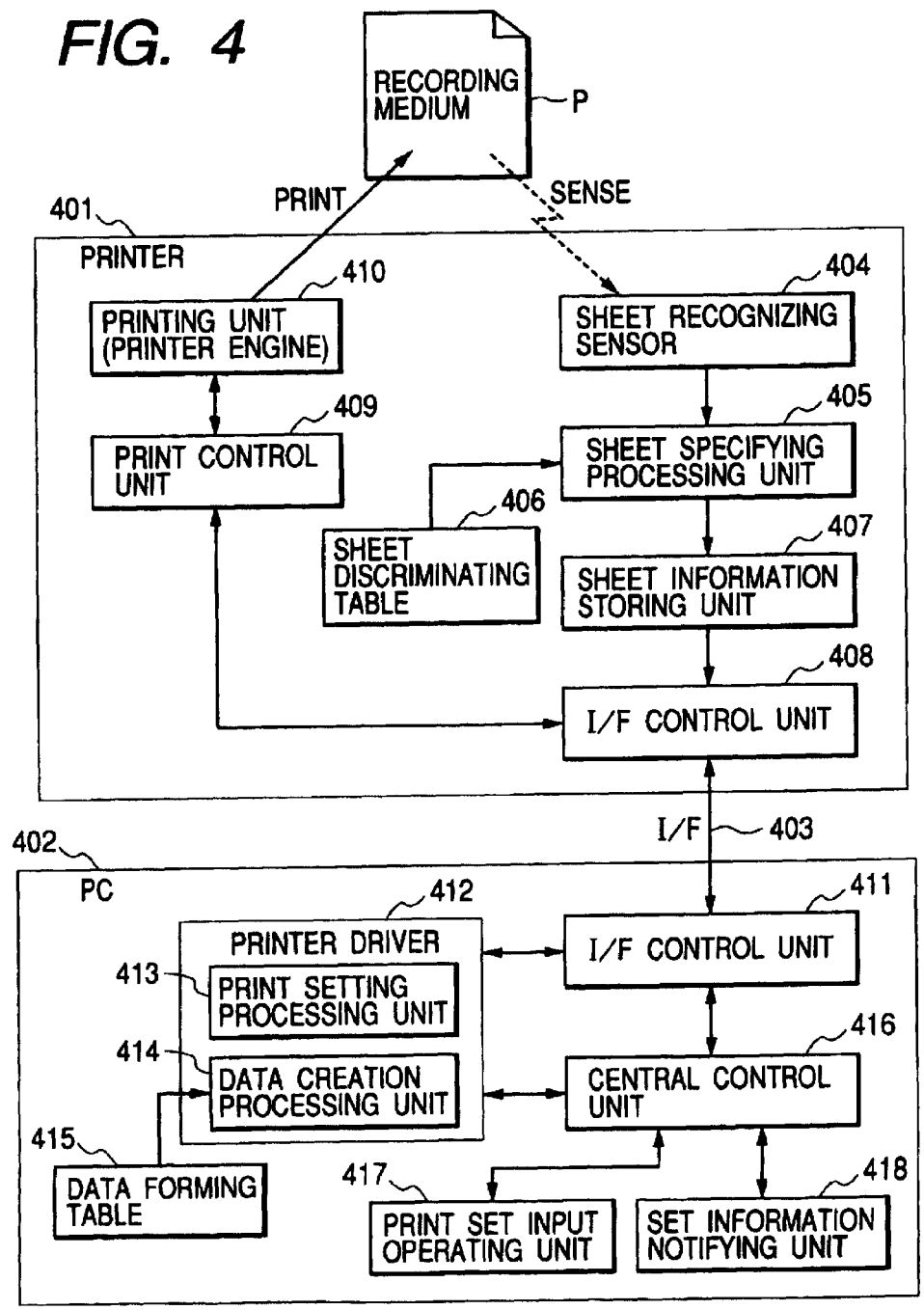
FIG. 4 is a functional block diagram of the printing system in the first embodiment.

FIG. 4 is a functional block diagram of the printing system in the first embodiment.

Reference numeral 401 denotes a color printer of the ink jet type for forming an image. The color printer 401 is constructed by various functional blocks of 404 to 410.

Reference numeral 402 denotes a PC for controlling the color printer 401. The PC 402 is constructed by various functional blocks of 411 to 418. In both of the color printer 401 and the PC 402, functions which are supposed to be particularly unnecessary when features of the embodiment are described are omitted.

Reference numeral 403 denotes a communication interface for connecting the printer 401 and the PC 402. A USB (Universal Serial Bus) is presumed here.

Reference numeral 404 denotes a sheet recognizing sensor (media sensor) for obtaining information to specify a type and a size of recording media P. It is assumed that the recording media P are stacked in a paper feed tray, a cassette, or the like provided for the printer 401. As means for specifying the type and size of the sheet, a large variety of means exist: that is, means for previously putting a mark onto the sheet as a recording medium and optically detecting the mark; means using a dedicated sheet cassette; means for embedding an IC card into the sheet; means for optically detecting reflection light (regular reflection light, diffused reflection light) of specific light irradiated onto the sheet; means for directly or indirectly measuring surface roughness; means for measuring transmittance of the light; and the like. Other realizing means exist: that is, means for discriminating the sheet from a weight of the sheet, a thickness, a coefficient of friction, a dielectric constant, an electric resistance value, a coefficient of water absorption, and a feature amount which is obtained by photographing a two-dimensional image; and the like. A sheet recognizing function is realized by one of those detecting means or by a combination of a plurality of detecting means. Although a principle and a construction of the media sensor are not particularly limited here, it is assumed that the sensor has a function which can discriminate the type and size of the sheet, which will be explained hereinlater.

Reference numeral 405 denotes a sheet specifying processing unit for specifying the sheet on the basis of an output result of the media sensor 404. In the embodiment, the type and size of the sheet are specified by using a table for reference.

Reference numeral 406 denotes a table for reference which is used when the sheet is specified by the sheet specifying processing unit 405. Values in the table 406 can be updated by the PC 402.

Reference numeral 407 denotes a sheet information storing unit for storing the information regarding the specified sheet. A plurality of sheet information can be stored together with its history.

Reference numeral 408 denotes an I/F control unit for performing an interface function of the printer 401. Since the USB is presumed here as an interface, it is assumed that the I/F control unit 408 is constructed by a controller on a peripheral apparatus side of the USB. Transmission of the sheet information, reception of the print data and control commands, and the like are executed. Status information such as error generated in the printer main body, communication status, and the like is also returned to the PC 402 if it is requested.

Reference numeral 409 denotes a print control unit which receives the print data transmitted from the PC 402 and develops it into a printer engine. The print data which is transmitted is data which has already been image-processed on the PC 402 side on the basis of print setting including the type and size of the sheet and the like. The printer engine is controlled in accordance with a command for print control included in the print data here. Specifically speaking, used are data comprising binary data for printing (intermediate data before binarization according to circumstances) and various commands for controlling an implant amount of the ink, the number of paths, the printing direction, and a conveyance amount of the sheet.

Reference numeral 410 denotes a printing unit which is also referred to as a printer engine. The printer engine 410 prints onto the recording medium P on the basis of the print data developed by the print control unit 409. Since the color printer 401 is a printer of the ink jet type, it forms an image by emitting the ink.

Reference numeral 411 denotes an I/F control unit for performing an interface function of the PC 402. The I/F control unit 411 is constructed by a controller on a host side of the USB and has a function as a USB host. A part of the functions as a USB host is also constructed by software such as OS, driver, or the like.

Reference numeral 412 denotes a printer driver as software for performing various settings for printing, creation of the print data, and control of the printer on the PC 402. The printer driver 412 is constructed by various functional blocks of 413 to 415.

Reference numeral 413 denotes a print setting processing unit for performing various print settings including setting of the sheet, setting of print quality, and the like. The print setting processing unit 413 has functions for receiving the instruction or input from the user and displaying or notifying the set contents. This functional block is a portion serving as fundamentals of the invention and has a function for automatically performing the sheet setting on the basis of the sheet information sent from the printer 401. Contents regarding the automatic setting function of the printing including the sheet setting and discrimination about the occurrence of a mismatch will be described hereinlater.

Reference numeral 414 denotes a data creation processing unit of the print data. Specifically speaking, the data creation processing unit 414 executes various image processes such as color conversion, binarization, and the like in accordance with the print setting performed by the printer 401 and the print setting processing unit 413. The data creation processing unit 414 also forms a printer control command for making print control on the basis of the formed data.

Reference numeral 415 denotes a table which is used when the data is formed by the data creation processing unit 414. Contents in the table 415 can be updated or new contents can be added thereto.

Reference numeral 416 denotes a central control unit for controlling various functions of the PC 402. The functions provided for the CPU correspond to them.

Reference numeral 417 denotes a print set input operating unit constructed by various input devices for reflecting the intention of the user to the print setting.

Reference numeral 418 denotes a set information notifying unit for notifying the user of the print setting. As a notifying method, there is a method of using a display apparatus such as a monitor or the like, a method of notifying by an audio sound, or the like.

As mentioned above, the printing system of the invention is constructed by: the color printer in which the media sensor is provided and which has the function for specifying the sheet; the data processing apparatus such as a PC or the like having the function for forming the print data and the control command on the basis of the sheet information specified on the printer side and the instruction or selection made by the user; and the bidirectional communication interface for connecting those two apparatuses.

Figure 5:
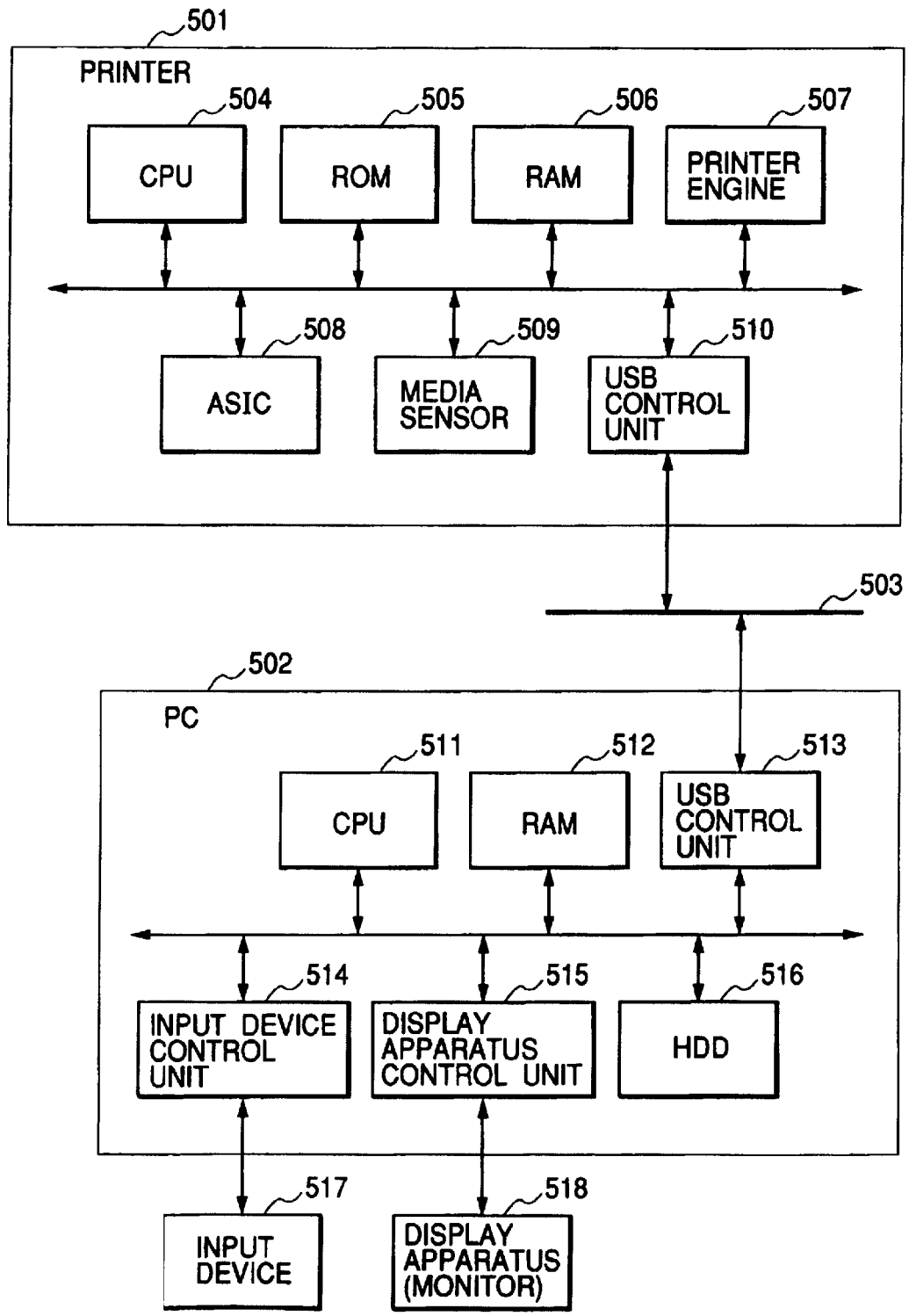
FIG. 5 is a block diagram of the printing system in the first embodiment.

FIG. 5 is a block diagram of the printing system in the first embodiment.

Reference numeral 501 denotes a color printer as a device which can be connected to the serial bus of the USB. The color printer 501 is constructed by various blocks of 504 to 510, which will be explained hereinlater, a power source (not shown), and the like.

Reference numeral 502 denotes a PC as a device which can be connected to the serial bus of the USB. The PC 502 is constructed by various blocks of 511 to 516, which will be explained hereinlater, a power source (not shown), and the like. The blocks which are unnecessary for the description of the embodiment are omitted in a manner similar to the description of FIG. 4.

Reference numeral 503 denotes a serial bus of the USB. Although not particularly shown here, another USB device can be connected to the same bus.

Reference numeral 504 denotes a CPU (Central Processing Unit) for controlling each unit in accordance with firmware stored in a ROM 505 and a RAM 506. Program codes for executing the sheet specifying process as a part of the characteristic functions of the embodiment are executed by the CPU 504.

Reference numeral 505 denotes the ROM in which the program codes of the firmware which are read out by the CPU 504 and used for realizing a part of the functions of the embodiment have been stored. Although a flash ROM is presumed here, its type is not limited so long as it is a non-volatile memory medium. A table for sheet discrimination has been also stored in the ROM 505.

Reference numeral 506 denotes the RAM (memory). As necessary, the CPU 504 writes or reads out the data into/from the RAM 506, the data is read out from a USB control unit 510 by a direct memory access and stored into the RAM 506, and on the contrary, the data is read out from the RAM 506 and written into the USB control unit 510. The RAM 506 is also used to store the sheet information.

Reference numeral 507 denotes a printer engine for printing. The printer engine 507 is constructed by a cartridge in which a head of the ink jet type and the ink have been mounted and its control circuit.

Reference numeral 508 denotes an ASIC comprising a dedicated circuit for making the print control, a DMA controller, or the like.

Reference numeral 509 denotes a media sensor for obtaining the information to specify the sheet. The information to specify the type and size of the sheet can be obtained by this media sensor. The type of sensor is not limited so long as the foregoing functions can be realized.

Reference numeral 510 denotes the USB control unit for controlling communication with the USB host. Transfer of the print data is mainly performed by using bulk transfer. It is assumed that this USB control unit corresponds to a low speed of 1.5 Mbps, a full speed of 12 Mbps, and a high speed of 480 Mbps according to the standard of USB2.0. It is sufficient that it corresponds to both of the low speed and the full speed.

Reference numeral 511 denotes a CPU (Central Processing Unit) for controlling each unit in accordance with programs stored in a hard disk drive 516 and a RAM 512. Program codes of the printer driver for realizing a part of the functions of the embodiment are executed by the CPU 511.

Reference numeral 512 denotes the RAM (memory). As necessary, the CPU 511 writes or reads out the data into/from the RAM 512, the data is read out from a USB control unit 513 by a direct memory access and stored into the RAM 512, and on the contrary, the data is read out from the RAM 512 and written into the USB control unit 513. Upon activation of the printer driver, the program codes of the driver are loaded into the RAM 512.

Reference numeral 513 denotes the USB control unit for controlling communication with the USB device. The USB control unit 513 has functions for making control and management of the printer 501 and other USB devices.

Reference numeral 514 denotes input device control unit for controlling various input devices 517 such as keyboard, mouse, and the like which are extremely important for the user interface. A serial interface such as PS/2, USB, or the like is used as an interface between the input devices 517 and the PC 502. An audio sound can be regarded as input means.

Reference numeral 515 denotes a display apparatus control unit for performing creation, conversion, and the like of a signal which is sent to a display apparatus 518.

Reference numeral 516 denotes the hard disk drive in which the program codes for realizing a part of the functions of the embodiment which are read out by the CPU 511 have been stored. Although the hard disk drive is presumed here, its type is not limited so long as it is a non-volatile memory medium and the apparatus using such a memory medium. For example, an FD, an MO, a CD-RW, a DVD-RAM, a flash memory, a tape device, or the like corresponds to it.

Reference numeral 517 denotes the input devices for transferring the instruction from the user. The keyboard and mouse are presumed here. In the case of an audio input, a microphone is presumed.

Reference numeral 518 denotes the display apparatus (monitor) constructed by a CRT, an LCD, or the like. Although the means for notifying the user is the display apparatus in the embodiment, in the case of using the audio sound, the control unit 515 denotes an audio output control unit and the apparatus 518 denotes an audio output apparatus such as a speaker or the like for generating an audio signal.

As mentioned above, the printing system of the invention is constructed by: the color printer with the media sensor; the general PC having the display apparatus, the input devices, and the like; and the USB interface for connecting those two devices. Special apparatus and mechanism excluding the media sensor are unnecessary.

Figure 1:
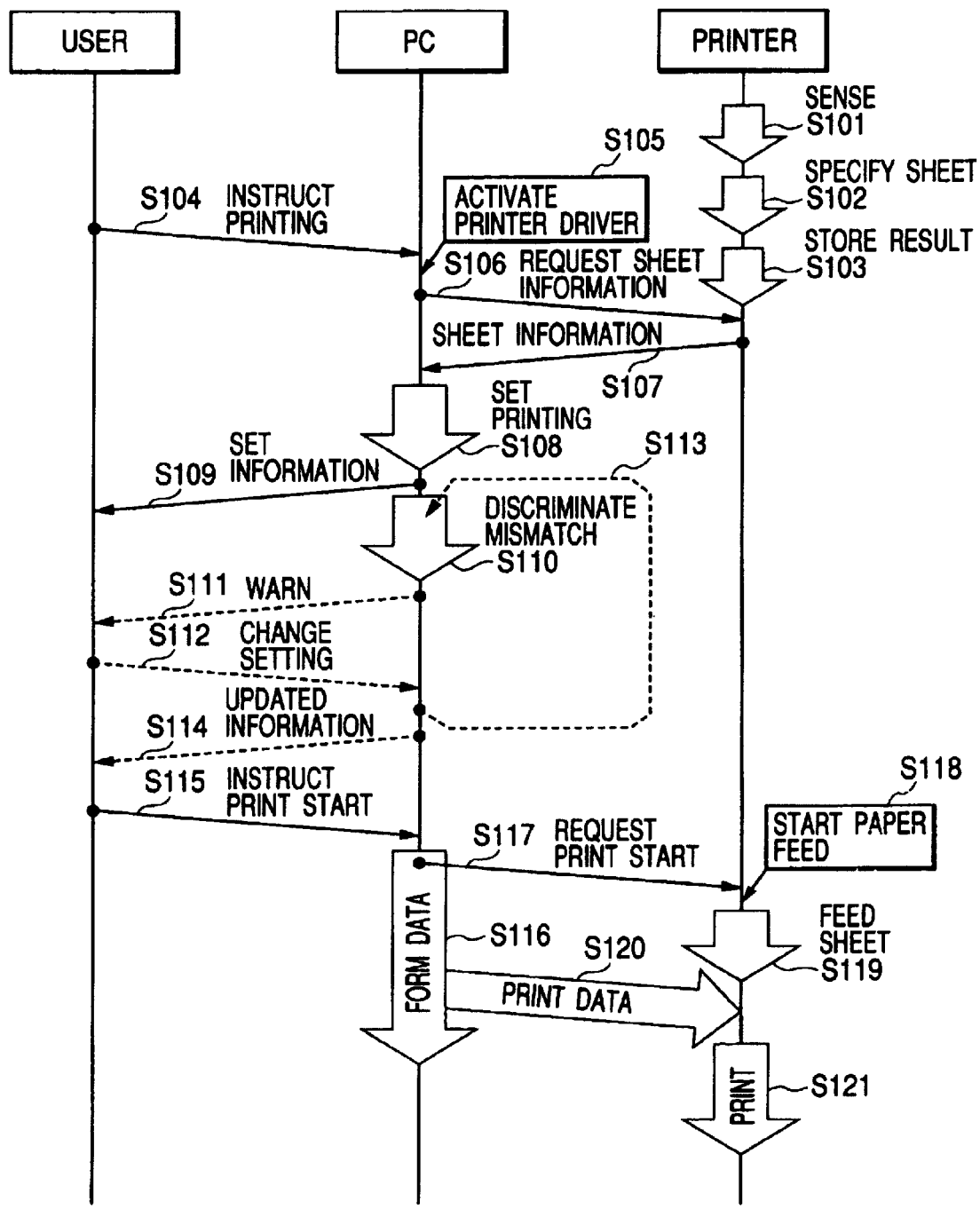
FIG. 1 is a diagram showing a flow of processes and control in the case where there is a print instruction in the first embodiment.

FIG. 1 is a diagram showing a flow of whole processes and control in the case where there is a print instruction in the first embodiment.

In step 101, the information to specify the type and size of the sheet is obtained by the media sensor. It is assumed that the media sensor is provided so that it can sense the type and size of the sheets stacked in the paper feed tray or the dedicated cassette and can sense them before the sheet is fed. Timing for sensing can be arbitrarily set to any timing so long as it is timing before an obtaining request of the sheet information by the printer driver. Timing for turning on a power source of the printer is presumed here.

In step 102, the type and size of the sheet are specified from an output result of the media sensor. They can be specified by an arithmetic operation using parameters or by referring to a table. With respect to a principle of sensing the type and size of the sheet, its construction including the type, the number of sensors, and use of a plurality of types of sensors or the like is not limited so long as an output to specify them is obtained.

In step 103, the sheet information specified in step 102 is stored into the memory. In response to a request from the PC side, values of the stored sheet information are returned.

In step 104, a print request is instructed to the PC by the user. Generally, the print request is instructed by selecting a print command from a menu of the application which is used and executing it, and it is instructed by using the mouse or keyboard. It is also possible to use a construction such that such an instruction is realized via the audio input instead of the pointing device such as keyboard, mouse, or the like.

In step 105, when the display screen is shifted from the setting display screen of the printing which is displayed in response to the print request instruction to the display screen for performing the detail setting, a printer driver as software for managing the print setting and others is activated.

In step 106, the obtaining request of the sheet information is made to a printer which is presumed to execute the printing in response to the activation of the printer driver in step 105 in order to confirm the type of sheets stacked in the printer itself. At this time, it is possible to request not only the sheet information but also information of the printer engine unit such as presence or absence of the sheets to be set, status of the interface, type of ink cartridge, residual amount of the ink, and the like.

In step 107, the sheet information stored in step 103 is transmitted to the PC in response to the obtaining request of the sheet information in step 106. In the case of returning information other than the sheet information, the other information is returned together with it.

In step 108, automatic setting of the printing is executed on the basis of the obtained sheet information. Contents of the print setting and a flow of processes will be explained hereinlater. When sheet setting based on the sheet information in the print setting is executed, whether a mismatch has occurred between the sheet setting and the sheet setting arbitrarily designated by the user or not is also discriminated here.

In step 109, the print set information including the contents which have automatically been set in step 108 is displayed by using the display apparatus such as a monitor or the like. If the mismatch has occurred between the contents of the automatic sheet setting and those of the user setting, such a fact is displayed and the user is notified or warned.

In step 110, whether a mismatch has occurred between the sheet setting based on the sheet information and print quality which has arbitrarily been designated by the user or not is also discriminated. A reference for discriminating the occurrence of the mismatch and a processing flow of the discrimination will be explained hereinlater. Whether a change instruction by the user is valid or not in the case where the mismatch has occurred between the contents of the automatic sheet setting and those of the sheet setting designated by the user is also discriminated. The discrimination in this case, however, is made when the set contents are fed back in step 113.

In step 111, if it is regarded that the mismatch has occurred in step 110, the user is notified or warned of such a fact. Although the notification and warning are given by displaying a dialog, they can be displayed together with an audio sound upon opening of the dialog so as to alert the user. Contents of the dialog to be displayed will be explained hereinlater.

In step 112, if the print set information displayed in step 109 is confirmed or in the case of changing the contents of the print setting in accordance with the warning displayed in step 111, the system receives an instruction of the user with respect to the change portion.

In step 113, if the setting is changed in step 112, the processing routine is returned to step 110 in order to reconfirm whether a mismatch has occurred between the changed contents and the sheet setting or not. This process is also executed in the case where the user instructs to solve the mismatch between the automatic sheet setting and the setting by the user.

In step 114, if there is no problem in the result of the setting change, information of the print setting after completion of the updating to which the instruction received in step 12 has been reflected is displayed on the monitor. The user can repeat a processing loop in steps 112 and 114 and perform desired setting if he wants to.

In step 115, the user instructs to start the printing. Thus, the actual printing operation is started. The case where the printing is directly started without displaying the detail setting display screen of the printing from the application which is being operated on the PC will be described in detail with reference to FIG. 2.

In step 116, the printer driver on the PC forms print data corresponding to the print setting in response to the print start instruction. Specifically speaking, various image processes such as color conversion, binarization, and the like are executed, and creation of commands necessary for printer control such as printing method and conveyance amount of the sheet, and the like are executed.

In step 117, the print start request is made to the printer by the PC.

In step 118, the paper feeding operation for conveying the sheet set in the tray or cassette of the printer to the print position is started in response to the print start request.

In step 119, the paper feeding operation is executed. At this time, the sheet is conveyed to the print start position.

In step 120, the print data formed in step 116 is transmitted to the printer. In the diagram, although it seems as if the transmission has been performed at a certain point and the data transmission has been completed by the transfer of once, actually, the data divided in accordance with a memory capacity and data processing ability on the printer side is transmitted. Also with respect to transmission timing and the number of times of the transmission, the print data is sequentially transmitted during the creation of the print data.

In step 121, the printer sends the received print data to the printer engine and prints. Since the sheet has already been conveyed to the print start position, the ink is emitted while feeding the sheet from this position in accordance with a print width, thereby forming the image.

The flow of the processes shown in FIG. 1 relates to fundamentals of the invention. By holding the sheet information prior to activating the printer driver, the subsequent print time is reduced. Since the print data can be formed on the PC side, the printer main body can be simply constructed at a low price. Further, since the mismatch between the sheet setting based on the sensing result and the setting by the user is discriminated in the driver and the communication with the user is made, the printing system which can perform the preferable image creation to which the intention of the user is maximally reflected and in which the erroneous print setting is hardly executed can be constructed. Thus, the user is released from the tiring operation, the wasteful consumption of the ink and the media can be prevented, and the efficient print environment can be obtained.

Figure 2:
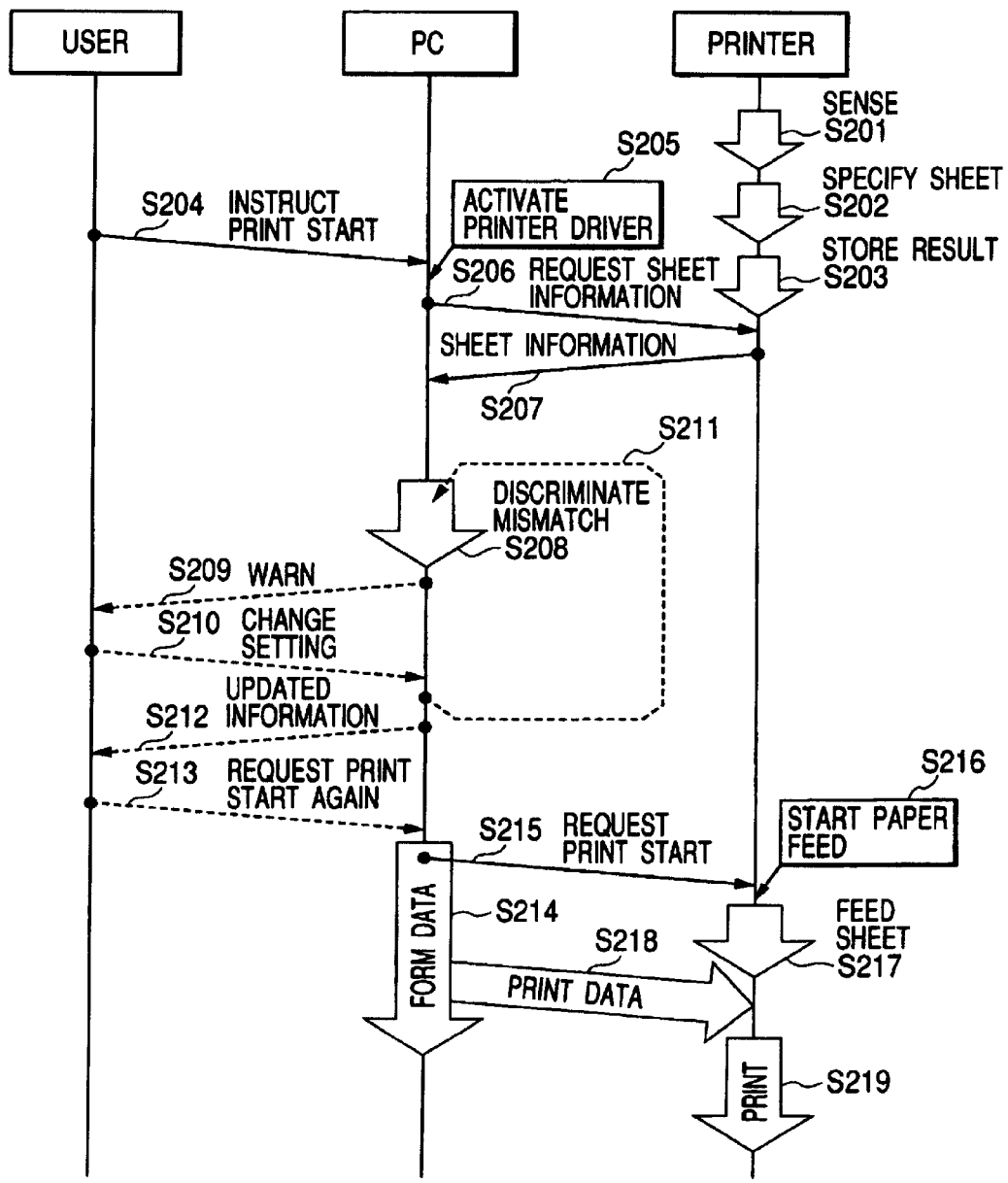
FIG. 2 is a diagram showing a flow of processes and control in the case where there is no print instruction in the first embodiment.

FIG. 2 is a diagram showing a flow of the whole process and control in the case where there is no print instruction in the first embodiment.

Since contents in steps 201 to 203 are similar to those in steps 101 to 103 in FIG. 1, respectively, their detailed description is omitted. During this period of time, the sheet information is obtained and stored into the printer. A construction for holding the sheet information prior to activating the printer driver is similar to that shown in FIG. 1.

In step 204, the user instructs to start the printing. Thus, although the actual printing operation is started, in this case, the print setting is not changed but the subsequent processes are executed on the basis of preset contents. As shown in the conventional example, in the general ink jet printer, the print data is formed and the printing is executed in a state where the contents of the print setting cannot be confirmed and changed.

Since contents in steps 205 to 207 are similar to those in steps 105 to 107 in FIG. 1, respectively, their detailed description is omitted. During this period of time, the printer driver is activated and the sheet information held in the printer main body is obtained.

In step 208, whether a mismatch between print setting based on sheet information and the set contents which have previously been set by the user or the set contents as default designation has occurred or not is discriminated. A reference for discrimination about the occurrence of the mismatch and the processing flow of the discrimination will be explained hereinlater.

Since contents in steps 209 to 212 are similar to those in steps 111 to 114 in FIG. 1, respectively, their detailed description is omitted. During this period of time, if it is determined in step 208 that the mismatch has occurred, the user is warned of this fact so as to make an instruction and judgment.

In step 213, if there is a change in print setting until this time, a trigger to start the printing under conditions after the change is made. That is, the print start is requested again by the user.

Since contents in steps 214 to 219 are similar to those in steps 116 to 121 in FIG. 1, respectively, their detailed description is omitted. If there is a change in set contents, the subsequent creation of the print data and print control are executed in response to the re-request for the print start.

As mentioned above, also with respect to the case where the printing is directly started by the application which is being operated on the PC without displaying the detail setting display screen, by holding the sheet information prior to activating the printer driver in a manner similar to that described in FIG. 1, the subsequent print time is reduced. Other effects are also obtained in a manner similar to those mentioned above.

Although the load on the user seems to be increased as compared with the conventional example because it is necessary to change again the set contents after the start of the printing and issue the start instruction, actually, the load on the user is not increased unless the mismatch of the setting occurs.

FIG. 6 is a table showing types of sheets (media types) in the first embodiment.

As shown in the diagram, there are a large number of types of sheets which can be set by the printer driver of the ink jet printer. The sheets in a range from plain paper to special sheet which can be selected by the user are mentioned here. Those sheets can be selected from a list of the sheet types of the printer driver. A list selecting display screen of the printer driver will be explained hereinlater.

FIG. 7 is a table showing sizes of sheets (media sizes) in the first embodiment.

In a manner similar to FIG. 6, there are many types which can be set with respect to the size of sheet and media sizes shown in the table can be selected. With respect to sheets of irregular sizes which do not exist in the selection list, by selecting user definition, a desired media size can be arbitrarily inputted and designated. The list selecting display screen and the input display screen of the media sizes will be also similarly explained hereinlater.

Figure 8B:
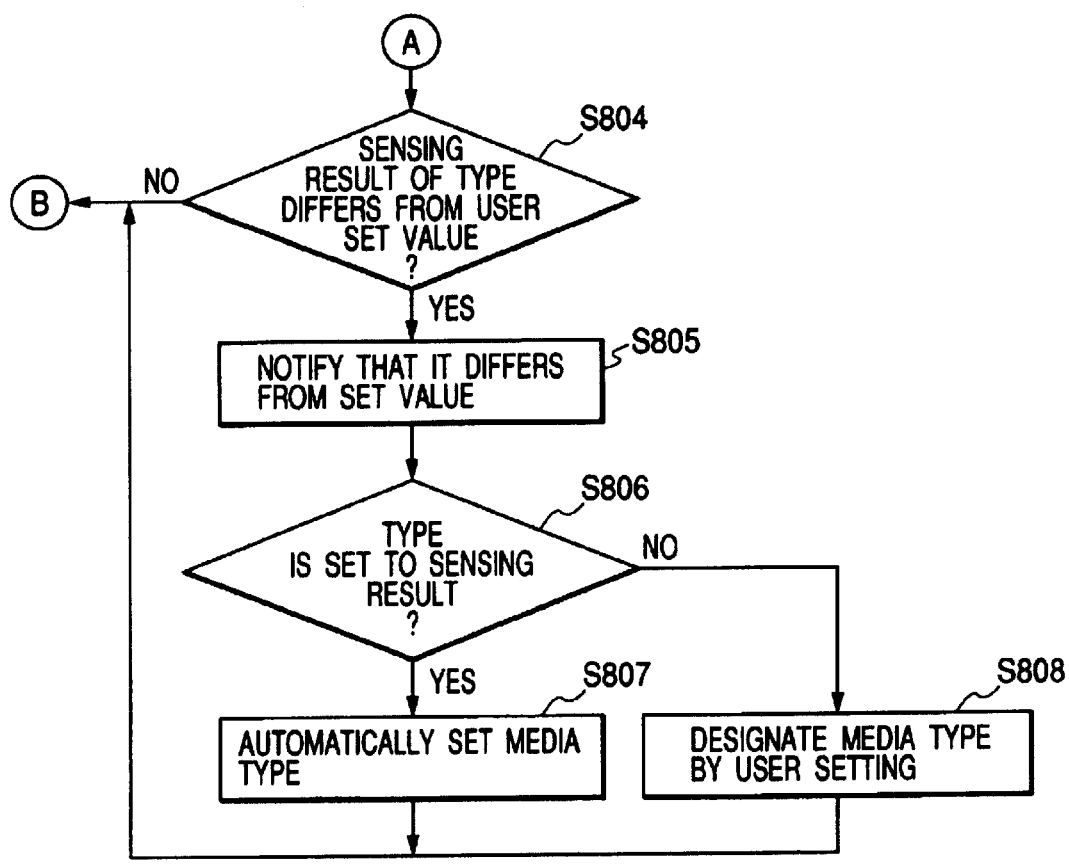
FIG. 8 is comprised of FIGS. 8A and 8B showing flowcharts illustrating a flow of discrimination of the media type and print setting to which a discrimination result is reflected in the first embodiment.

FIGS. 8A and 8B are flowcharts showing a flow of discrimination of the type of sheet (media type) and print setting to which a discrimination result is reflected in the first embodiment.

In step 801, the sheet type (media type) is recognized on the basis of the sensing result of the media sensor. It is now assumed that the sheets are classified into six categories in accordance with a table for reference, which will be explained hereinlater.

In step 802, whether the setting of the media type is the auto setting mode or not is discriminated. The auto setting mode is a mode for automatically performing the sheet setting in accordance with the sensing result obtained on the printer side. If this mode is not selected, the user needs to arbitrarily select the sheet type. If the auto setting mode of the media type has been selected, step 803 follows. If a manual setting mode by the user designation has been selected, step 804 follows.

In step 803, whether the print quality has been set to an auto setting mode or not is discriminated. The auto setting mode of the print quality is a mode for performing the sheet setting in accordance with the sheet information comprising the type and size of the sheet and automatically selecting the print mode that is optimum for the printing of the corresponding sheet on the basis of the sheet setting. If this mode is not selected, the user needs to arbitrarily select the print quality. If the auto setting mode of the print quality has been selected, step 809 follows. If the manual setting mode by the user has been selected, step 810 follows.

In step 804, whether there is a difference between the sheet setting of the media type based on the sensing result and the sheet setting arbitrarily designated by the user or not is discriminated. However, since the number of types of sheets which can be arbitrarily selected or inputted by the user is larger than six as the number of category types based on the auto setting as shown in the table of FIG. 6, it is also necessary to consider a case where a discrimination result about such difference does not perfectly coincide with the type of sheet. In this case, it is discriminated by checking whether the sheet type belongs to the same type of category or not. For example, a glossy film and glossy paper can be classified to the same category in terms of the creation of the photograph-toned image. If there is no difference between the categories of the sheet types and it is determined that it perfectly coincides with the set value, the sheet type selected from the list is reflected as a set value. If the set values differ, step 805 follows. If they coincide or the categories coincide, step 803 follows.

In step 805, in accordance with a result showing that it is determined in step 804 that the auto set value of the media type based on the sensing result and the user set value are different, such a fact is notified to the user.

In step 806, the user discriminates the selection of either the auto sheet setting or the user setting in accordance with the notified contents. In the case of matching the setting of the media type with the auto setting according to the sensing result, step 807 follows. In the case of matching it with the set value of the user designation, step 808 follows.

In step 807, the auto set value of the media type based on the sensing result is used as setting of the media type.

In step 808, the contents set by the user setting are set to the setting of the media type. In this instance, not only the value which has already been set is selected but also it is possible to select another media type and change the setting.

In step 809, the print quality is set on the basis of the sheet setting since the print quality is set in the auto setting mode in step 803. After the setting of the print quality, each of the sheet setting process and the print quality setting process are finished.

Since the print quality is set in the manual setting mode according to the user designation, in step 810, whether a mismatch between the media type which has already been set and the print quality set by the user has occurred or not is discriminated. A discrimination reference for the mismatch will be explained hereinlater. If it is determined that the mismatch has occurred, step 811 follows. If it is determined that the matching is obtained between them, step 813 follows.

In step 811, since it is determined that the mismatch has occurred, such a fact is notified to the user.

In step 812, in accordance with the notified contents, the user determines to select the preset media type or the print quality set by the user as print quality. If the print quality is set to the sheet setting, step 809 follows. If the print quality selected by the user is insistently designated, step 813 follows.

In step 813, the set contents by the user setting are used as setting of the print quality. In this case, not only the value which has already been set is selected but also it is possible to select another print quality and change the setting.

If both of the media type and the print quality are automatically set, the sheet setting is performed on the basis of the sensing result of the media sensor and the print quality that is optimum for the sheet setting is selected. In this case, the user does not need to perform any setting or inputting operation.

If the setting of the media type is the manual setting, the sheet setting of the media type designated by the user and the sheet setting based on the sensing result are compared in the driver. If it is determined that they coincide as a result of the comparison, the operation similar to that in the auto setting mode is executed when it is seen from the user side. Only when they differ, by notifying the user of such a fact, the erroneous sheet setting can be avoided while confirming the intention of the user.

If the setting of the print quality is the manual setting, the setting of the print quality designated by the user and each content of the setting of the print quality based on the sheet setting are compared in the driver. If it is determined that they coincide as a result of the comparison, the operation similar to that in the auto setting mode is executed when it is seen from the user side and no action occurs in particular. If they differ, by notifying the user of such a fact, the optimum print quality can be set in accordance with the intention of the user.

As mentioned above, on the basis of the sheet information according to the sensing result, the sheet setting (setting of the type in it) and the print quality setting are performed.

FIG. 9 is a diagram showing an example of table for reference of the media type in the first embodiment. The example in which the media type is classified into six types will now be explained.

As types of sheets (media types), six categories are presumed here: plain paper, thick paper; coating paper; glossy paper; glossy film; OHP; and T-shirt transfer paper, cloth. Those classifications also differ depending on the performance and function of the media sensor. In the case where the media types can be classified into a larger number of categories, If there is no difference in the final print quality and control contents, there is no need to dare classify them into such a number of categories. Those categories are merely shown here as one example. It is now assumed that three types of print quality are prepared: high quality, standard, and high speed. The number of levels of the print quality can be set to an arbitrary number such as 5 or 2 in a manner similar to the classification of the types.

Meanings of symbols used in the table will be described in detail hereinbelow.

Ø: Setting which is designated by a default. Print quality which is set when the user designates nothing or when he sets the setting of the print quality to the auto setting mode and selects the print quality which is optimum for the sheet.

○: Print quality which can be selected for the current sheet.

Δ: A case where there is a possibility that if the printing is executed at this print quality for the current sheet, a problem occurs. In the embodiment, the user is warned.

x: Print quality which cannot be selected in the case of manually setting. Generally, this print quality cannot be selected. According to such a combination of the sheet setting and the print quality designated by the user himself, a combination of the sheet setting of "setting attention: Δ" and the sheet setting of "cannot be set: x" is also considered. In this case, attention or warning is generated to the user, thereby making it possible to guide the user so that the erroneous printing is not performed while the intention of the user is satisfied.

A certain sheet will now be described as an example.

It is assumed that the glossy paper has been selected as sheet setting. Upon selection of the glossy paper, it can be selected in accordance with a result of the auto setting based on the sheet information according to the sensing result or can be arbitrarily designated by the user. In this instance, it is assumed that the print quality is set in the manual mode in which the user designates it by himself instead of the auto mode. It is assumed that the print quality designated in the manual mode is the high speed mode. This is because the contents set upon previous printing remain as they are.

If the printing is started in this state, although the relatively expensive glossy paper has been set into the printer, the printing is executed in the high speed mode in which low print quality which cannot effectively use a feature of the glossy paper is realized. Such printing results in that the media is wasted and the ink and time which are used for the erroneous printing are also wasted.

Figure 15:
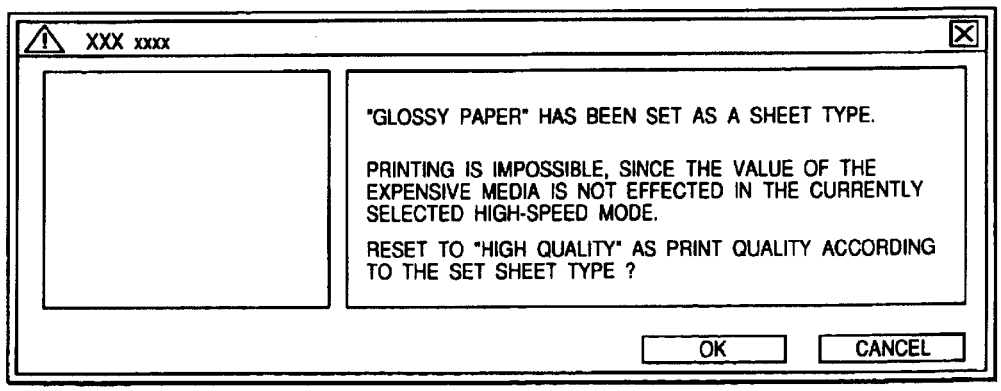
FIG. 15 is a diagram showing an example of a warning dialog which is displayed in the case where a mismatch occurs between the media type and print quality set by the user in the first embodiment.

In such a case, in the embodiment, by pointing out a fact that the print quality "high speed" which cannot inherently set for the glossy paper has been selected and notifying the user of it, various wasteful consumption can be prevented. An example of a dialog which is displayed when the mismatch is pointed out Is shown in FIG. 15. In the dialog, the contents of the current sheet setting and the current setting of the print quality, a point that a problem will occur in a combination of the current settings, and how to change the setting are displayed as information.

FIG. 10 is a diagram showing an example of the table for reference of the media type in the first embodiment. The example in which the media type is classified into four categories will be explained.

As types of sheets (media types), four categories are presumed here: plain paper, thick paper, others; coating paper; glossy paper, glossy film; and OHP. Since the number of levels of the print quality, meanings of symbols used in the table, and the like are similar to those in FIG. 9, their description is omitted here. Generally, those four types of categories are frequently presumed.

Figure 11B:
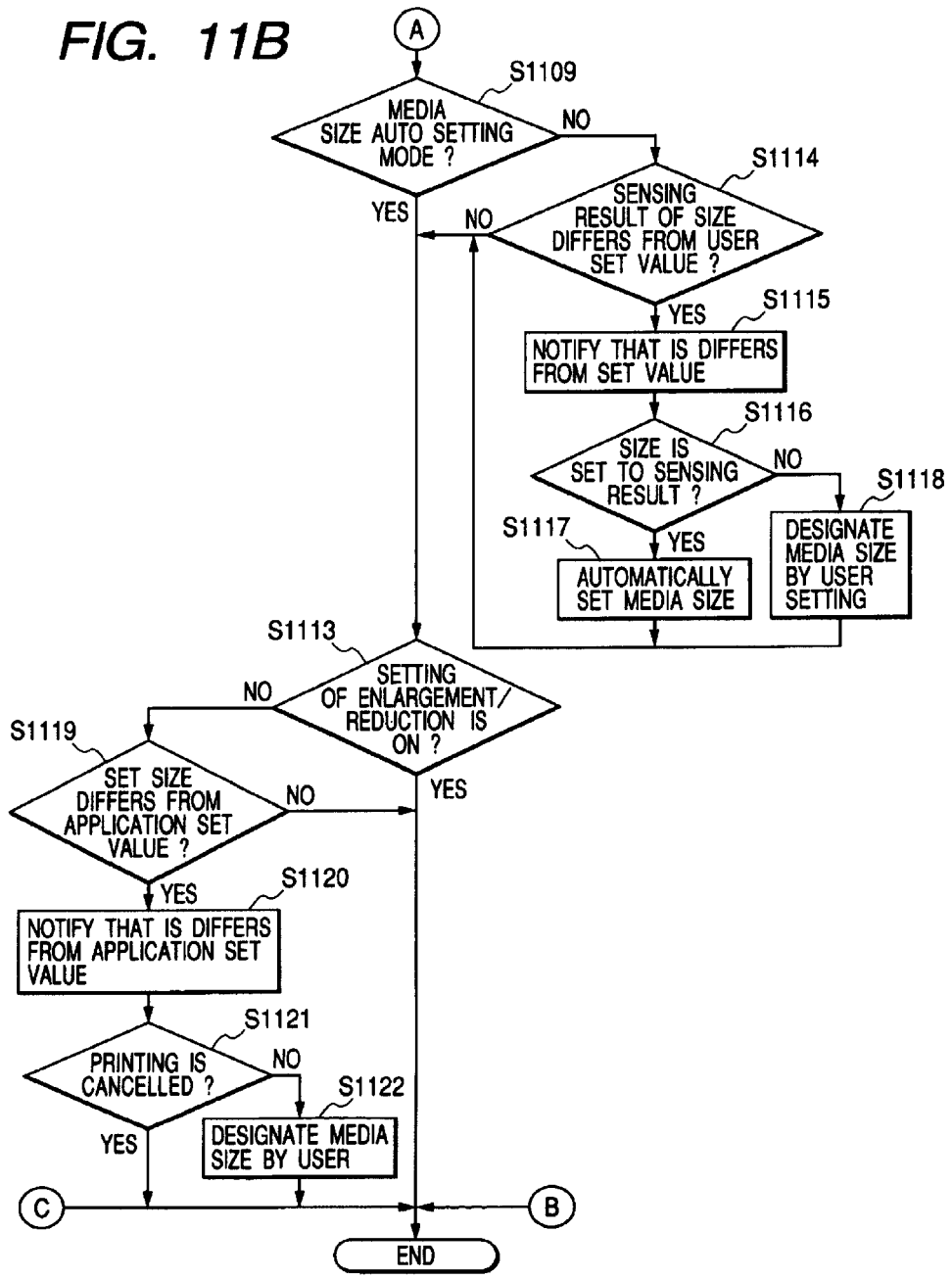
FIG. 11 is comprised of FIGS. 11A and 11B showing flowcharts illustrating a flow of discrimination of the media size and the presence or absence of the sheets and media size setting in the first embodiment.

FIGS. 11A and 11B are flowcharts showing a flow of discrimination of the size of sheet (media size) and the presence or absence of the sheets and media size setting in the first embodiment.

In step 1101, whether the sheets have been set in the printer or not is discriminated on the basis of the sensing result.

In step 1102, whether the sheets have been set in the printer or not is discriminated in accordance with the contents discriminated in step 1101. If the sheets have been set, step 1103 follows. If no sheet is set, step 1104 follows.

In step 1103, the size of sheet (media size) is discriminated on the basis of the sensing result.

In step 1104, since no sheet is set, the user is notified of the absence of the sheets.

In step 1105, the user determines whether the printing is cancelled or not in response to the notification of the absence of the sheets. In the case of cancelling the printing, the processing routine is finished. In the case of printing, step 1106 follows.

In step 1106, the user sets the sheets in order to continue the printing. After the sheets were set, the process can be restarted via the PC after the display of a dialog for confirming whether the sheets have been set or not or by automatically detecting that the sheets have been set. A button to restart the process can be provided for the printer. In this instance, the restart button shares not only the print restarting function but also other functions.

In step 1107, the size of the set sheets is detected by the sensor. Although the media size is generally sensed prior to activating the printer driver, in the flow in the case of the absence of the sheets, since the sheets are set after the activation of the driver, the sensing operation of the media size is necessary upon execution of the subsequent processes.

In step 1108, whether the sheet size which has previously been recognized or has been detected in step 1107 coincides with the size in the table of the media sizes provided for the printer driver shown in FIG. 7 or not, that is, whether it is a regular size or an irregular size is discriminated. In the case of the regular size, step 1109 follows. In the case of the irregular size, step 1110 follows.

In step 1109, whether the setting mode is a sheet size auto setting mode for automatically setting the size of sheet or not is discriminated. The auto setting mode is a mode for setting the sheet size in accordance with the sensed sheet information. If the auto setting mode has been selected, step 1113 follows. If the manual setting mode in which the user designates the sheet size has been selected, step 1114 follows.

In step 1110, since the media size is the irregular size, an input dialog for enabling the user to input an arbitrary sheet size is displayed. A construction of the input dialog will be described with reference to FIG. 17.

In step 1111, the user inputs the media size in accordance with a display screen.

In step 1112, the media size is set in accordance with the value inputted in step 1111.

In step 1113, whether a function of enlarging or reducing the image or document as a print target in accordance with the media size, that is, enlargement/reduction setting has been validated or not is discriminated. When the enlarging/reducing function is valid, even if the size of sheets set in the printer and the media size designated by the application which is in use are different, since the enlarging/reducing process according to the print sheet is executed, so that the printing in which a blank is proper and a print area does not exceed the sheet size can be performed. If the enlarging/reducing setting is valid, the media size setting process is finished. If the enlarging/reducing setting is invalid, step 1119 follows.

In step 1114, since the media size is set in the manual mode, whether the media size which has automatically set on the basis of the sensing result and the media size which has arbitrarily designated by the user are different or not is discriminated. If they are different, step 1115 follows. If they coincide, step 1113 follows.

In step 1115, since it is determined in step 1114 that the settings of the media sizes are different, such a fact is notified to the user.

In step 1116, in accordance with the notified contents, the user determines to select the sensing result or the user designation as a media size. If the media size setting is set to the auto set contents of the media size based on the sensing result, step 1117 follows. If the set contents which have arbitrarily been selected or inputted by the user is insistently used, step 1118 follows.

In step 1117, the contents of the auto setting based on the sensing result are used as setting of the media size.

In step 1118, the set contents by the user setting are used as setting of the media size. In this instance, not only the value which has already been set is selected as a set value but also it is possible to select another sheet size and change the set contents.

In step 1119, whether the media size set by the driver and the media size specified in the application are different or not is discriminated. If the settings of the media sizes are different, step 1120 follows. If they coincide, the setting process is finished.

In step 1120, since the settings of the media sizes are different, the user such a fact is notified to the user.

In step 1121, whether the printing itself is cancelled or not is discriminated. In the case of cancelling the printing, the setting process of the media size is finished. In the case of continuing the process as it is, step 1122 follows.

In step 1122, the user manually sets the media size. Specifically speaking, he opens the application and sets the designated media size into the media size set by the driver.

If no sheet is set, this fact is notified to the user before the print start so that he determines whether the printing is continued or not. In the case of continuing, a procedure which is executed until the user sets the sheets into the printer and restarts the process is supported by a user interface of the driver.

If the setting of the media size is performed in the auto setting mode and the enlargement/reduction is valid, the sheet setting is performed on the basis of the sensing result of the media sensor and the image is formed in accordance with the set media size. Even if the media size specified by the application and the sheet setting by the driver are different, by executing the enlargement/reduction, the printing can be performed at a proper size without burdening the user.

If the enlargement/reduction is invalid, the media size based on the sheet setting by the driver is compared with the media size specified by the application. If they are equal as a result of the comparison, the user does not need to be particularly aware of the setting of the media size. If they are different, by notifying the user of such a fact, the media size can be set in accordance with the intention of the user. If such a process is not executed and the media size on the application side is set to be larger than the media size by the sheet setting of the driver, since an image larger than the sheet is formed, in the printer of the ink Jet type, the ink is adhered onto the inside of the printer such as platen, conveying guide, or the like. The adhered ink dirties the sheet which is subsequently fed and causes a large problem.

The setting of the media size is performed on the basis of the sheet information according to the sensing result.

Figure 12:
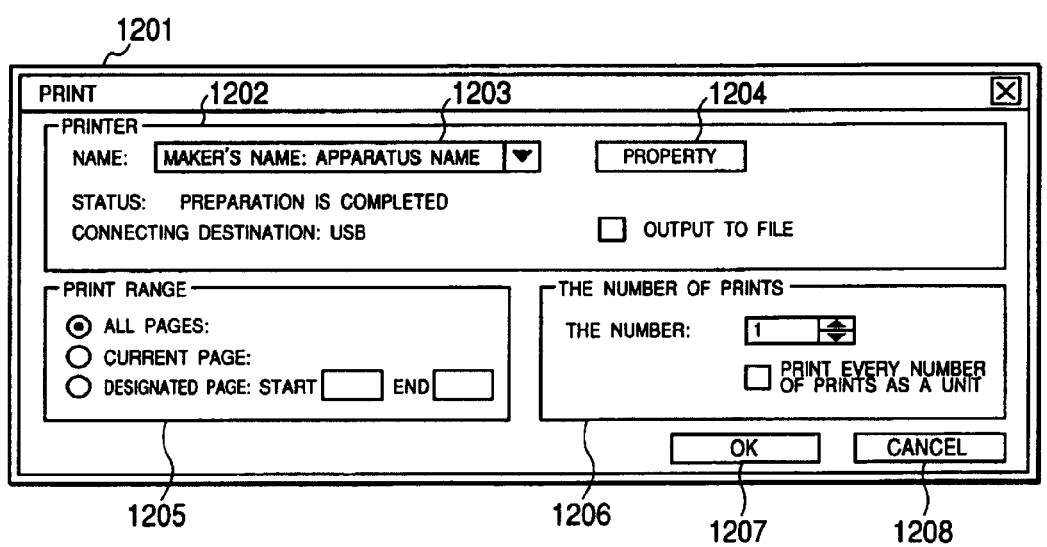
FIG. 12 is a diagram showing an example of a print dialog which is displayed when a print command is executed from an application in the first embodiment.

FIG. 12 is a diagram showing an example of a print dialog which is displayed when the print command is executed from the application in the first embodiment.

Reference numeral 1201 denotes a print dialog constructed by display areas 1202 to 1208.

Reference numeral 1202 denotes an area for displaying a name, a status, and the like of the printer serving as a target to perform the printing.

Reference numeral 1203 denotes a list for displaying maker's names and apparatus names of a plurality of printers which can be used. The user selects a desired printer from the list of this field. The printer set as a printer which is ordinarily used is displayed as a default.

Reference numeral 1204 denotes a button for displaying a property of the printer selected in the field 1203. In the case of performing detail setting including the type and size of the sheet and the print quality, the above setting can be performed by opening this property and detailed contents of the print setting can be also displayed.

Reference numeral 1205 denotes an area for displaying a print range. One of a mode to print all pages, a mode to print only the designated pages, and a mode to print only the page opened at present by the application can be selected.

Reference numeral 1206 denotes an area for displaying the number of sheets to be printed. The user can designate the number of sheets to be printed by inputting a desired numerical value.

Reference numeral 1207 denotes an "OK" button. If it is determined that there is no problem under the above set conditions, the printing is started by pressing the "OK" button.

Reference numeral 1208 denotes a "Cancel" button. If there is a problem under the above set conditions, the printing is stopped by pressing the "Cancel" button.

The display contents here are merely shown as an example and the apparatus can have an area for displaying the sheet setting which cannot be usually set unless the property is displayed. It should be noted that when the user tries to print, the printer driver is activated at certain timing.

It is presumed that the functions for performing the various settings and making the discrimination about the mismatch described so far are realized by program codes constructing the printer driver. However, a part or all of the functions can be realized by software such as OS (Operating System), application, or the like other than the printer driver. If those functions are supported by the OS, the contents of the invention described in the embodiment can be realized in every printer or its connecting environment instead of the specific printer.

Figure 13:
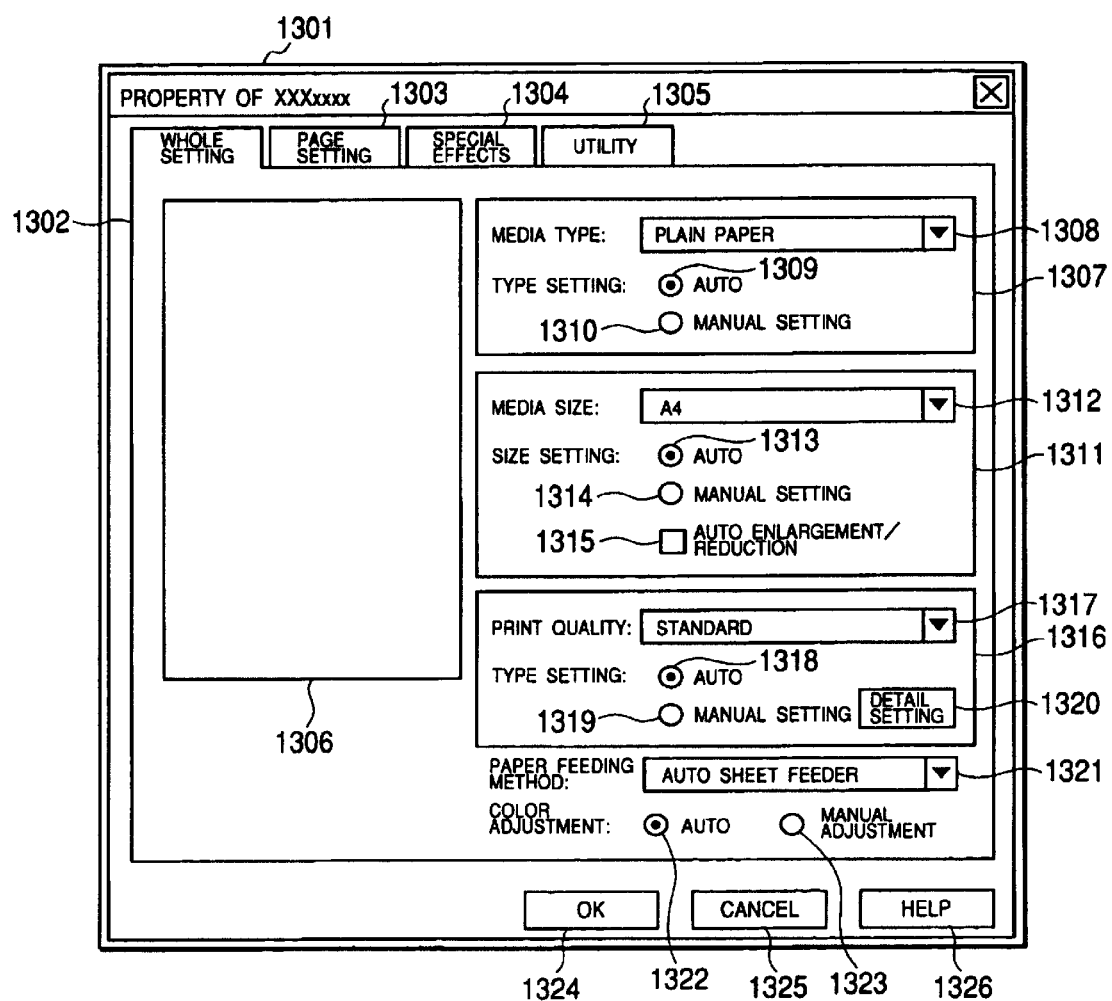
FIG. 13 is a diagram showing an example of a setting dialog which is displayed when a print mode is set and various sheet settings are executed in the first embodiment.

FIG. 13 is a diagram showing an example of a setting dialog which is displayed when a print mode is set and various sheet settings are executed in the first embodiment.

Reference numeral 1301 denotes a dialog for print setting. This dialog is constructed by display areas 1302 to 1326. This dialog is displayed by opening the property 1204 shown in FIG. 12. Since the number of items to be displayed is very large in the print setting, generally, the setting items are classified every content by using a tab sheet so that the user can easily see them. A tab is also used in the embodiment.

Reference numeral 1302 denotes a tab for whole setting. Contents regarding the whole printing are displayed. Its details will be explained hereinlater.

Reference numeral 1303 denotes a tab for page setting. Contents regarding various page settings such as size of sheet, printing direction, the number of prints, print layout (plural-page printing), and the like are displayed in this tab. At the same time, a change instruction or input of the set contents by the user is also received.

Reference numeral 1304 denotes a tab for special effects. A selecting display screen of a function which is used in the case of giving special effects such as various image modifications, sepia-tone, and the like to the image is displayed in this tab.

Reference numeral 1305 denotes a tab for a utility. A selecting display screen of a function such as adjustment, cleaning, or the like of a head is displayed in this tab.

Reference numeral 1306 denotes a simple display area for the whole setting. Not only character information but also set information is displayed in this area in a visual form.

Reference numeral 1307 denotes an area for displaying the set sheet type (media type).

Reference numeral 1308 denotes a field for displaying the sheet type. In the case of auto setting, which will be explained hereinlater, the sheet type specified on the basis of the sensing result is displayed in this field. If the media type shown in the table of FIG. 6 is arbitrarily designated by the user, it is selected from the list in this field. A new sheet can be added and inputted to the list.

Reference numeral 1309 denotes a check box which is selected in the case of automatically setting the sheet type. There is an exclusive relation between this check box and a check box for manual setting, which will be explained hereinlater, and one of them can be selected. If the check box 1309 is selected, the sheet type specified on the basis of the sensing result is displayed in the media type field 1308.

Reference numeral 1310 denotes a check box which is selected in the case of manually setting the sheet type. If this check box is selected, the user can arbitrarily select the sheet type. Even if the check box 1309 for auto setting was selected, when the media type is selected from the list in the media type field 1308, the manual setting is set and the check box 1310 is selected.

Reference numeral 1311 denotes an area for displaying the set sheet size (media size).

Reference numeral 1312 denotes a field for displaying the media size. In the case of auto setting, which will be explained hereinlater, the media size specified on the basis of the sensing result is displayed here. If the user arbitrarily designates the media size shown in the table of FIG. 7, it is selected from the list in this field. A new sheet size can be similarly added and inputted to this list.

Reference numeral 1313 denotes a check box which is selected in the case of automatically setting the sheet size. There is an exclusive relation between this check box and a check box for manual setting, which will be explained hereinlater, and one of them can be selected. If the check box 1313 is selected, the sheet size specified on the basis of the sensing result is displayed in the media size field 1312.

Reference numeral 1314 denotes a check box which is selected in the case of manually setting the sheet size. If this check box is selected, the user can arbitrarily select the sheet size. Even if the auto setting of 1313 was selected, when the media size is selected from the list in the media size field 1312, the manual setting is set and the check box 1314 is selected in a manner similar to the case of 1310 described above.

Reference numeral 1315 denotes a check box which is selected in the case of automatically enlarging/reducing. When this check box is selected, as described in the flowcharts of FIGS. 11A and 11B, even if the mismatch of the setting occurred between the sheet setting by the printer driver and the sheet setting specified by the application, a matching can be made by the setting on the driver side.

Reference numeral 1316 denotes an area for displaying the set print quality.

Reference numeral 1317 denotes a field for displaying the print quality. In the case of auto setting, the print quality which is optimum for the sheet type displayed in the media type field 1308 is automatically selected and set. In the case of manual setting, a plurality of print quality as disclosed in the tables for sheet reference shown in FIGS. 9 and 10 are displayed as a list and the user selects desired print quality from the list.

Reference numeral 1318 denotes a check box which is selected in the case of automatically setting the print quality. There is an exclusive relation between this check box and a check box for manual setting, which will be explained hereinlater, and one of them can be selected. If the check box 1318 is selected, the print quality specified on the basis of the set sheet type is displayed in the print quality field 1317.

Reference numeral 1319 denotes a check box which is selected in the case of manually setting the print quality. If this check box is selected, the user can arbitrarily select the print quality. Even if the auto setting of check box 1318 was selected, when the print quality is selected from the list in the print quality field 1317, the manual setting is set and the check box 1319 is selected in a manner similar to that mentioned above.

Reference numeral 1320 denotes a button which is used for setting the print quality in detail. By selecting this button, the display screen is shifted to a display screen for detail setting. Although the print quality which can be automatically set has been set to three stages in the embodiment, in the manual setting, it is presumed that the print quality of a larger number of levels can be set. However, since the print quality which can be selected has been specified in accordance with the sheet type, all of the prepared levels of the print quality cannot be set.

Reference numeral 1321 denotes a list for selecting a paper feeding method. The user selects either a manual feeding operation or an auto sheet feeder.

Reference numeral 1322 denotes a check box which is selected in the case of automatically making color adjustment. There is an exclusive relation between this check box and a check box for manual setting, which will be explained hereinlater, and one of them can be selected. If the check box 1322 is selected, the color adjustment is automatically made. If it is not selected, the color adjustment is manually made.

Reference numeral 1323 denotes a check box which is selected in the case of manually setting the color adjustment. If this check box is selected, the user can adjust an arbitrary color tone on a display screen for detail setting (not shown).

Reference numeral 1324 denotes an "OK" button. If the user determines that there is no problem under the above set conditions, the opened property is closed by pressing the "OK" button and the display screen is returned to the print dialog shown in FIG. 12.

Reference numeral 1325 denotes a "Cancel" button. When the user determines that there is no problem even if the set contents are returned to the initial setting after completion of the various settings, the property is closed by pressing the "Cancel" button and the print dialog shown in FIG. 12 is also closed.

Reference numeral 1326 denotes a "Help" button. If there is an obscure point about the contents with respect to the various print settings which are managed by the printer driver, details of the related setting are displayed by pressing this button.

Although not disclosed here, an "Update" button for updating the set contents can be added.

As mentioned above, the setting dialog has a display screen construction in which the items necessary for the user are collectively shown and the user can instantaneously confirm the contents of the print setting.

The setting operation is automated by selecting the auto setting mode prepared for the sheet setting or print quality setting shown in the diagram. At this time, the user can confirm the contents of the judgment and setting in the printer and the printer driver, thereby enabling communication with the user to be made. Thus, the printing system in which the erroneous printing is hardly executed and a preferable image can be formed while the intention of the user is preferentially satisfied can be realized.

Figure 14:
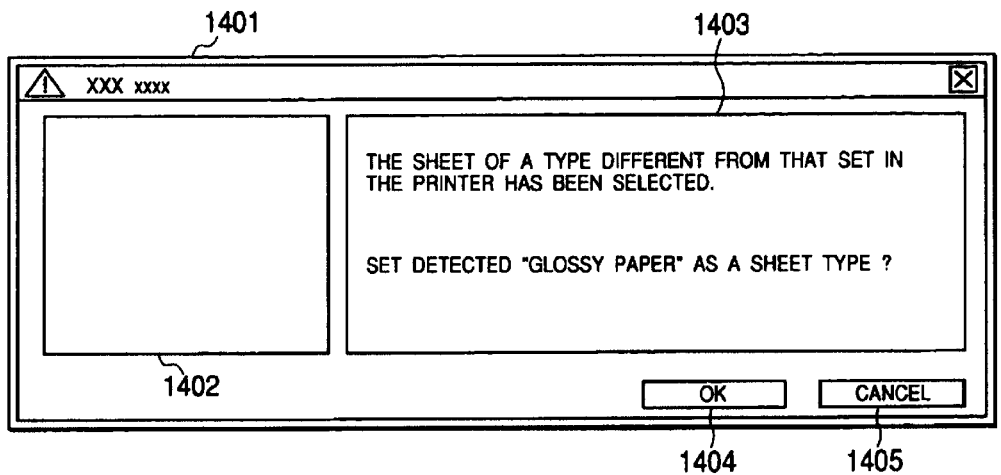
FIG. 14 is a diagram showing an example of a warning dialog which is displayed in the case where the media type set on the basis of a sensing result differs from the setting by the user in the first embodiment.

FIG. 14 is a diagram showing an example of a warning dialog which is displayed in the case where the media type specified on the basis of the sensing result differs from the setting by the user in the first embodiment.

Reference numeral 1401 denotes an example of a warning dialog constructed by display areas 1402 to 1405.

Reference numeral 1402 denotes an area for plainly expressing the intention of the warning. Not only character information but also an image such as an illustration or the like which can inform the meaning of the warning is displayed in this area.

Reference numeral 1403 denotes an area for displaying contents of the warning. The contents of the warning and contents to confirm which one of the setting of the media type specified on the basis of the sensing result and the setting by the user designation is selected are displayed in this area. If the user wants to preferentially select the setting by the driver, the user is made to confirm so as to select a detection result as shown in the diagram.

Reference numeral 1404 denotes an "OK" button. By pressing this "OK" button, the setting of the media type based on the sensing result confirmed in the area 1403 is preferentially selected.

Reference numeral 1405 denotes a "Cancel" button. By pressing this "Cancel" button, the setting of the media type arbitrarily designated by the user instead of the sensing result is preferentially selected.

As mentioned above, if there is a difference between the media type based on the sensing result and the setting by the user designation, this fact is notified to the user, thereby making the user determine which one of the settings is preferentially selected.

Figure 16:
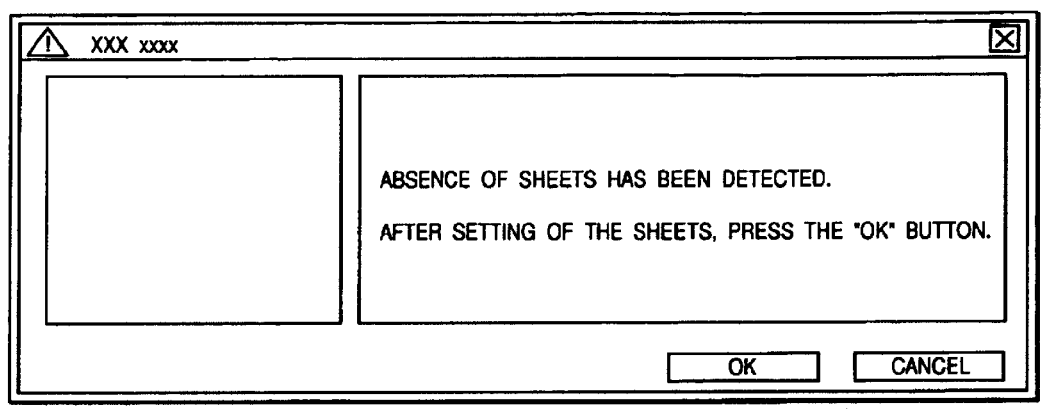
FIG. 16 is a diagram showing an example of a dialog which is displayed when the absence of the sheets is detected in the first embodiment.

FIG. 16 is a diagram showing an example of a dialog which is displayed when the absence of the sheets is detected in the first embodiment.

In this dialog, the image which plainly expresses the intention of the warning, the contents of the warning, and a procedure for setting the sheets and restarting the process in a state of the absence of the sheets as described in the flowcharts of FIGS. 11A and 11B are displayed.

Not only by displaying the detected result but also by showing a subsequent recovery procedure as mentioned above, a print environment which is gentle for the user can be provided.

Figure 17:
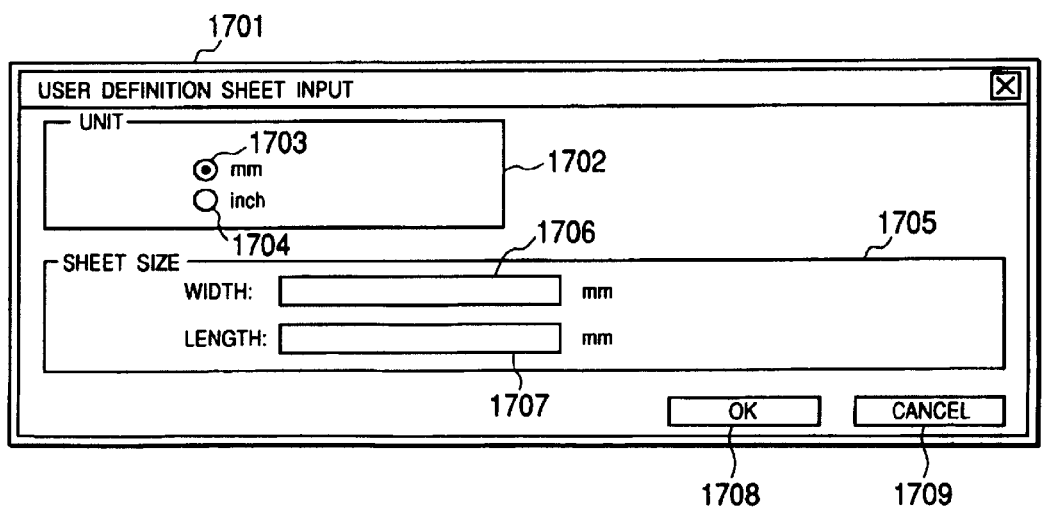
FIG. 17 is a diagram showing an example of an input dialog which is displayed when the user selects a sheet of an irregular size in the first embodiment.

FIG. 17 is a diagram showing an example of an input dialog which is displayed when the user selects the sheet of the irregular size in the first embodiment.

Reference numeral 1701 denotes an input dialog constructed by display areas 1702 to 1709.

Reference numeral 1702 denotes an area for selecting and displaying a unit of the value at the time when the user arbitrarily inputs the media size. It is now assumed that one of two unit systems "mm" and "inch" can be selected.

Reference numeral 1703 denotes a check box which is selected when "mm" is used as a unit of the input size. There is an exclusive relation between this check box and a check box indicative of the unit "inch", which will be explained hereinlater, and only one of them can be selected.

Reference numeral 1704 denotes a check box which is selected when "inch" is used as a unit of the input size.

Reference numeral 1705 denotes an area in which the user actually inputs the media size. In the embodiment, it is inputted by the pointing device such as keyboard, mouse, or the like. It can be inputted by an audio sound.

Reference numeral 1706 denotes a field for, specifying a length in the width (landscape) direction of the sheet in the media size.

Reference numeral 1707 denotes a field for specifying a length in the longitudinal (portrait) landscape direction of the sheet in the media size.

Reference numeral 1708 denotes an "OK" button. The inputted values are determined by pressing the "OK" button. After that, the values are reflected to the sheet setting.

Reference numeral 1709 denotes a "Cancel" button. By pressing the "Cancel" button, the size and values which are set at present are used without inputting values. If the irregular media size is selected, the setting of the media size cannot be finished unless some values are inputted and specified.

As mentioned above, the user can use the sheet of an arbitrary size. It is also possible to construct the apparatus in a manner such that the size setting which has been inputted and set once is stored by allocating its name and it can be used in the subsequent print setting.

Figure 18:
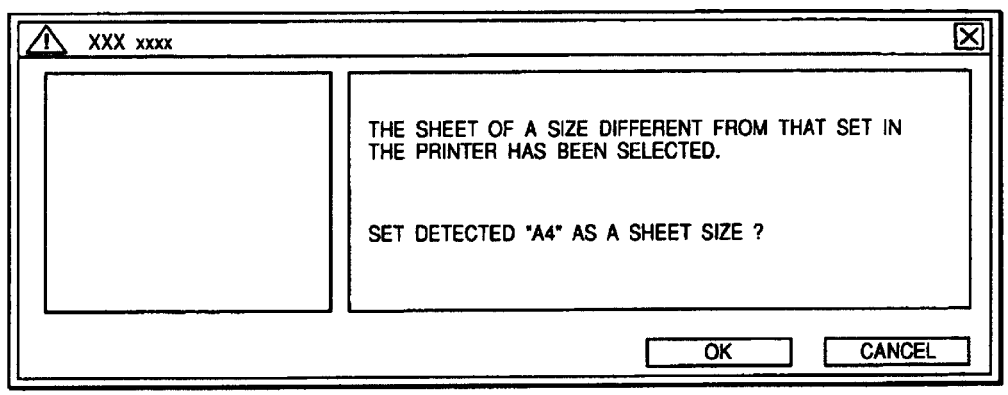
FIG. 18 is a diagram showing an example of a warning dialog which is displayed in the case where the media size differs from the setting by the user in the first embodiment.

FIG. 18 is a diagram showing a warning dialog which is displayed in the case where the media size differs from the setting by the user in the first embodiment.

In this dialog, the image which plainly expresses the intention of the warning, the contents of the warning, and contents for confirming whether the media size specified on the basis of the sensing result is used as print setting or not are displayed.

As mentioned above, if there is a difference between the setting of the media size based on the sensing result and the setting by the user designation, such a fact is notified to the user, thereby making the user determine which one of the settings is preferentially selected.

Figure 19:
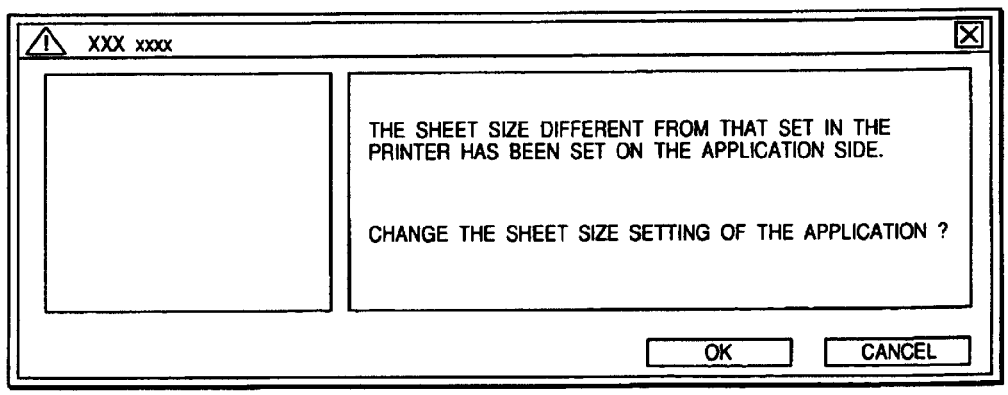
FIG. 19 is a diagram showing a warning dialog which is displayed in the case where a mismatch occurs between the media size and the size designated by the application in the first embodiment.

FIG. 19 is a diagram showing a warning dialog which is displayed in the case where it is determined that a mismatch occurred between the media size and the size designated by the application in the first embodiment.

In this dialog, the image which plainly expresses the intention of the warning, the contents of the warning, and contents for confirming whether the sheet size set by the printer driver is preferentially selected and the size setting on the application side is changed or not are displayed.

As mentioned above, if there is a difference between the setting of the media size by the driver and the setting specified by the application, such a fact is notified to the user, thereby making the user determine which one of the settings is preferentially selected.

It is possible to provide the printing system and method with excellent operability and convenience in which the information such as type, size, and the like of the sheet necessary for the sheet setting in the print setting is obtained in the state where the sheets have been set in the tray, cassette, or the like, that is, at the stage before the paper feed and used, so that the ink and the media are not wasted, the print setting suitable for the sheet can be automatically performed without burdening the user as described above. Further, a memory medium in which computer-readable program codes have been stored and software as program codes themselves can be provided.

Particularly, in the case where the creation of the print data and the control of the printer are performed on the data processing apparatus side of a high speed and high performance such as a PC or the like, the high-speed printing system of a low price can be constructed.

Further, it is possible to provide the printing system in which by presenting the sheet information to the user before the start of the printing and discriminating the mismatch between the print setting based on the sheet information obtained as a sensing result and the print quality which has arbitrarily been set by the user, the intention of the user is reflected more and the improper printing is reduced as much as possible.

Although the flow of the setting has been described on the assumption that the targets for the sensing have been set to the sheet type (media type) and the sheet size (media size) in the embodiment, even if a construction such that only the media type as one information is sensed is used, the functions serving as features of the embodiment such as auto setting of the print quality, notification to the user according to the discrimination result about the mismatch, and the like can be realized. That is, although the perfect automation of the print setting cannot be realized since the size cannot be automatically set, the objects of the invention can be sufficiently accomplished with respect to the setting of the print quality.

Second Embodiment

The second embodiment for realizing the invention will now be described with reference to the drawings.

A printing system for realizing the embodiment is fundamentally similar to that described in the first embodiment with respect to component elements of functional blocks. Since they have already been sufficiently described in the first embodiment, explanation of the similar portions is omitted here.

It is a feature of the second embodiment that the sheet specifying processing function and the table for sheet discrimination provided on the printer side in the first embodiment are provided on the data processing apparatus side. With respect to the portions different from the first embodiment, their contents will be explained with reference to a functional block diagram and diagrams of the whole process and control flow.

Figure 20:
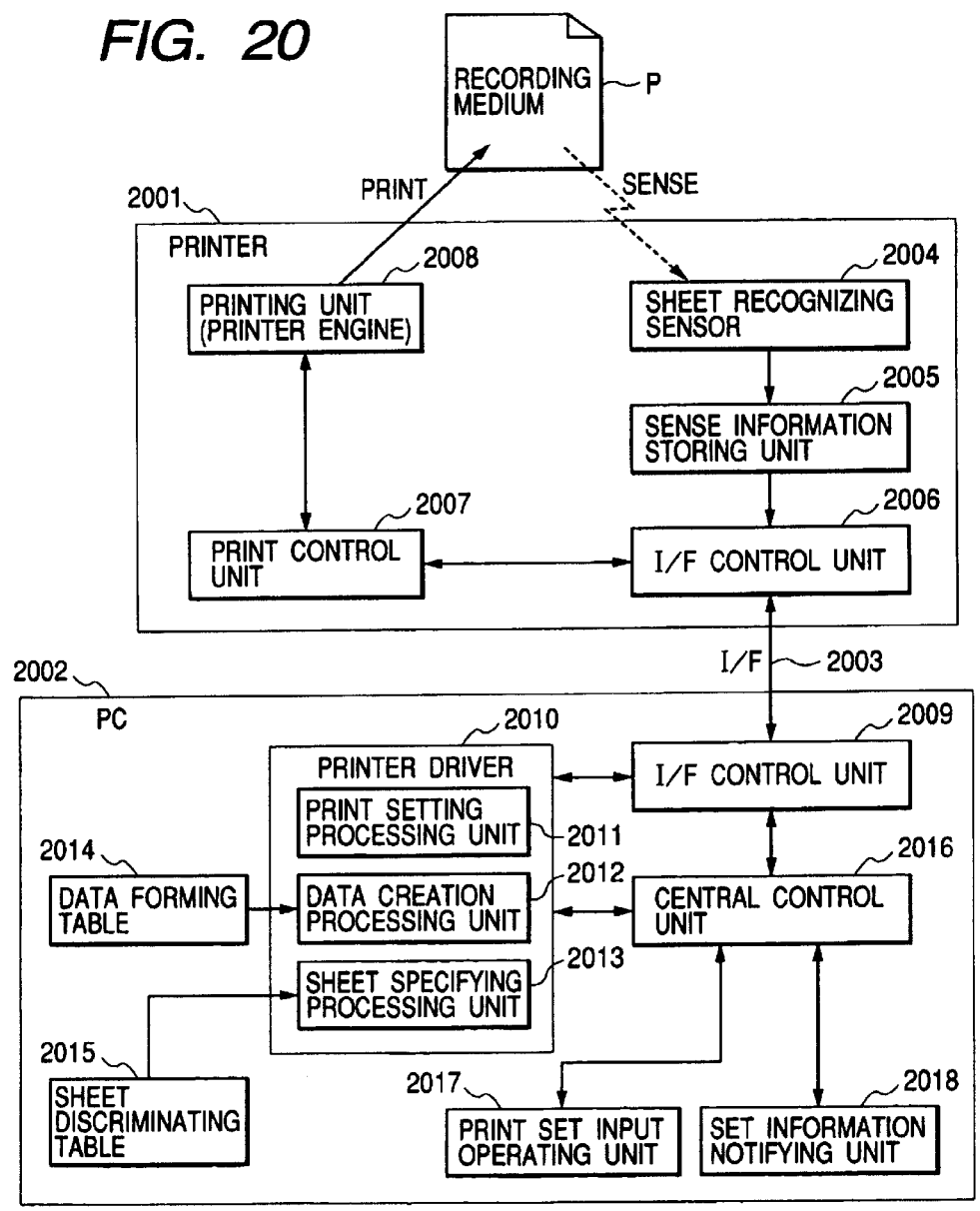
FIG. 20 is a functional block diagram of a printing system in the second embodiment.

FIG. 20 is a functional block diagram of the printing system in the second embodiment.

As mentioned in the above description, the second embodiment differs from the first embodiment with respect to a point that the sheet specifying processing unit 405 and the table 406 for sheet discrimination provided on the printer side are eliminated and their functions are installed in a printer driver 2010 in place of them.

Reference numeral 2001 denotes a color printer of the ink jet type for forming an image. This color printer is constructed by various functional blocks 2004 to 2008. Since those various functional blocks have already been described in the first embodiment, their description is omitted here. An output of a media sensor 2004 is directly stored into a sense information storing unit 2005. That is, the printer side holds only the data necessary for specifying the sheet.

Reference numeral 2002 denotes a PC for controlling the color printer 2001. The PC 2002 is constructed by various functional blocks 2009 to 2018. Since contents of those various functional blocks excluding the printer driver 2010 and tables associated therewith have already been described in the first embodiment, their description is omitted here.

Reference numeral 2003 denotes a communication interface for connecting the printer 2001 and the PC 2002.

Reference numeral 2010 denotes the printer driver serving as software for performing various settings for printing, creation of the print data, and control of the printer on the PC 2002. The printer driver 2010 is constructed by various functional blocks 2011 to 2015.

Reference numeral 2013 denotes a sheet specifying processing unit for specifying the sheet on the basis of an output result of the media sensor 2004. In the embodiment, the type and size of the sheet are specified by using a table 2015 for sheet discrimination. Output information from the media sensor 2004 which is necessary when the sheet is specified is sent to the PC 2002 via the I/F 2003. The printer driver executes a sheet specifying process on the basis of the received sheet information.

As mentioned above, the printing system of the invention Is constructed by: the color printer for which the media sensor has been provided and which has the function for outputting the parameters to specify the sheet; the data processing apparatus such as a PC or the like having the function for specifying the sheet on the basis of the sheet information obtained on the printer side and the function for forming the print data and the control command on the basis of the instruction or selection of the user; and the bidirectional communication interface for connecting those two apparatuses.

According to such a construction, since the sheet specifying processing unit is provided on the data processing apparatus side instead of the printer side, the parameters or discrimination reference for specifying the sheet can be easily changed by updating the driver software.

Figure 21:
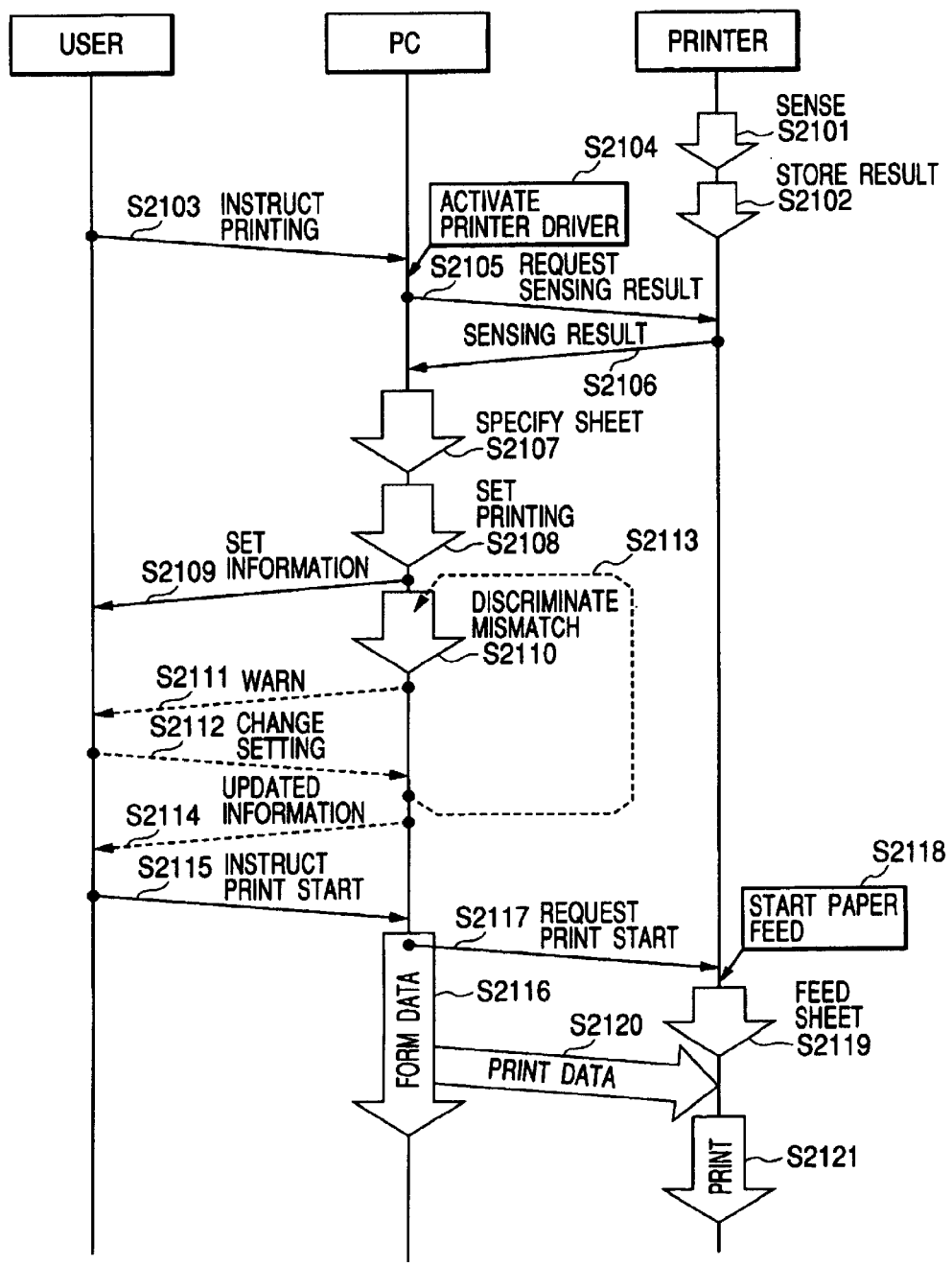
FIG. 21 is a diagram showing a flow of processes and control in the case where there is a print instruction in the second embodiment.

FIG. 21 is a diagram showing a flow of the whole process and control in the case where there is a print instruction in the second embodiment.

This embodiment differs from the first embodiment with respect to a point that although the process to specify the sheet set on the printer side has been finished before the instruction of the print request is made by the user in the first embodiment, such a specifying process is executed after the instruction of the request in the second embodiment. Specifically speaking, the sheet specifying process which is executed after the sensing operation in step 2101 is executed just before the print setting in step 2108.

According to such control, since the data such as discrimination parameters which are obtained by the output of the media sensor that is used to specify the sheet is larger than an information amount after completion of the sheet specifying process, it causes an increase in memory for storing the sensing result in step 2102. Since the sheet specifying process S2107 is executed on the PC side, a total print processing time and a load of the process also increase more than those in the first embodiment. However, such increases do not cause a large problem but rather by using such a construction, there is an advantage such that a flexible countermeasure such as a change in discriminating table or discriminating algorithm which is used when the discrimination to specify the sheet is made or the like can be taken as compared with the case where such a change is realized on the printer side.

Figure 22:
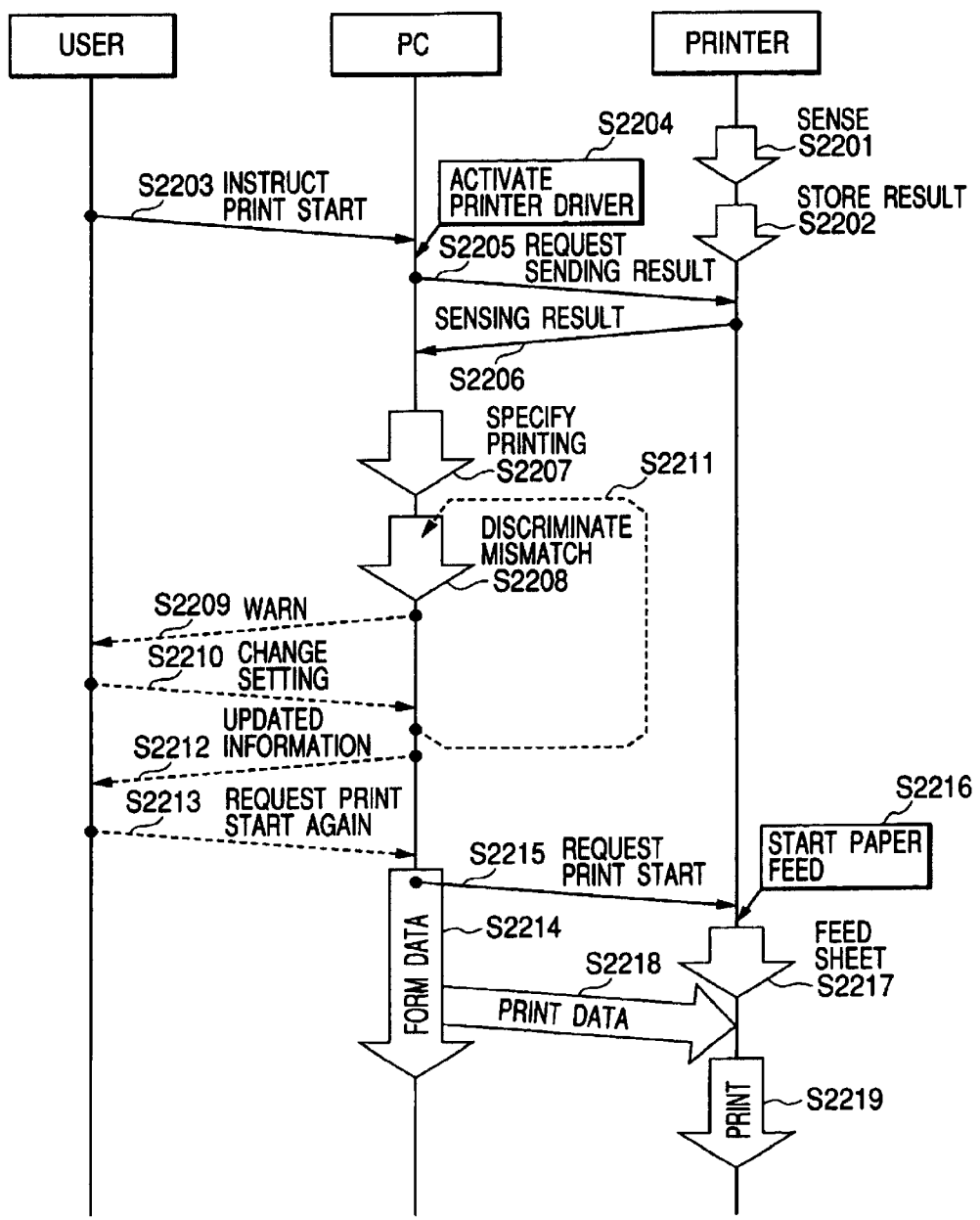
FIG. 22 is a diagram showing a flow of processes and control in the case where there is no print instruction in the second embodiment.

FIG. 22 is a diagram showing a flow of the whole process and control in the case where there is no print instruction in the second embodiment.

This embodiment differs from the first embodiment with respect to a point that the sheet specifying process is executed not after the sensing operation in step 2201 but just before the mismatch discrimination in step 2208. A flow of other processes which are executed until the mismatch discrimination is made after the reception of the print start instruction is substantially the same as that in the first embodiment.

As mentioned above, also in the case where the printing is directly started without displaying the detail setting display screen of the printing from the application which is being operated on the PC, by holding the sensing result (data) of the media sensor before the activation of the printer driver in a manner similar to that described in FIG. 21, a sufficient effect can be obtained.

In a manner similar to the first embodiment, according to the second embodiment, since the sheet information is held before the activation of the printer driver, the subsequent print time is reduced. Since the print data can be formed on the PC side, the printer main body can be simply constructed at a low price. Further, since the mismatch with the user setting is discriminated in the driver and the communication with the user is made, the printing system to which the intention of the user is maximally reflected and in which the erroneous print setting is hardly executed can be constructed. Thus, the user is released from the tiring operation, the wasteful consumption of the ink and media can be prevented, and an efficient print environment can be obtained.

Particularly, in the second embodiment, since the sheet specifying process is executed on the data processing apparatus side instead of the printer side, its processing contents and the discrimination reference can be easily changed. Although it is difficult to cope with the recognition or the like of a new media on the printer main body side, a countermeasure against such a tiring process can be realized merely by updating the printer driver on the data processing apparatus side.

Third Embodiment

The third embodiment to realize the invention will be described with reference to the drawings.

Also in a printing system for realizing this embodiment, component elements of functional blocks are not fundamentally different from those described in the first embodiment. Since they have already been sufficiently described in the first embodiment, overlapped explanation about similar portions is omitted here.

It is a feature of the third embodiment that although the media sensing operation was executed before the print request is instructed in the first and second embodiments, it is executed after the instruction of the print, request is made. Contents about portions different from those of the first embodiment will be described with reference to a diagram of the whole process and a control flow.

Figure 23:
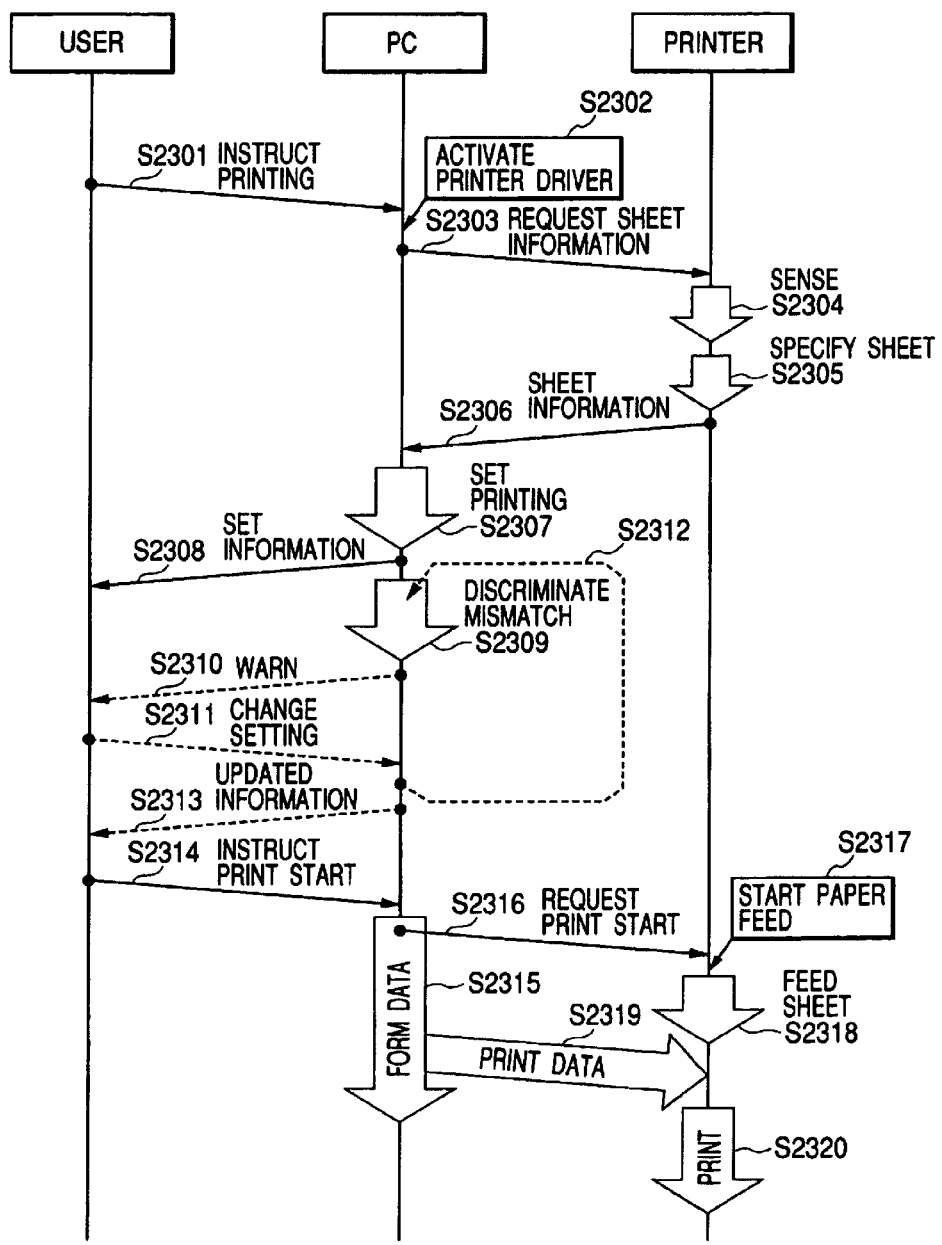
FIG. 23 is a diagram showing a flow of processes and control in the case where there is a print instruction in the third embodiment.

FIG. 23 is a diagram showing a flow of the whole process and control in the case where there is a print instruction in the third embodiment.

This embodiment differs from the first embodiment with respect to a point that although the operation to sense the sheet set in the printer side has been executed before the instruction of the print request is made by the user and, after completion of the sheet specifying process based on it, the sheet information has been stored in the first embodiment, it is executed after the instruction of the print request in the third embodiment. Specifically speaking, the sensing operation and the sheet specifying process executed before the instruction of the print request in step 2301 are executed after a request for obtaining the sheet information in step 2303 was received.

According to such control, since the sheet information is not grasped at a point when the print request is made, the user has to wait for a time which is required for the obtaining operation of the sheet information by the media sensor. However, if a time which is required for the sensing operation and the sheet specifying process is sufficiently short, such a waiting time is not a large problem. Rather by using such a construction, there is a large effect such that the information of the sheet set in the printer can be certainly obtained at the timing when the user executes the printing. Since the information of the specified sheet discriminated on the basis of the sensing result is immediately returned to the PC, there is an advantage such that the storing operation of the sheet specifying result which is necessary in the first embodiment is omitted and a memory space for storing such information is unnecessary.

Figure 24:
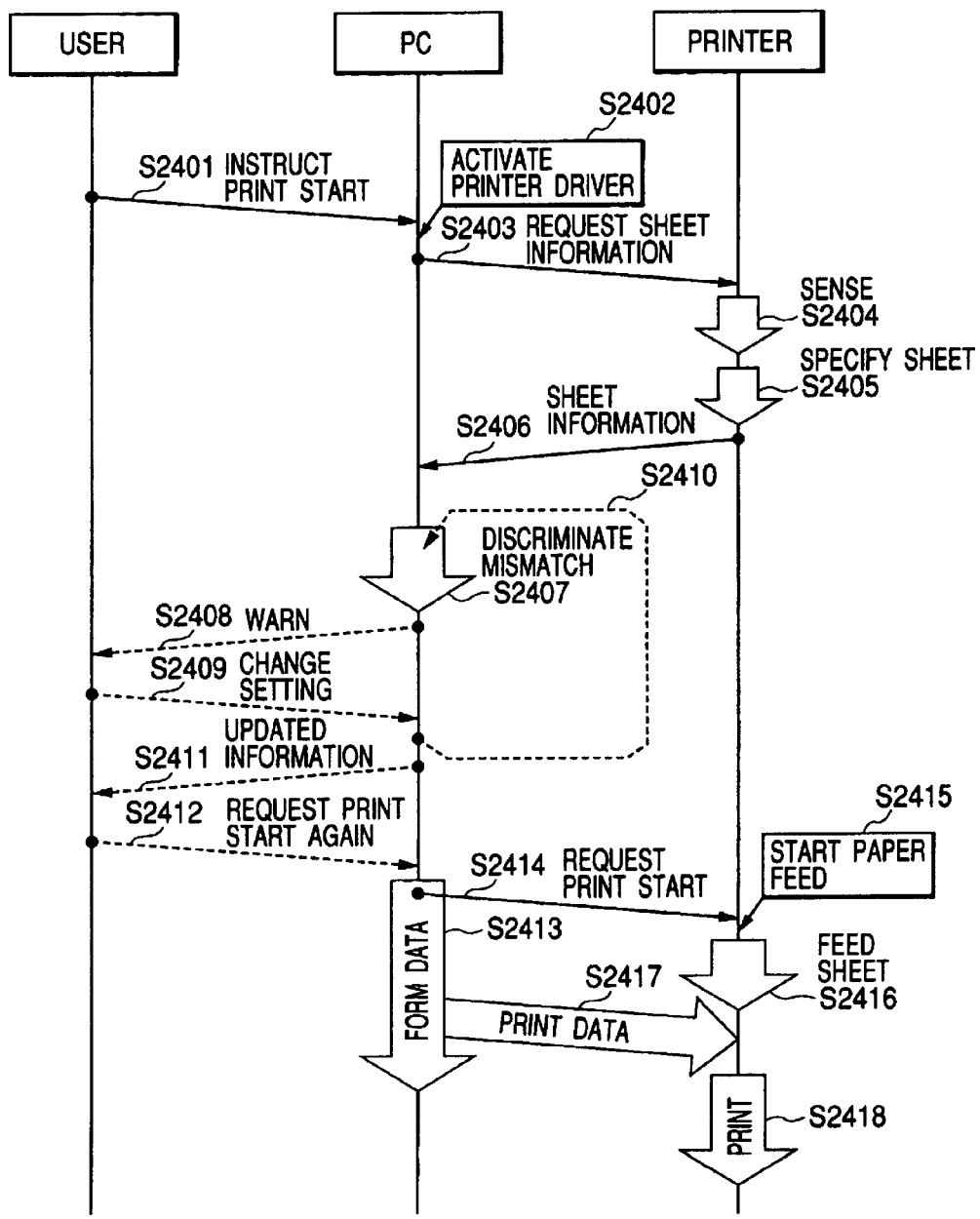
FIG. 24 is a diagram showing a flow of processes and control in the case where there is no print instruction in the third embodiment.

FIG. 24 is a diagram showing a flow of the whole process and control in the case where there is no print instruction in the third embodiment.

This embodiment differs from the first embodiment with respect to a point that the sensing operation and the sheet specifying process are executed not before the instruction of the print request in step 2301 but after the reception of the obtaining request of the sheet information in step 2303 in a manner similar to the case in the description in FIG. 23. A flow of other processes which are executed until the mismatch discrimination is made after the reception of the sheet information is substantially the same as that in the first embodiment.

As mentioned above, even in the case of directly starting the printing without displaying the detail setting display screen of the printing from the application which is being operated on the PC, a sufficient effect can be obtained in a manner similar to that described in FIG. 23.

Unlike the first embodiment, the sheet information is obtained after the activation of the printer driver in the third embodiment. However, since the print data can be formed on the PC side in a manner similar to the first embodiment, the printer main body can be simply constructed at a low price. Further, since the mismatch with the user setting is discriminated in the driver and the communication with the user is made, the printing system to which the intention of the user is maximally reflected and in which the erroneous print setting is hardly executed can be similarly constructed. Thus, the user is released from the tiring operation, the wasteful consumption of the ink and media can be prevented, and an efficient print environment can be obtained.

Particularly, in the third embodiment, since the obtaining operation of the sheet information is executed after the instruction of the print request was made by the user, the information of the sheet set in the printer can be obtained at the just timing when the printing is executed. This means that an error such that the sheet information differs depending on the setting timing of the sheet can be prevented. Since the information of the specified sheet discriminated on the basis of the sensing result is immediately returned to the PC after the sheet information was requested, the storing operation of the sheet specifying result is omitted and the memory space for storing such information is unnecessary.

Fourth Embodiment

The fourth embodiment to realize the invention will be described with reference to the drawings.

Also in a printing system for realizing this embodiment, component elements of functional blocks are not fundamentally different from those in the printing system described in the first embodiment. Since they have already been sufficiently described in the first embodiment, overlapped explanation about similar portions is omitted here.

It is a feature of the fourth embodiment that the sheet specifying processing function provided on the printer side is provided on the data processing apparatus side in a construction similar to that in the third embodiment. That is, it corresponds to a construction obtained by combining the second and third embodiments. With respect to such a portion different from that of the third embodiment, its contents will be described with reference to a diagram of the whole process and control flow.

Figure 25:
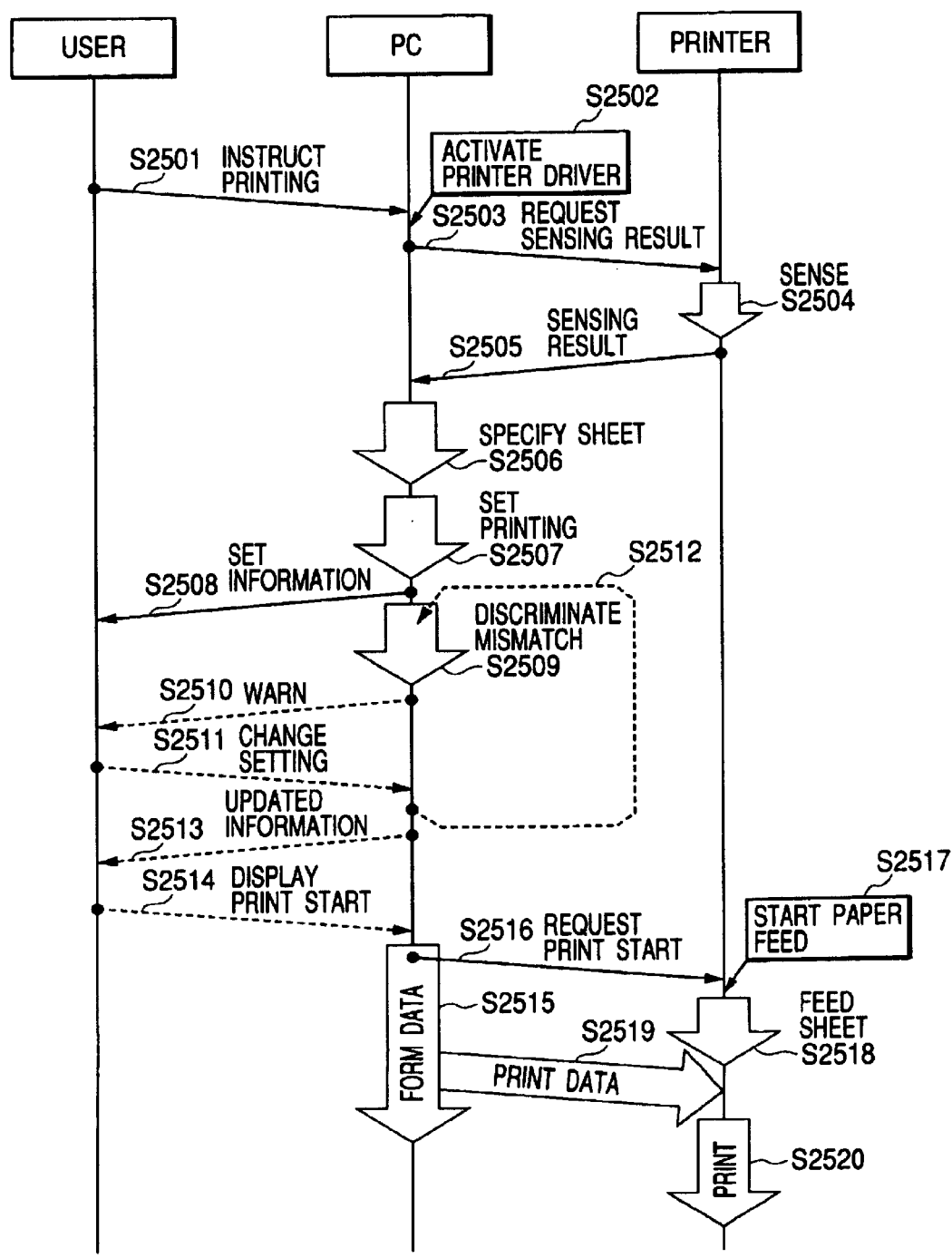
FIG. 25 is a diagram showing a flow of processes and control in the case where there is a print instruction in the fourth embodiment.

FIG. 25 is a diagram showing a flow of the whole process and control in the case where there is a print instruction in the fourth embodiment.

This embodiment differs from the third embodiment with respect to a point that the sheet specifying process S2506 which is executed after the sensing operation S2504 of the sheet set in the printer side is executed on the PC side instead of the printer main body side.

By such control, the information of the sheet set in the printer can be certainly obtained at the timing when the user executes the printing and effective use of the memory owing to the omission of the storing operation of the sheet specifying result can be realized. It is also possible to flexibly cope with a new media which enables the contents of the specifying process to be updated.

Figure 26:
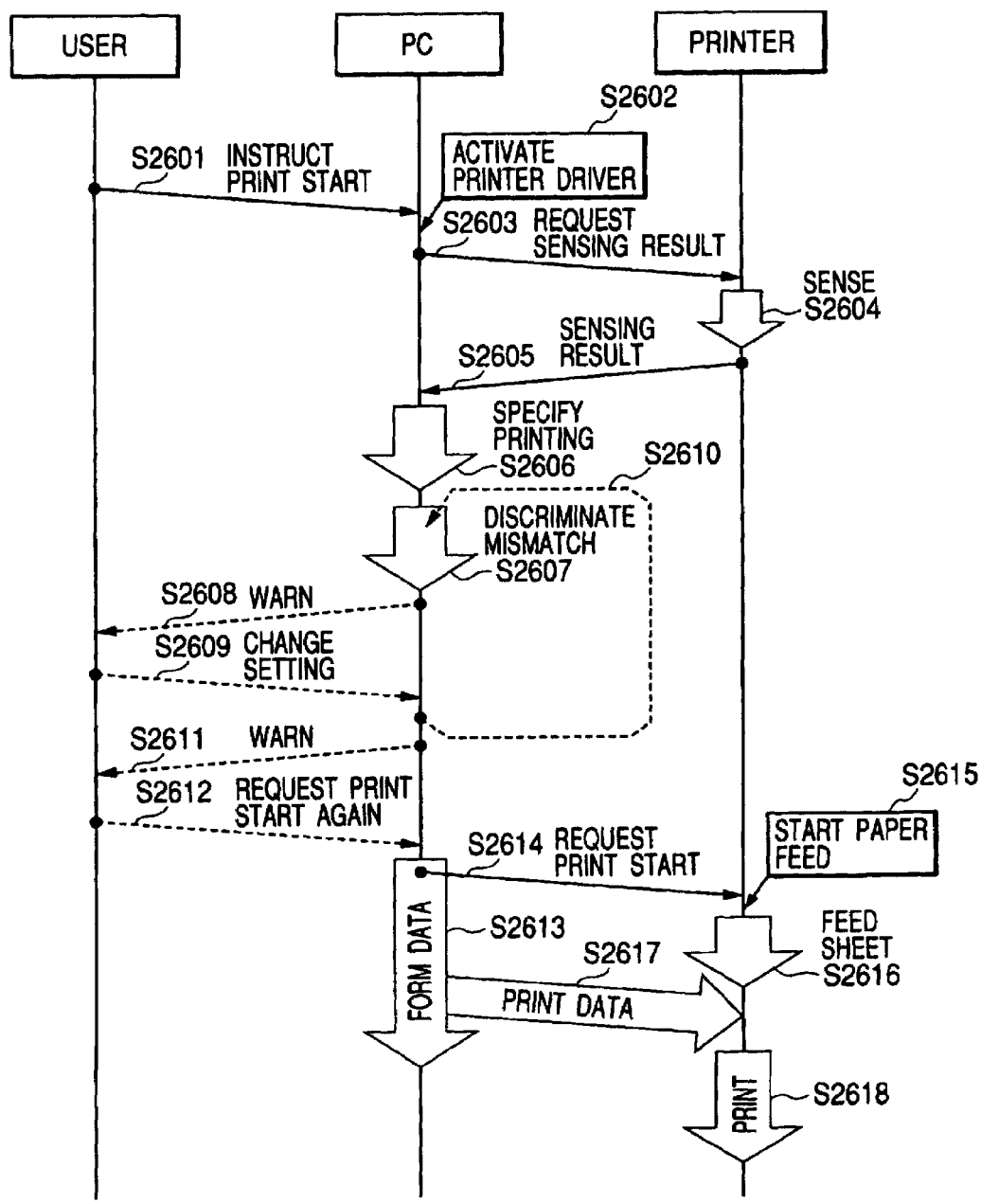
FIG. 26 is a diagram showing a flow of processes and control in the case where there is no print instruction in the fourth embodiment.

FIG. 26 is a diagram showing a flow of the whole process and control in the case where there is no print instruction in the fourth embodiment.

This embodiment differs from the third embodiment with respect to a point that the sheet specifying process S2606 is executed on the PC side in a manner similar to the case described in FIG. 25. Also with respect to the case of directly starting the printing without displaying the detail setting display screen of the printing from the application which is being operated on the PC, a sufficient effect can be obtained in a manner similar to that described in FIG. 25.

In the fourth embodiment, the sheet information is obtained after the activation of the printer driver in a manner similar to the third embodiment. Since the print data can be similarly formed on the PC side, the printer main body can be simply constructed at a low price. Further, since the mismatch with the user setting is discriminated in the driver and the communication with the user is made, the printing system to which the intention of the user is maximally reflected and in which the erroneous print setting is hardly executed can be constructed. Thus, the user is released from the tiring operation, the wasteful consumption of the ink and the media can be prevented, and the efficient print environment can be obtained.

Particularly, in the embodiment, the information of the sheet set in the printer can be obtained at the just timing for printing and it is also possible to flexibly cope with a new media.

Fifth Embodiment

The fifth embodiment to realize the invention will be described with reference to the drawings.

Figure 27:
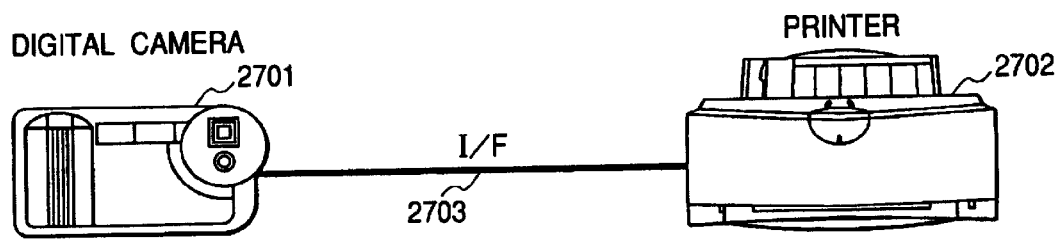
FIG. 27 is a diagram showing a construction of a printing system in the fifth embodiment.

FIG. 27 is a diagram showing a construction of a printing system in the fifth embodiment.

Reference numeral 2701 denotes a digital camera for forming a digital image by an image pickup device such as CCD or CMOS. The digital camera 2701 has not only an image pickup function but also a function for forming data to print the photograph images by a printer directly connected to this digital camera and controlling the connected printer. This digital camera also has a function for receiving an instruction or input from the user regarding the print setting and displaying set contents.

Reference numeral 2702 denotes a color printer connected to the digital camera 2701. An image is formed on the basis of the print data formed by the digital camera 2701 and the control. A type of color printer is not limited so long as multivalue data can be processed in the printer main body.

Reference numeral 2703 denotes a communication interface for connecting the digital camera 2701 and the color printer 2702. Generally, a serial interface of a small connector shape is used. Although a plurality of types of interfaces such as USB, IEEE1394, IrDA, IEEE802.11b, Bluetooth, and he like are presumed, any interface can be used irrespective of the wire or wireless manner so long as bidirectional communication is realized. Further, it is also possible to use a construction such that after a photographed image was recorded into a memory medium such as a memory card or the like built in the digital camera 2701, the memory card itself is removed and inserted into a slot of the printer main body, and the printing is performed. Also, a type of memory card in such a case is not limited.

The "printing system" mentioned here is not a single apparatus but has a construction such that the digital camera and the color printer for forming the image are connected by the specific bidirectional interface or a function corresponding thereto.

Figure 28:
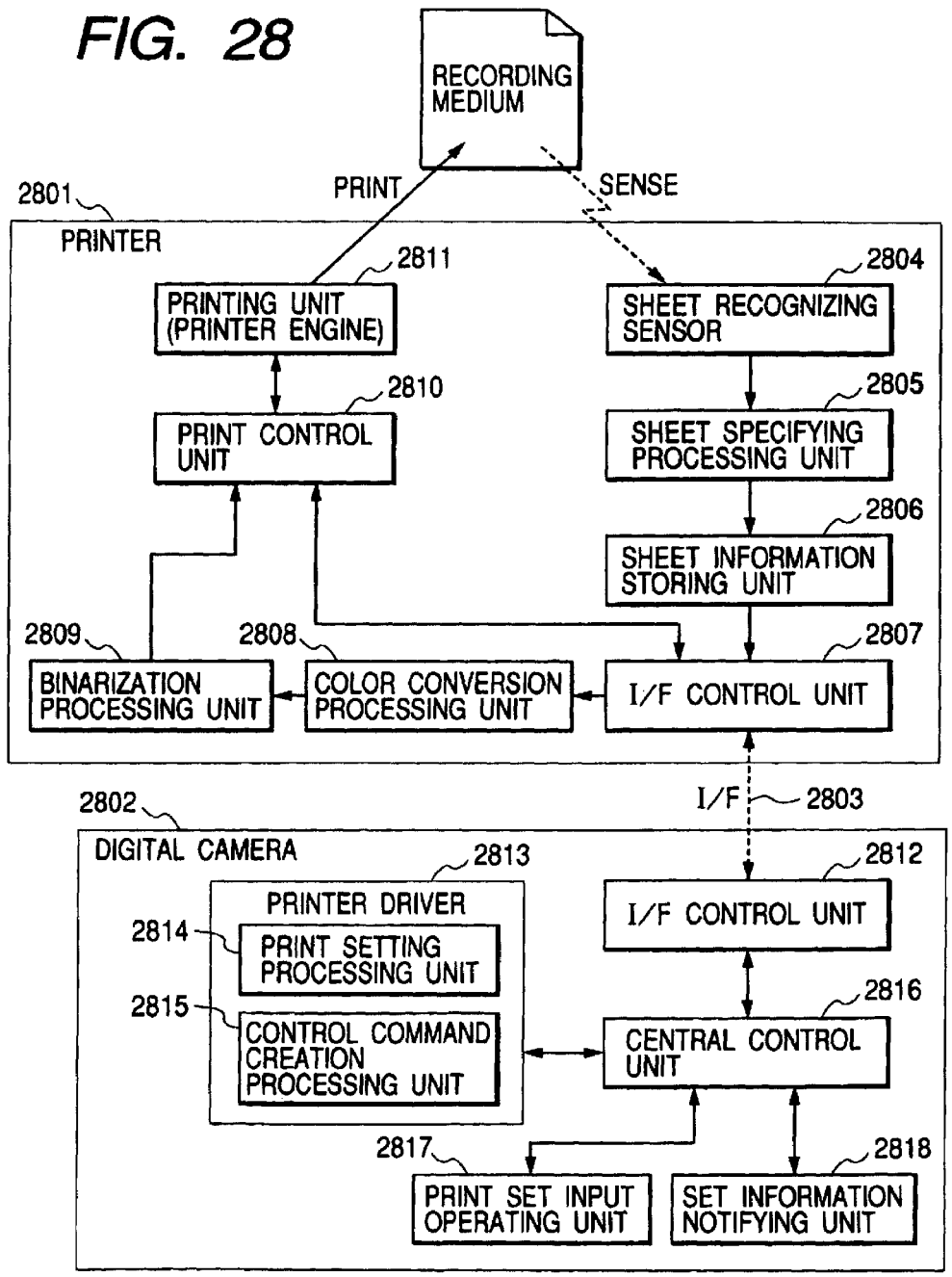
FIG. 28 is a functional block diagram in the printing system in the fifth embodiment.

FIG. 28 is a functional block diagram in the printing system in the fifth embodiment.

Reference numeral 2801 denotes a color printer for forming an image. A printer of the ink jet type is presumed here. This color printer is constructed by various functional blocks 2804 to 2811.

Reference numeral 2802 denotes a digital camera for transmitting image data to the color printer 2801. This digital camera is constructed by various functional blocks 2812 to 2818. In both of the color printer 2801 and the digital camera 2802, functions which are considered to be particularly unnecessary when explaining a feature of the embodiment are omitted here.

Reference numeral 2803 denotes a communication interface for connecting the printer 2801 and the digital camera 2802. Bluetooth as a wireless standard using a band of 2.4 GHz is presumed here.

Reference numeral 2804 denotes a sheet recognizing sensor (media sensor) for obtaining information to specify a type and a size of the recording medium P. It is assumed that the recording media P have been stacked in a paper feed tray, a cassette, or the like provided for the printer 2801. Since explanation about means for specifying the type and size of the sheet is similar to that in the first embodiment, it is omitted here.

Reference numeral 2805 denotes a sheet specifying processing unit for specifying the sheet on the basis of an output result of the media sensor 2804. In the embodiment, the type and size of the sheet are specified by a numerical value arithmetic operation using output values of the sensor as parameters.

Reference numeral 2806 denotes a sheet information storing unit for storing the information regarding the sheet specified by the sheet specifying processing unit 2805. A plurality of sheet information can be stored together with its history.

Reference numeral 2807 denotes an I/F control unit having an interface function of the printer 2801. Since Bluetooth is presumed as an interface here, it is assumed that this I/F control unit comprises a base band chip, an RF module, and a link controller. By this I/F control unit, transmission of the sheet information, reception of the print data and control command, and the like are performed. Status information such as error generated in the printer main body, communication status, and the like is also returned to the digital camera 2802 if it is requested.

Reference numeral 2808 denotes a color conversion processing unit for converting the color image data of RGB multivalues sent from the digital camera 2802 into data of YMCK. At this time, various image adjustments are also made.

Reference numeral 2809 denotes a binarization processing unit for converting the image data converted into the multivalue data of YMCK by the color conversion processing unit 2808 into binary data. Although there are many binarizing methods, it is assumed that an error diffusion method is used here.

Reference numeral 2810 denotes a print control unit for developing the data to be printed into a printer engine. The printer engine Is controlled by using the print data binarized in the binarization processing unit 2809 in accordance with a command for print control sent from the digital camera 2802. Specifically speaking, various control which are changed in accordance with characteristics of the sheet, for example, control of an implant amount of the ink and a change in the number of paths are executed.

Reference numeral 2811 denotes a printing unit which is also called a printer engine. This printer engine executes the printing onto the recording medium P on the basis of the print data developed by the print control unit 2810.

Reference numeral 2812 denotes an I/F control unit having an interface function of the digital camera 2802. This I/F control unit is constructed by a controller of Bluetooth. A partial function can be also realized by firmware.

Reference numeral 2813 denotes a printer driver serving as software for performing various settings for printing, creation of the print data, and control of the printer on the digital camera 2802. This printer driver is constructed by various functional blocks 2814 and 2815. Unlike the case of the PC described in the first embodiment, another software is not constructed as a printer driver but the printer driver functions as a part of firmware function in the digital camera.

Reference numeral 2814 denotes a print setting processing unit for performing various print settings including the setting of the sheet, the setting of the print quality, and the like. This print setting processing unit has a function for receiving an instruction or an input from the user and displaying or notifying set contents. This functional block is a fundamental portion of the invention and has a function for automatically performing the sheet setting on the basis of the sheet information sent from the printer 2801. Contents regarding the auto setting function of the printing including the sheet setting and the discrimination about the occurrence of the mismatch are similar to those in the first embodiment.

Reference numeral 2815 denotes a creation processing unit of the print data. Specifically speaking, this creation processing unit forms a command for printer control to make the print control.

Reference numeral 2816 denotes a central control unit for controlling various functions of the digital camera 2802. The functions which the CPU has correspond to them.

Reference numeral 2817 denotes a print set input operating unit constructed by a button for reflecting the intention of the user to the print setting and the like. In the case of the digital camera, unlike the PC, both of the operating unit and the display unit are small and a button for inputting is often used also to realize another function.

Reference numeral 2818 denotes a set information notifying unit for notifying the user of the print setting. Use of a liquid crystal display apparatus provided for previewing the photographed images or displaying a menu is presumed here.

As mentioned above, the printing system of the invention is constructed by: the color printer for which the media sensor is provided and which has the function for specifying the sheet and the function for converting the multivalue image data into the binary data for printing; the digital camera having the function for forming the image data and the control command on the basis of the sheet information specified on the printer side and the instruction or selection made by the user; and the bidirectional communication interface for connecting those two apparatuses.

Figure 29:
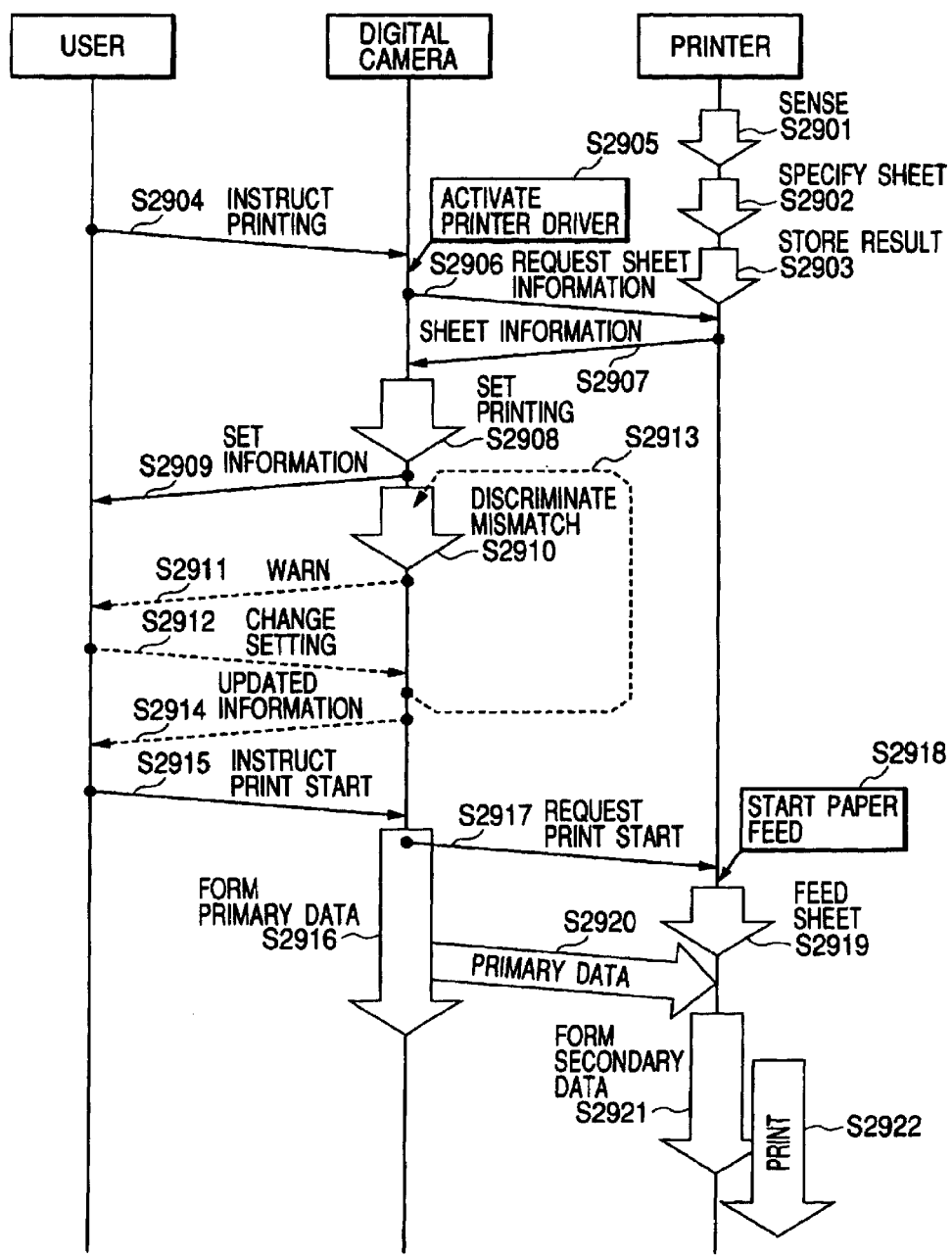
FIG. 29 is a diagram showing a flow of processes and control in the case where there is a print instruction in the fifth embodiment.

FIG. 29 is a diagram showing a flow of the whole process and control in the case where there is a print instruction in the fifth embodiment.

This embodiment differs from the first embodiment with respect to a point that although the creation of the binary data which can be immediately used on the printer side has been performed on the data processing apparatus side in the first embodiment, conversion from the multivalue data including the image process is performed on the printer side in the fifth embodiment.

Since contents of processes in steps 2901 to 2915 are similar to those in steps 101 to 115 in FIG. 1, respectively, their detailed explanation is omitted here. During this period of time, the sheet information is obtained, a mismatch is discriminated, and the user issues the final print start instruction. A construction in which the sheet information is obtained and held before the user starts the printing is also similar to that in the first embodiment.

In step 2916, the printer driver on the digital camera receives the print start instruction and forms primary data corresponding to the print setting. This embodiment differs from the first embodiment with respect to a point that, in this system, the creation of the print data according to the sheet type is executed in the printer main body instead of the digital camera side as a data processing apparatus. In the digital camera, only the creation of the print data which does not depend on the sheet type is executed. However, the control commands according to the sheet type are formed. Specifically speaking, since various image processes such as color conversion, binarization, and the like are executed in the printer main body, a command for positioning a print object, a command for printer control suitable for the sheet, and the like are formed. When image data of a photograph or the like is printed, the multivalue data of RGB is transmitted as it is to the printer.

In step 2917, a print start request is made to the printer by the digital camera.

In step 2918, a paper feed is started in response to the print start request.

In step 2919, the paper feeding operation is executed in response to the start of the paper feed in step 2918. At this time, the sheet is conveyed to a position where the printing is possible.

In step 2920, the primary data formed in step 2916 is transmitted to the printer.

In step 2921, secondary data according to the corresponding sheet type is formed on the basis of the control command formed in step 2916. Specifically speaking, processes for converting the transmitted RGB data into YMCK data and converting the multivalue data into the binary data are executed.

In step 2922, the printer sends the print data (secondary data) formed by itself to the printer engine and prints. At this time, print control suitable for the sheet information is also made.

According to such control, since it is necessary to process the multivalue data on the printer main body side, it is necessary that a higher-speed arithmetic operation processing apparatus or dedicated hardware is provided on the printer side. Although it is disadvantageous in terms of costs, if it is considered as a printing system, it is sufficiently practical because the construction in which the PC having the high processing function is used as a data processing apparatus like the first embodiment is not used. This is because if it is intended to provide the printing function for a general digital camera, it is very difficult that various image processes depending on the type of printer are executed by the digital camera. It is necessary that many printer profiles are held on the digital camera side and a data process is executed at a high speed similar to that of the PC, and unlike the PC, the profile cannot be easily updated. Rather by using such a construction, similar effects can be also obtained in a printing system in which a device without high processing ability like a PC is used as a data processing apparatus. Also as compared with the conventional system, by previously obtaining the sheet information, the printing system to which the intention of the user is maximally reflected and in which the unpreferable printing is hardly executed can be constructed.

Figure 30:
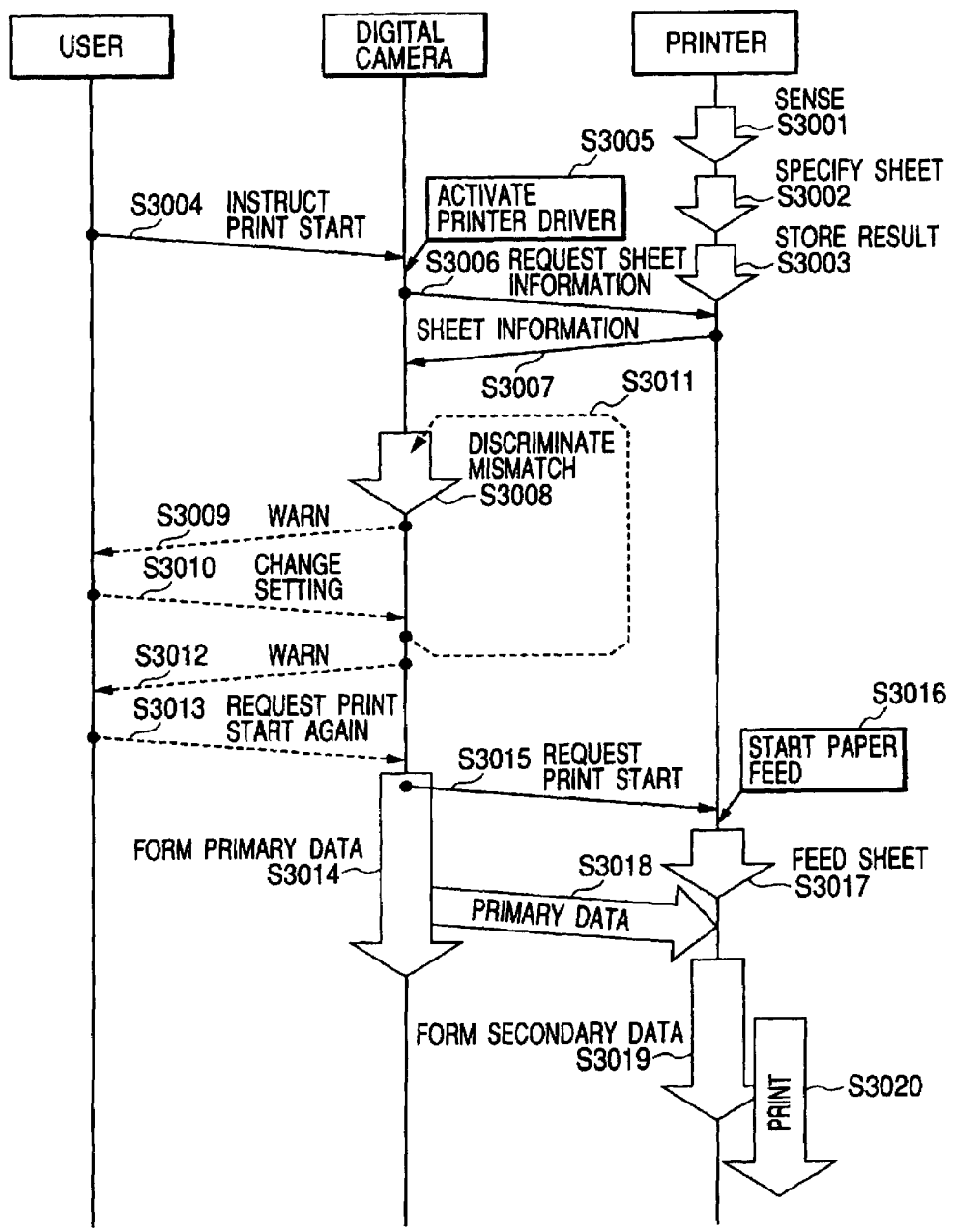
FIG. 30 is a diagram showing a flow of processes and control in the case where there is no print instruction in the fifth embodiment.

FIG. 30 is a diagram showing a flow of the whole process and control in the case where there is no print instruction in the fifth embodiment.

This embodiment differs from the first embodiment with respect to a point that the processes up to the binarization executed on the data processing apparatus side are performed on the printer side in a manner similar to that described in FIG. 29. A flow of other processes which are executed until step 3013 of requesting the print start again is similar to that in the first embodiment.

As mentioned above, also in the case of directly starting the printing from the digital camera without confirming the setting, similar effects can be obtained by holding the sensing result (data) of the media before the instruction of the print start request in a manner similar to that described in FIG. 29.

In the embodiment, a part of the effects described in the first embodiment can be realized. Also in a construction such that the conversion from the multivalue data is performed in the printer main body, by discriminating the mismatch with the user setting and making the communication with the user, the printing system to which the intention of the user is maximally reflected and in which the unpreferable printing is hardly executed can be constructed. There are advantages such that the whole printing system can be constructed at a low price and the general digital camera can be used. Thus, the user is released from the tiring operation, the wasteful consumption of the ink and media can be prevented, and an efficient print environment can be obtained.

In the embodiment, although the effects have been described with respect to the digital camera as an example, similar effects can be also obtained if the PC is used as a data processing apparatus in a manner similar to the first embodiment.

Sixth Embodiment

The sixth embodiment to realize the invention will be described with reference to the drawings.

It is a feature of this embodiment that the print setting including the discrimination about the mismatch executed on the data processing apparatus side in the first to fifth embodiments is performed on the printer side.

Figure 31:
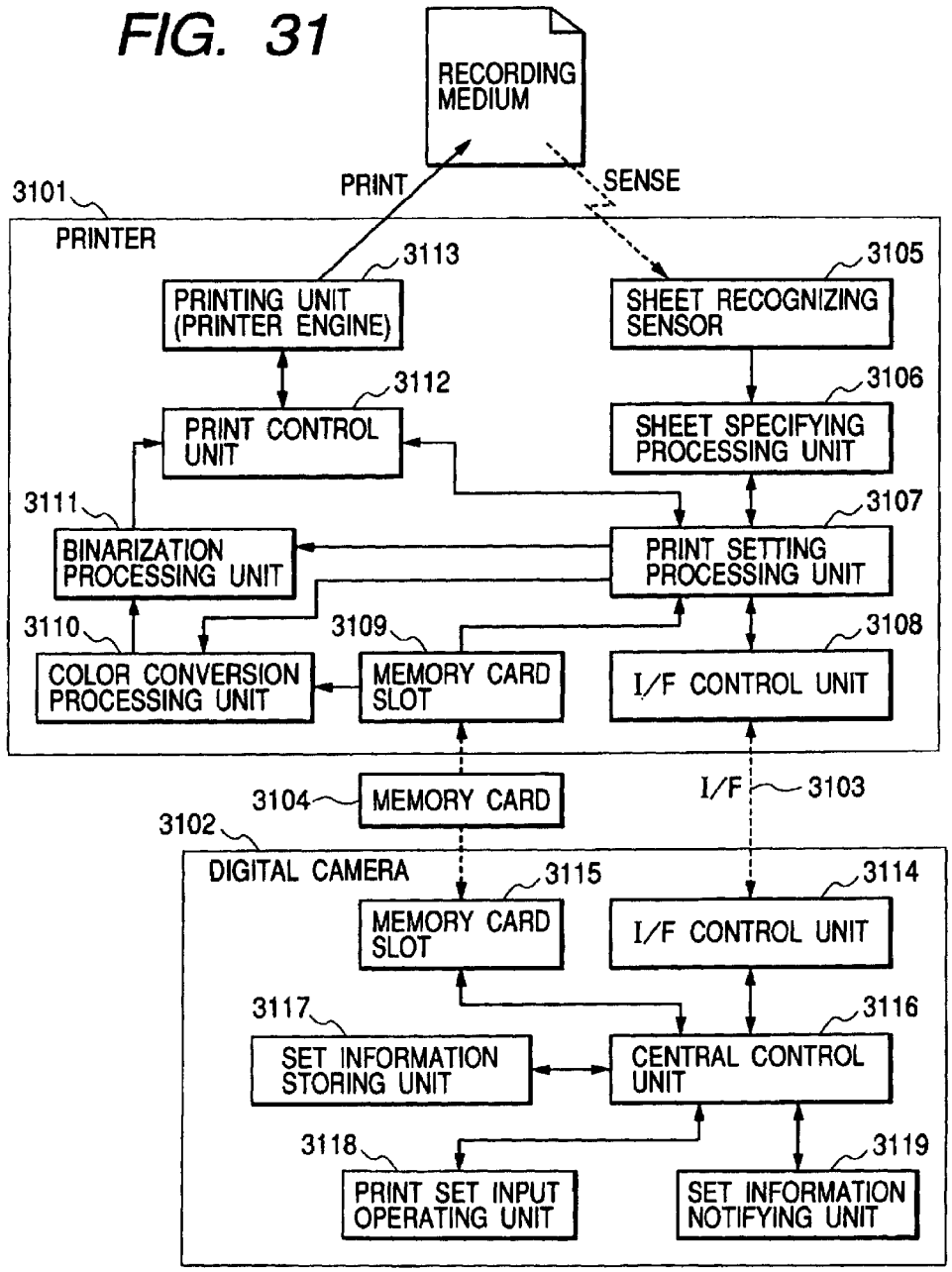
FIG. 31 is a functional block diagram in a printing system In the sixth embodiment.

FIG. 31 is a functional block diagram in a printing system in the sixth embodiment.

Reference numeral 3101 denotes a color printer for forming an image. A printer of the ink jet type is presumed here. This color printer is constructed by various functional blocks of 3105 to 3113.

Reference numeral 3102 denotes a digital camera for transmitting image data and a command for print control to the color printer 3101. This digital camera is constructed by various functional blocks 3114 to 3119. In both of the color printer 3101 and the digital camera 3102, functions which are considered to be particularly unnecessary when explaining a feature of the embodiment are omitted here in a manner similar to that mentioned above.

Reference numeral 3103 denotes a communication interface for connecting the printer 3101 and the digital camera 3102. Bluetooth as a wireless standard using a band of 2.4 GHz is presumed here. This interface is mainly used for communication of a small data amount such as transmission and reception of print set contents, status response, or the like.

Reference numeral 3104 denotes a memory card which is used when the image data is transmitted and received between the printer 3101 and the digital camera 3102. A type of memory card is not limited here.

Reference numeral 3105 denotes a sheet recognizing sensor (media sensor) for obtaining information to specify the type and the size of the recording medium P. It is assumed that the recording media P have been stacked in a paper feed tray, a cassette, or the like provided for the printer 3101. Since explanation about the means for specifying the type and size of the sheet is similar to that in the first embodiment, it is omitted here.

Reference numeral 3106 denotes a sheet specifying processing unit for specifying the sheet on the basis of an output result of the media sensor 3105. In the embodiment, the type and size of the sheet are specified by a numerical value arithmetic operation using output values of the sensor as parameters.

Reference numeral 3107 denotes a print setting processing unit for performing various print settings including the setting of the sheet, the setting of the print quality, and the like. This print setting processing unit executes the various print settings including the sheet setting on the basis of the specified sheet information. Contents regarding the auto setting function of the printing including the sheet setting and the discrimination about the occurrence of the mismatch are similar to those in the first embodiment.

Reference numeral 3108 denotes an I/F control unit having an interface function of the printer 3101. Since Bluetooth is presumed as an interface here, it is assumed that this I/F control unit comprises a base band chip, an RF module, and a link controller. By this I/F control unit, transmission of the print set contents are performed. Status information such as error generated in the printer main body, communication status, and the like is also returned to the digital camera 3102 if it is requested.

Reference numeral 3109 denotes a card slot in which the memory card is inserted.

Reference numeral 3110 denotes a color conversion processing unit for converting the color image data of RGB multivalues sent from the digital camera 3102 via the memory card into multivalue data of YMCK. At this time, various image adjustments are also made.

Reference numeral 3111 denotes a binarization processing unit for converting the image data converted into the multivalue data of YMCK by the color conversion processing unit 3110 into binary data. Although there are many binarizing methods, it is assumed that the error diffusion method is used here.

Reference numeral 3112 denotes a print control unit for developing the data to be printed into the printer engine. The printer engine is controlled by using the print data binarized in the binarization processing unit 3111 in accordance with the command for print control formed in the print setting processing unit 3107. Specifically speaking, various control which are changed in accordance with the characteristics of the sheet, for example, control of the implant amount of the ink, a change in the number of paths, and the like are executed.

Reference numeral 3113 denotes a printing unit which is also called a printer engine. This printer engine executes the printing onto the recording medium P on the basis of the print data developed by the print control unit 3112.

Reference numeral 3114 denotes an I/F control unit having an interface function of the digital camera 3102. This I/F control unit is constructed by a controller of Bluetooth.

Reference numeral 3115 denotes a card slot in which the memory card is inserted.

Reference numeral 3116 denotes a central control unit for controlling various functions of the digital camera 3102. The functions which the CPU has correspond to them.

Reference numeral 3117 denotes a set information storing unit for storing the contents of the print setting set in the printer 3101 into a built-in memory.

Reference numeral 3118 denotes a print set input operating unit constructed by a button for reflecting the intention of the user to the print setting and the like. In the case of the digital camera, unlike the PC, both of the operating unit and the display unit are small and a button for inputting is often used also to realize another function. This print set input operating unit is used for changing the various settings including the print quality and the print setting set on the printer side.

Reference numeral 3119 denotes a set information notifying unit for notifying the user of the contents of the print setting. Use of a liquid crystal display apparatus provided for previewing the photographed images or displaying a menu is presumed here.

As mentioned above, the printing system of the invention is constructed by: the color printer having the function for specifying the sheet from the output of the media sensor and executing the various print settings and the function for converting the multivalue image data into the binary data for printing; the digital camera having the function for forming the image data; and the bidirectional communication interface for connecting those two apparatuses and the memory card.

Figure 32:
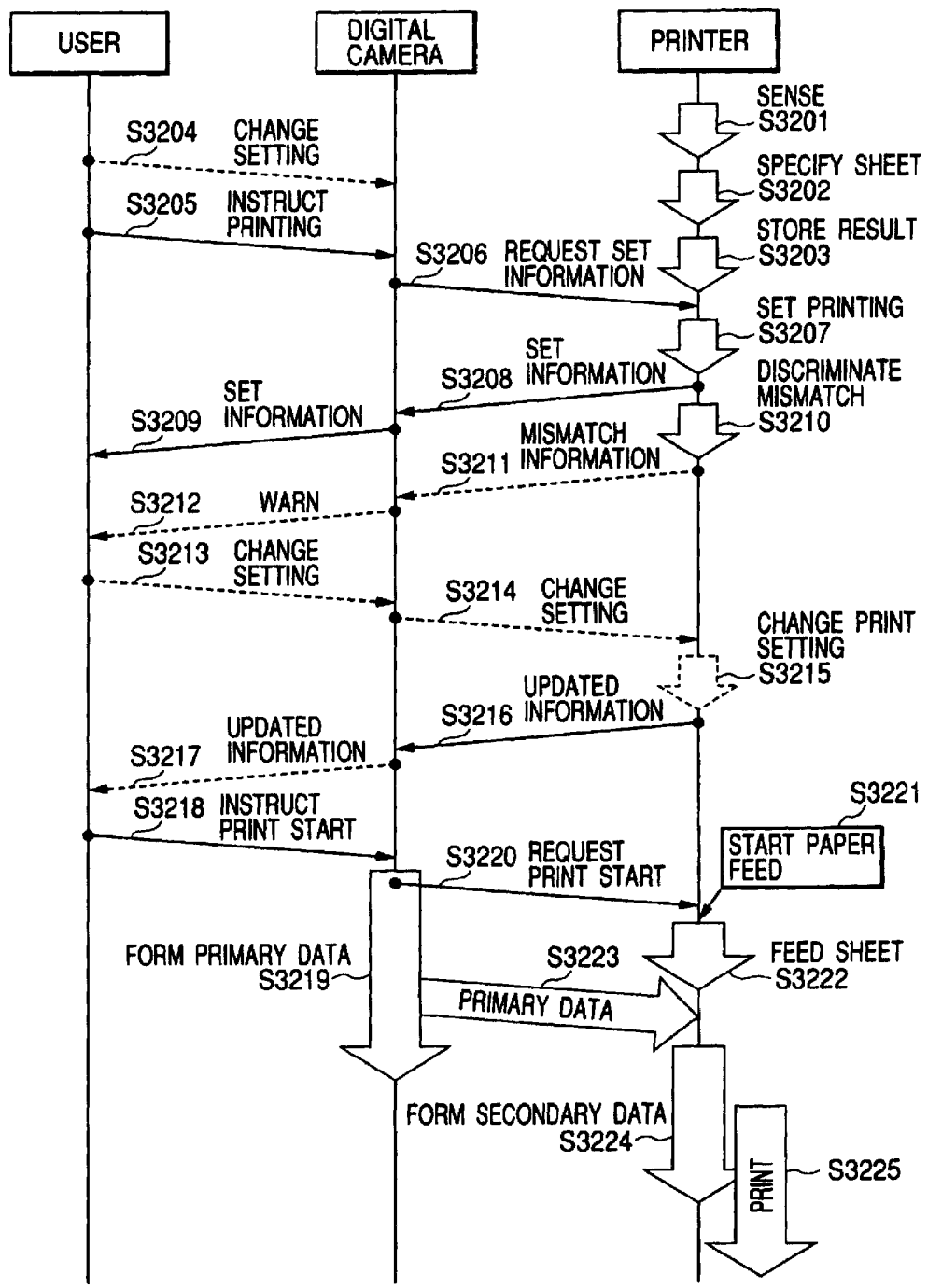
FIG. 32 is a diagram showing a flow of processes and control in the case where there is a print instruction in the sixth embodiment.

FIG. 32 is a diagram showing a flow of the whole process and control in the case where there is a print instruction in the sixth embodiment.

This embodiment differs from the fifth embodiment with respect to a point that although the print setting including the sheet setting has been performed on the digital camera side serving as a data processing apparatus in the fifth embodiment, all processes including the data creation are executed on the printer side in the sixth embodiment. The embodiment also differs from the fifth embodiment with respect to a point that a large amount of image data and other data are separately transmitted and received via another means.

Since contents of processes in steps 3201 to 3203 are similar to those in steps 2901 to 2903 in FIG. 29, respectively, their detailed description is omitted here. During this period of time, the sheet information is obtained and stored into the printer. A construction in which the sheet information is obtained before the print start is similar to that in the fifth embodiment.

In step 3204, if the user wants to change the print set contents, he instructs its change portions and contents.

In step 3205, the print request instruction is made to the digital camera.

In step 3206, the obtaining request of the print set information is made to the printer in response to the print request instruction in step 3205. At this time, it is possible to request not only the print set information but also information of the printer engine unit such as presence or absence of the sheets to be set, status of the interface, type of ink cartridge, residual amount of the ink, and the like. Fundamental print setting conditions such as print quality, media size, and the like which have been set on the digital camera side are also transmitted to the printer side.

In step 3207, the auto setting of the printing is performed on the basis of the sheet information obtained in step 3202. Contents of the print setting and a flow of processes are similar to those mentioned in the other embodiments. When the sheet setting based on the sheet information in the print setting is performed, whether a mismatch has occurred between the sheet setting and the sheet setting which has arbitrarily been designated by the user or not is also discriminated here.

In step 3208, the print set information including the contents which have automatically been set in step 3207 is transmitted to the digital camera.

In step 3209, the received print set information is displayed by using the display apparatus such as a liquid crystal monitor or the like. If the mismatch has occurred between the contents of the auto sheet setting and those of the user setting in step 3207, such a fact is displayed and the user is notified or warned.

In step 3210, whether a mismatch has occurred between the sheet setting based on the sheet information and the print quality which has arbitrarily been set by the user or not is discriminated. Since a discrimination reference of the occurrence of the mismatch and a discriminating process are similar to those in the other embodiments, their description is omitted here.

In step 3211, if it is determined in step 3210 that the mismatch has occurred, such a fact is transmitted to the digital camera.

In step 3212, if it is determined in step 3210 that the mismatch has occurred, the user is notified or warned of such a fact. Although the notification and warning are given by displaying it onto the display screen, the warning can be displayed together with an audio sound so as to alert the user.

In step 3213, in the case of changing the contents of the print setting by confirming the print set information displayed in step 3209 or in accordance with the warning displayed in step 3212, the system receives an instruction of the user with respect to its change portions and contents.

In step 3214, in the case of changing the contents of the print setting in step 3213, its change portions and contents are transmitted to the printer.

In step 3215, the printer receives the change instruction and changes the contents of the print setting. Although not explained in detail here, since there is also a case where informalities exist in the set contents according to the user instruction, the mismatch discrimination can be also executed again after completion of the setting change in this step.

In step 3216, the print set information after the updating to which the instruction obtained in step 3213 has been reflected is transmitted to the digital camera.

In step 3217, the received information of the print setting after the updating is displayed onto the monitor. The user can repeat a processing loop between steps 3213 and 3217 and perform desired setting if necessary.

Since contents of processes in steps 3218 to 3225 are similar to those in steps 2915 to 2922 in FIG. 29, respectively, their detailed explanation is omitted here. During this period of time, the printing is started and data according to the sheet is formed and printed.

Since almost all of the processes regarding the print setting are executed on the printer side as mentioned above, it is very easy to construct the digital camera and change its construction so that the embodiment can be realized.

Figure 33:
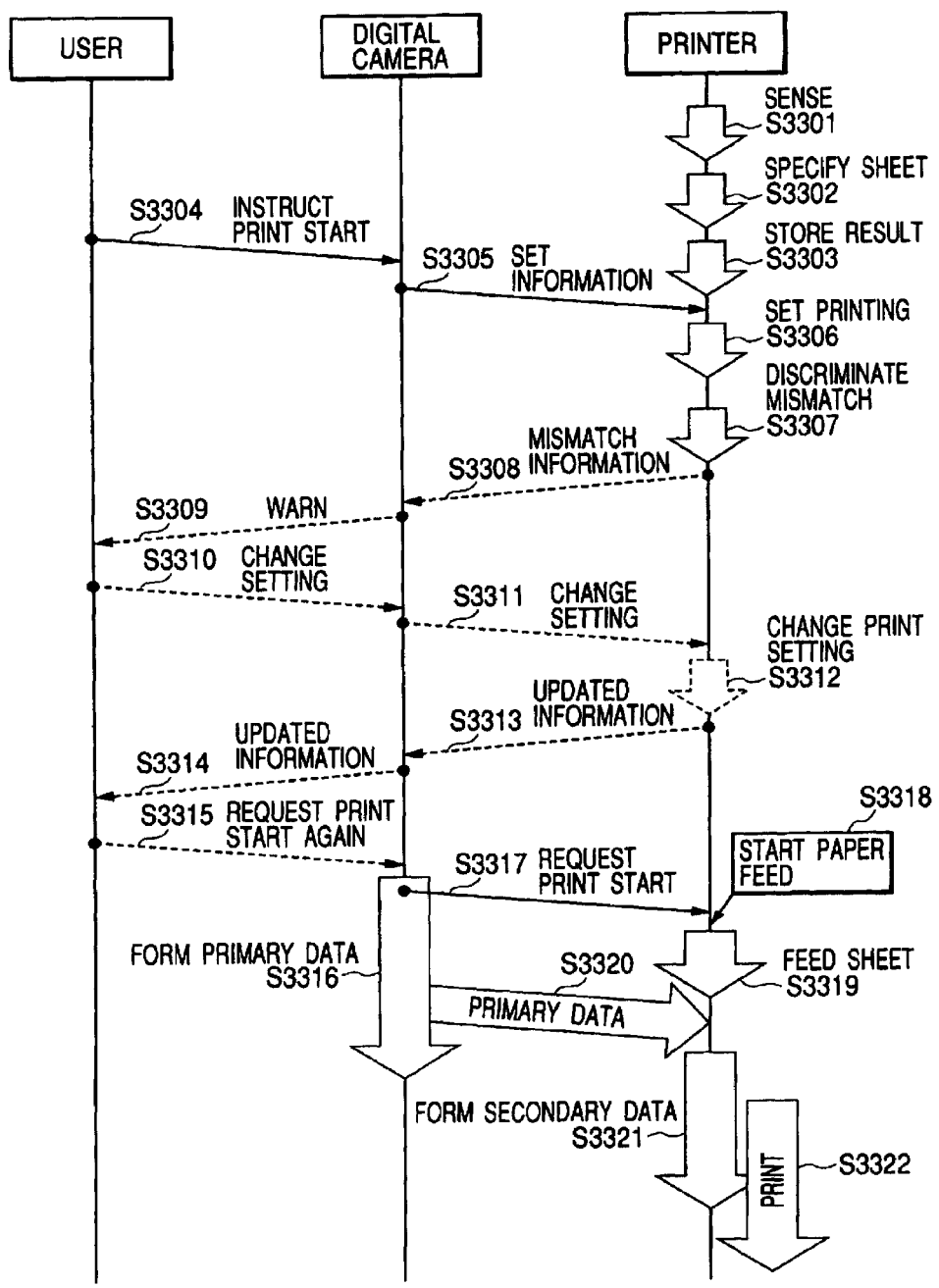
FIG. 33 is a diagram showing a flow of processes and control in the case where there is no print instruction in the sixth embodiment.

FIG. 33 is a diagram showing a flow of processes and control in the case where there is no print instruction in the sixth embodiment.

This embodiment differs from the fifth embodiment with respect to a point that the print setting including the sheet setting is executed on the printer side instead of the digital camera side serving as a data processing apparatus in a manner similar to that described in FIG. 32.

Effects similar to those described in FIG. 32 can be also obtained in the case where the printing is directly started without displaying the detail setting display screen of printing as mentioned above.

In this embodiment, effects similar to described in the fifth embodiment can be realized. Since the mismatch with the user setting is discriminated and the communication with the user is made, the printing system to which the intention of the user is maximally reflected and in which the unpreferable printing is hardly executed can be constructed. There are also advantages such that the whole system can be constructed at a low price and the more general digital camera can be used. Consequently, the user is released from the tiring operation, the wasteful consumption of the ink and the media can be prevented, and the efficient print environment can be obtained.

Although the effects have been described with respect to the digital camera as an example in the embodiment, similar effects can be obtained also in the case of using the PC as a data processing apparatus in a manner similar to the first embodiment.

As interfaces between the data processing apparatus and the printer, although two kinds of interfaces such as interface for the image data and interface for confirming the print setting have been used in the embodiment, there is no problem if the invention is realized by using only one type of the interface so long as it is an interface which can make data communication of a large capacity.

Seventh Embodiment

The seventh embodiment to realize the invention will be described with reference to the drawings.

It is a feature of this embodiment that the printer as a component element of the printing system is not the printer of the ink jet type but a laser beam printer of an electrophotographic type. In this case, the sheet information obtained before printing is used not for forming the print data but for setting processing conditions of the printer main body.

Figure 34:
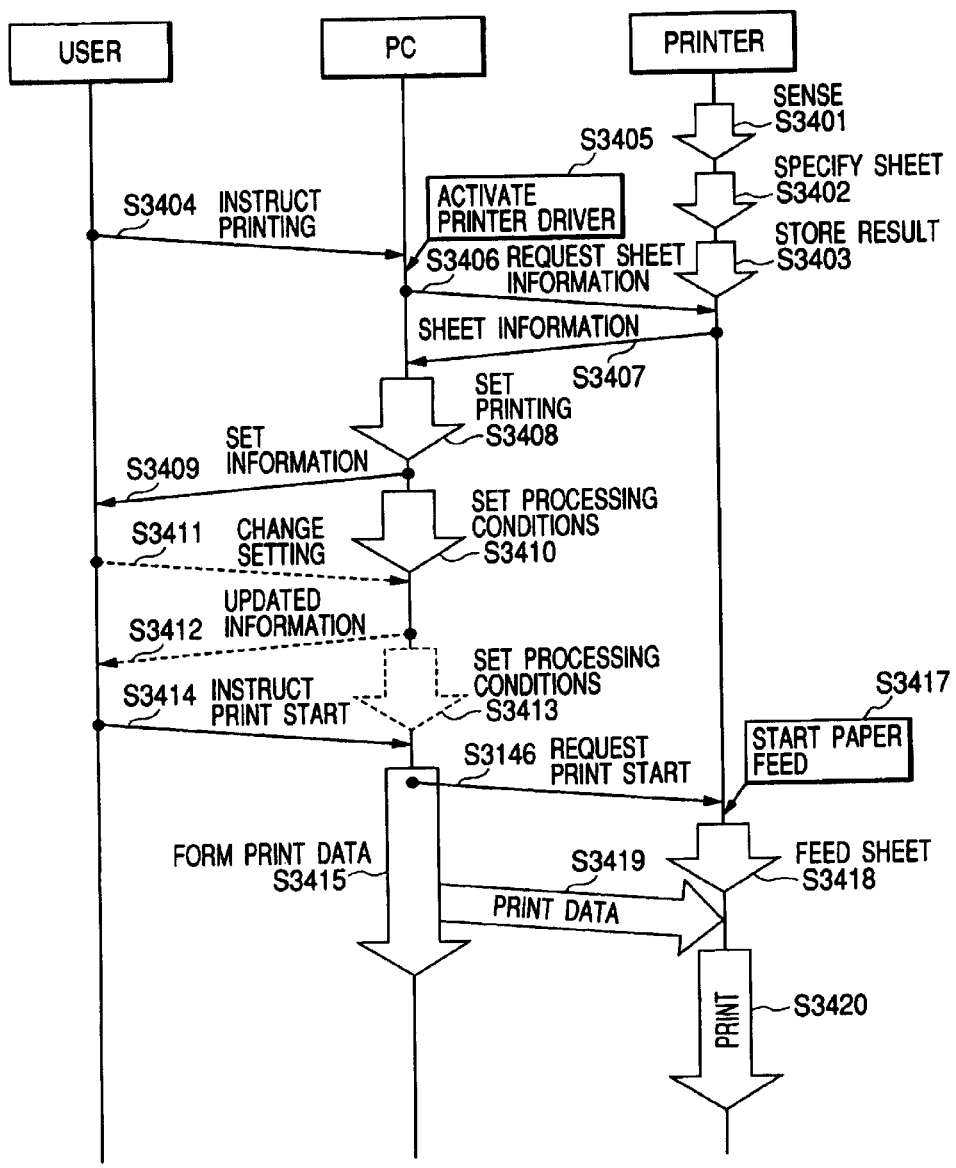
FIG. 34 is a diagram showing a flow of processes and control in the case where there is a print instruction in the seventh embodiment.

FIG. 34 is a diagram showing a flow of the whole process and control in the case where there is a print instruction in the seventh embodiment.

Since contents of processes in steps 3401 to 3403 are similar to those in steps 101 to 103 in FIG. 1, respectively, their detailed explanation is omitted here. During this period of time, the sheet information is obtained and stored into the printer. A construction such that the sheet information is held before the print start is similar to that in the first embodiment. As sheet information which can be obtained, there are not only the type and size of the sheet but also a thickness and the like which influence the processing conditions.

In step 3404, a print request is instructed to the PC. The instruction of the print request is generally made by executing the print command from a menu of an application under use. A mouse and a keyboard are used as devices. For example, such an instruction can be realized via an audio input device such as a microphone or the like instead of the pointing device such as keyboard, mouse, or the like.

In step 3405, when the display screen is shifted to a display of a display screen for performing detailed setting from the setting display screen of the printing which is displayed in response to the print request instruction, the printer driver serving as software for managing the print setting and other settings is activated.

In step 3406, after the activation of the printer driver in step 3405, the obtaining request of the sheet information is made to the printer which is presumed to execute the printing in order to confirm the type of sheets stacked in the printer itself. In this instance, not only the sheet information but also information regarding the printer engine unit such as presence or absence of the sheets to be set, status of the interface, residual amount of the toner, and the like can be requested together.

In step 3407, the sheet information stored in step 3403 is transmitted to the PC in response to the obtaining request of the sheet information in step 3406. In the case of returning information other than the sheet information, the other information is transmitted together with it.

In step 3408, the automatic setting of the printing is performed on the basis of the obtained sheet information.

In step 3409, the print set information including the contents which have automatically been set in step 3408 is displayed by using the display apparatus such as a monitor or the like.

In step 3410, various conditions of the electrophotographic process are changed on the basis of the information which specifies the sheet type obtained in step 3402. Specifically speaking, setting contents such as transfer voltage, fixing temperature adjustment, and the like are adjusted in accordance with the sheet. Setting for finely adjusting a conveying speed of the sheet is also performed.

In step 3411, in the case of changing the contents of the print setting as a result of the user's confirmation of the print set information displayed in step 3409, an instruction regarding its change portions and contents is received.

In step 3412, if there is the setting change instruction in step 3411, information of the print setting after the updating to which the contents of the instruction has been reflected is displayed onto the monitor.

In step 3413, if there is the setting change instruction in step 3411, the setting of the various conditions of the electrophotographic process is examined again.

In step 3414, the user instructs the print start. Thus, the actual printing operation is started. A case where the printing is directly started without displaying the detail setting display screen of the printing from an application which is being operated on the PC will be described with reference to FIG. 35.

In step 3415, the printer driver on the PC forms print data corresponding to the print setting in response to the print start instruction. Generally, in the laser beam printer, the print data is often described by a page description language (PDL) such as postscript or the like. The data is formed also similarly by using the page description language according to the printer.

In step 3416, the print start request is made to the printer by the PC. At the same time, contents of the processing conditions set in step 3410 are transmitted to the printer side.

In step 3417, the paper feed is started in order to convey the sheet set in the cassette or manual insertion tray of the printer to the image forming position in response to the print start request. The setting of the various processing conditions is changed on the basis of the setting of the processing conditions received in step 3416.

In step 3418, the paper feeding operation is executed. At this time, the sheet is conveyed to the print start position.

In step 3419, the print data formed in step 3415 is transmitted to the printer.

In step 3420, an image is formed by using the received print data in accordance with the processing conditions set in step 3410. The printer sends the received print data to the printer engine and executes the printing.

By holding the sheet information before the activation of the printer driver as mentioned above, the subsequent print time is reduced. A long sensing time can be assured as compared with that in the case of sensing the sheet during the conveyance.

Figure 35:
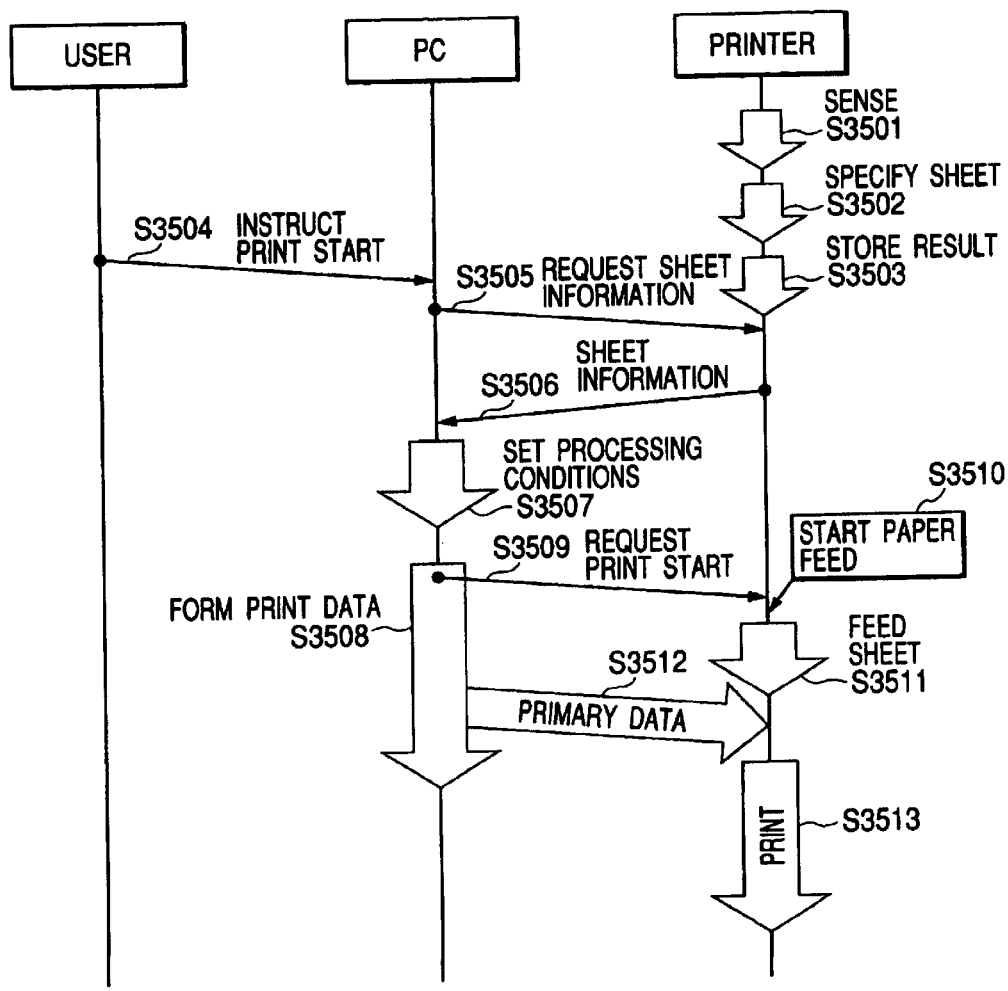
FIG. 35 is a diagram showing a flow of processes and control in the case where there is no print instruction in the seventh embodiment.

FIG. 35 is a diagram showing a flow of the whole process and control in the case where there is no print instruction in the seventh embodiment.

Since contents of processes in steps 3501 to 3503 are similar to those in steps 3401 to 3403 in FIG. 34, respectively, their detailed explanation is omitted here. During this period of time, the sheet information is obtained and stored into the printer.

In step 3504, the print request is instructed to the PC by the user. Processes regarding the print request instruction are also similar to those described in FIG. 34.

In step 3505, the obtaining request of the sheet information is made to the printer which executes the printing in order to confirm the type of sheets stacked in the printer itself.

In step 3506, the sheet information stored in step 3503 is transmitted to the PC.

In step 3507, various conditions of the electrophotographic process are changed on the basis of the information which specifies the sheet type obtained in step 3502. Contents which are specifically set are similar to those described in FIG. 34.

Since contents of processes in steps 3508 to 3513 are similar to those in steps 3415 to 3420 in FIG. 34, respectively, their detailed explanation is omitted here. During this period of time, the printing is started and data according to the sheet is formed and printed.

Effects similar to those described in FIG. 34 can be also obtained in the case where the printing is directly started without displaying the detail setting display screen of printing as mentioned above.

In this embodiment, by holding the sheet information prior to activating the printer driver, the subsequent print time is reduced in a manner similar to the first embodiment. A long sensing time can be assured as compared with that in the case of sensing the sheet during the conveyance. Further, since a time which is required until the sensing result is reflected is sufficiently longer than that in the case of sensing the sheet during the conveyance, a heavy load is not burdened halfway of the process and the system can be constructed by a CPU and hardware at a lower price.

Eighth Embodiment

A construction of the eighth embodiment of a printing system according to the invention is similar to that in FIG. 3.

Figure 43:
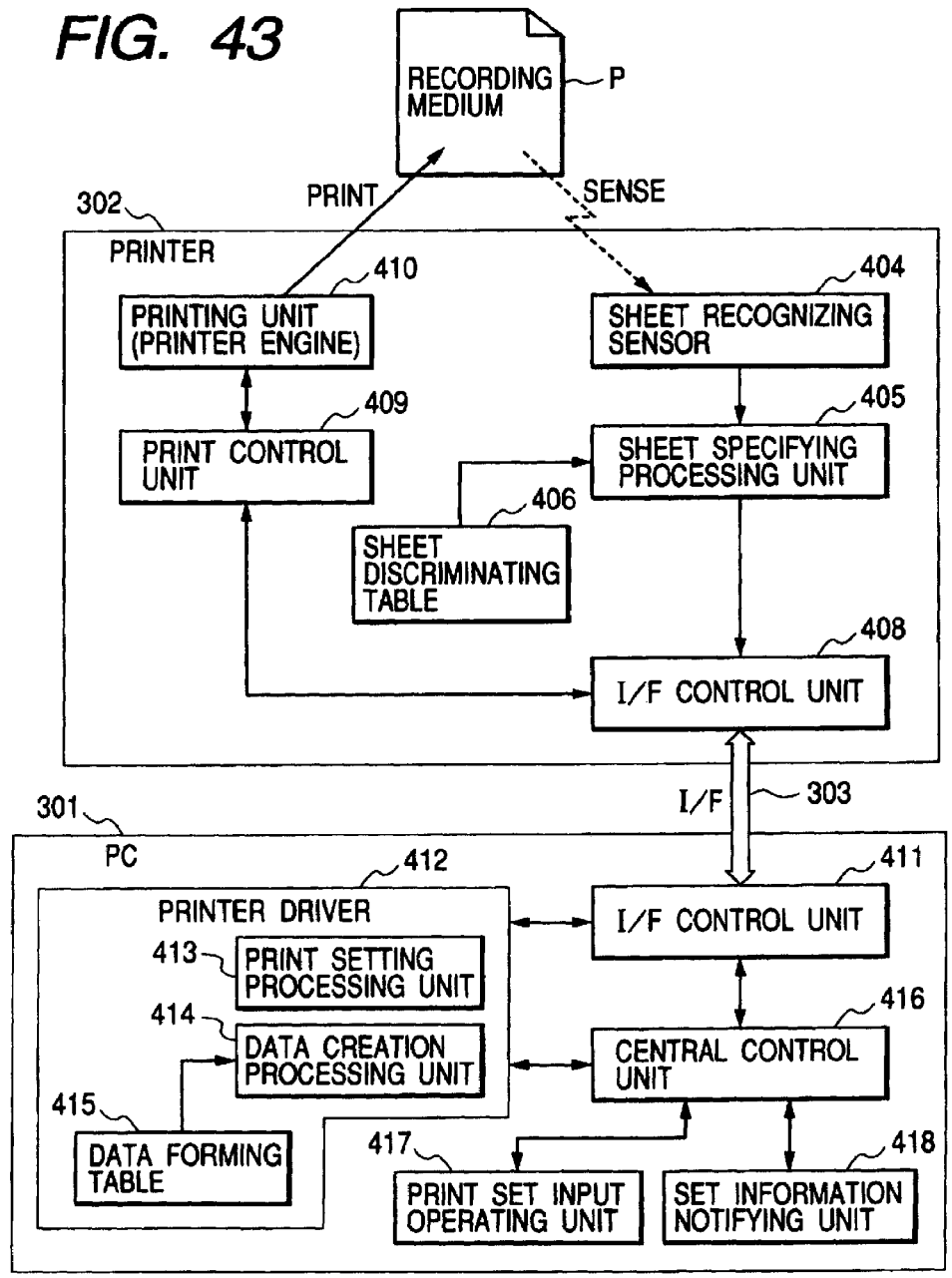
FIG. 43 is a block diagram showing functional internal constructions of a printer and a PC.

FIG. 43 is a block diagram showing functional internal constructions of the printer 302 and the PC 301.

The printer 302 is constructed by the various functional blocks 404 to 406 and 408 to 410. The PC 301 is constructed by the various functional blocks 411 to 418. In both of the printer 302 and the PC 301, functions which are supposed to be particularly unnecessary when features of the embodiment are described are omitted. It is assumed that the communication interface 303 is constructed by a USB.

In the printer 302, reference numeral 404 denotes the sheet recognizing sensor (media sensor) for detecting the information which specifies the sheet type and size of the recording medium P. It is assumed that the recording media P have been stacked in the paper feed tray, cassette, or the like provided for the printer 302. As a method of specifying the type and size of the sheet, a large variety of methods exist: that is, a method of previously writing a mark onto the sheet as a recording medium and optically detecting the mark; a method of embedding an IC card into the sheet; a method of optically detecting reflection light (regular reflection light, diffused reflection light) of specific light irradiated onto the sheet; a method of directly or indirectly measuring surface roughness; a method of measuring transmittance of the light; and the like. Other realizing methods exist: that is, a method of discriminating the sheet from a weight of the sheet, a thickness, a coefficient of friction, a dielectric constant, an electric resistance value, a coefficient of water absorption; a method of discriminating the sheet from a feature amount which is obtained by photographing a two-dimensional image; and the like. A sheet recognizing function can be realized by one of those detecting methods or by a combination of them. A type of sheet recognizing sensor 404 in the embodiment is not limited so long as it has the function which can discriminate the type and size of the sheet on the conveying path. It is assumed that such a sensor is installed on a carriage on which an ink cartridge and a head for printing have been mounted.

Reference numeral 405 denotes the sheet specifying processing unit for specifying the type and size of the sheet on the basis of the output result of the sheet recognizing sensor 404. The sheet specifying processing unit 405 specifies the type and size of the sheet by using the sheet discriminating table 406, which will be explained hereinlater.

Reference numeral 406 denotes the sheet discriminating table in which standard values have previously been stored. The sheet specifying processing unit 405 uses this table when specifying the type and size of the sheet. The values in this table can be updated from the PC 301.

Reference numeral 408 denotes the I/F control unit for performing the interface function of the printer 302. Since the communication I/F 303 is constructed by the USB, the I/F control unit 408 is constructed by a controller on the peripheral apparatus side of the USB. Transmission of the sheet information, reception of the print data and control commands, and the like are executed. Error information of an error generated in the printer 302, status information such as a communication status, and the like are also returned to the PC 301 if it is requested.

Reference numeral 409 denotes the print control unit which receives the print data transmitted from the PC 301 and develops it into the printer engine. The print data which is transmitted is the data which has already been image-processed on the PC 301 side on the basis of print setting including the type and size of the sheet and the like. The printer engine is controlled in accordance with the command for print control included in the print data here. Specifically speaking, the command for print control is constructed by: binary data for printing (intermediate data before binarization according to circumstances); and the various commands for controlling the implant amount of the ink, the number of paths, the printing direction, and the conveyance amount of the sheet. If the printer 302 is the printer of the electrophotographic type, the command for print control can be constructed by various commands for controlling the processing conditions such as transfer voltage and fixing temperature.

Reference numeral 410 denotes the printing unit which is also referred to as a printer engine. The printer engine 410 prints onto the recording medium P on the basis of the print data developed by the print control unit 409. Since the printer 302 is the printer of the ink jet type, it forms an image by emitting the ink.

In the PC 301, reference numeral 411 denotes the I/F control unit for performing the interface function of the PC 301. The I/F control unit 411 is constructed by a controller on the host side of the USB and has a function as a USB host. A part of the functions as a USB host is also constructed by software such as OS (Operating System), printer driver, or the like.

Reference numeral 412 denotes the printer driver for performing various settings for printing, creation of the print data, and control of the printer on the PC 301 and this printer driver is constructed by software. The printer driver 412 is constructed by various functional blocks of 413 to 415.

Reference numeral 413 denotes the print setting processing unit for performing various print settings including setting of the sheet, setting of print quality, and the like. The print setting processing unit 413 has functions for receiving the instruction or input from the user and displaying or notifying the set contents. This print setting processing unit 413 is a portion serving as fundamentals of the invention and has the function for automatically performing the sheet setting on the basis of the sheet information sent from the printer 302. Contents regarding the automatic setting function of the printing including the sheet setting and the discrimination about the occurrence of a mismatch will be described hereinlater.

Reference numeral 414 denotes the data creation processing unit of the print data. Specifically speaking, the data creation processing unit 414 executes various image processes such as color conversion, binarization, and the like in accordance with the print setting performed by the printer 302 and the print setting processing unit 413. The data creation processing unit 414 also forms the printer control command for making print control on the basis of the formed data.

Reference numeral 415 denotes the data forming table which is used when the data is formed by the data creation processing unit 414. Contents in this table can be updated or new contents can be added thereto.

Reference numeral 416 denotes the central control unit for controlling various functions of the PC 301. This central control unit is constructed by a CPU.

Reference numeral 417 denotes the print set input operating unit which is operated by the user. This print set input operating unit is constructed by various input devices and used in order to reflect the intention of the user to the print setting.

Reference numeral 418 denotes the set information notifying unit for notifying the user of the print setting. Specifically speaking, the user is notified by displaying it onto an image display apparatus (not shown) such as a monitor or the like or by generating an audio sound from a speaker (not shown).

As mentioned above, the printing system in the eighth embodiment is constructed by: the printer 302 for which the sheet recognizing sensor 404 is provided and which has the function for specifying the sheet; the PC 301 having the function for forming the print data and the control command on the basis of the sheet information specified on the printer 302 side and the instruction or selection made by the user; and the communication interface 303 which connects the printer 302 and the PC 301 and can make the bidirectional communication.

A hardware construction of the printer 302 and the PC 301 is similar to that shown in FIG. 5.

Figure 41:
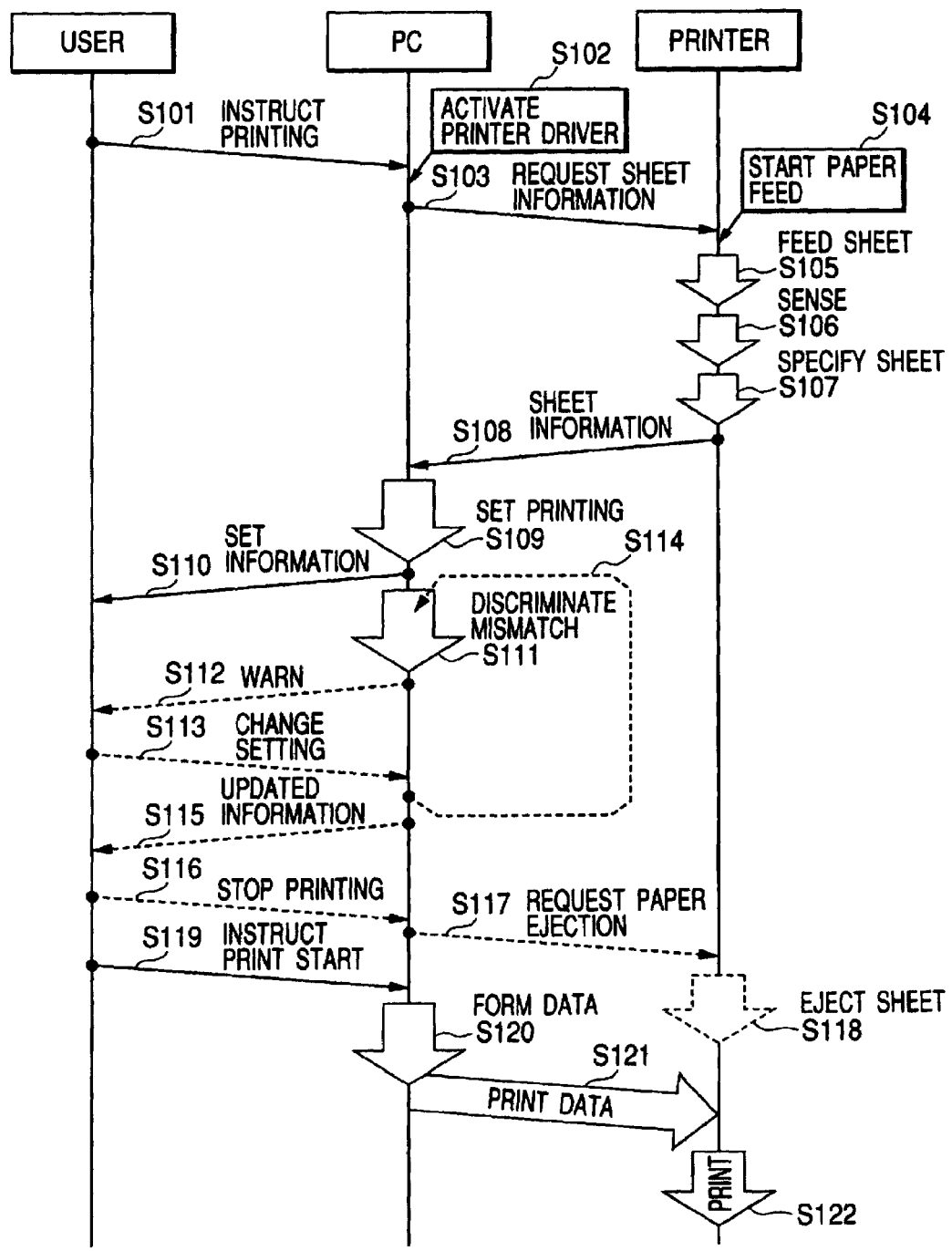
FIG. 41 is a sequence diagram showing a flow of a printing process in the case where there is the print instruction in the eighth embodiment.

FIG. 41 is a sequence diagram showing a flow of a printing process in the eighth embodiment. This flow shows the printing process which is executed among the user, the PC 301, and the printer 302 in the case where there is the print instruction.

In step 101, the print request is instructed to the PC 301 by the user. The instruction of the print request is generally made by designating and executing the print command from the menu of the application under operation. The mouse and the keyboard are used for the above designation or execution. Such an instruction can be also realized via an audio input device instead of the pointing device such as keyboard, mouse, or the like.

In step 102, the setting display screen of the printing is displayed onto the display apparatus 518 of the PC 301 in response to the print request instruction and when the setting display screen of the printing is shifted to the display screen for performing detailed setting, the printer driver 412 serving as software for managing the print setting and other settings is activated.

In step 103, after the activation of the printer driver 412 in step 102, the PC 301 makes the obtaining request of the sheet information to the printer 302 which is presumed to execute the printing in order to confirm the type and size of the sheet serving as a print target. In this instance, not only the sheet information but also information regarding the printer engine 302 such as presence or absence of the sheets in the tray or cassette, status of the interface, type of ink cartridge, residual amount of the ink, and the like can be requested together.

In step 104, the printer 302 which received the obtaining request of the sheet information starts the paper feed in order to convey the sheet set in the tray or cassette of the printer 302 to the print start position.

In step 105, the printer 302 executes the paper feeding operation. At this time, the sheet is conveyed to the position where it is detected (sensed) by the media sensor 509.

In step 106, the information to specify the type and size of the sheet is detected by the media sensor 509. The media sensor 509 is attached on the conveying path so that it can sense the type and size of the sheet. After the sheet was fed, the media sensor senses it.

In step 107, the sheet specifying processing unit 405 specifies the type and size of the sheet from an output result of the media sensor 509. with reference to the sheet discriminating table 406.

In step 108, the printer 302 which received the obtaining request of the sheet information in step 103 transmits the sheet information specified in step 107 to the PC 301. If information other than the sheet information is also requested, the other information is transmitted together with it.

In step 109, the PC 301 performs the auto setting of the printing on the basis of the transmitted sheet information. Contents of the print setting and a flow of processes will be explained hereinlater. When the sheet setting based on the sheet information in the print setting is performed, whether a mismatch has occurred between the sheet setting and the sheet setting which has arbitrarily been designated by the user or not is also discriminated here.

In step 110, the PC 301 displays the print set information including the contents which have automatically been set in step 109 is displayed onto the display apparatus 518. If the mismatch has occurred between the contents of the auto sheet setting and those of the user setting in step 109, such a fact is displayed onto the display apparatus 518 and the user is notified or warned of it.

In step 111, whether a mismatch has occurred between the sheet setting based on the sheet information and the print quality which has arbitrarily been set by the user or not is discriminated. A discrimination reference of the occurrence of the mismatch and a discrimination processing procedure will be described hereinlater. Whether the change instruction which is made by the user when the mismatch occurs between the contents of the auto sheet setting and those of the sheet setting by the user designation is proper or not is also discriminated. This discrimination is made when the set contents are fed back in step 114.

In step 112, if it is determined in step 111 that the mismatch has occurred, the PC 301 displays such a fact onto the display apparatus 518 and the user is notified or warned of it. Although the notification and warning are given by displaying a dialog onto the display screen of the display apparatus 518, it is also possible to alert the user by generating an audio sound when the dialog is opened. Contents of the dialog to be displayed here will be explained hereinlater.

In step 113, when the user confirms the print set information displayed on the display apparatus 518 in step 110 and changes the contents of the print setting or when he changes the contents of the print setting in accordance with the warning displayed on the display apparatus 518 in step 112, the change portions and contents are inputted to the PC 301.

In step 114, when the setting is changed in step 113, in order to confirm again whether a mismatch has occurred between the changed contents and the sheet setting, the processing routine is returned to step 111. This process is also executed in the case where the user instructs to eliminate the mismatch between the auto sheet setting and the setting by the user.

In step 115, if there is no problem in the set change result, the PC 301 allows the information of the print setting after the updating to which the change contents inputted in step 113 have been reflected to be displayed onto the display apparatus 518.

The user can see the information of the print setting after the updating displayed onto the display apparatus 518 in step 115, execute the setting change again in step 113, and repeat the processes so as to obtain desired setting.

In step 116, if the user determines that the desired printing cannot be performed to the fed sheet, he instructs to stop the printing.

In step 117, the PC 301 which received the print stop instruction requests the printer 302 to eject the fed sheet without printing.

In step 118, the printer 302 ejects the sheet which has been conveyed to the sensing position and stopped there.

In step 119, the user instructs the print start. Thus, the actual printing operation is started. A printing process which is executed in the case where the application which is being operated on the PC 301 directly starts the printing without displaying the detail setting display screen of the printing will be described in detail with reference to FIG. 42.

In step 120, the printer driver 412 on the PC 301 forms print data corresponding to the print setting in response to the print start instruction. Specifically speaking, the execution of various image processes such as color conversion, binarization, and the like, the creation of the commands for printer control regarding the printing method, conveyance amount, etc., and the like are executed by the printer driver 412.

In step 121, the print data formed in step 120 is transmitted from the PC 301 to the printer 302. In FIG. 41, it seems that the print data is transmitted to the printer engine at one certain point of time and the data transmission is completed by the transmission of once. However, actually, the print data is divided in accordance with the capacity of the memory and the data processing ability on the printer 302 side and transmitted and, even during the creation of the print data, the print data is sequentially transmitted.

In step 122, the printer 302 sends the received print data to the printer engine 507 and prints. Since the sheet has already been conveyed to the print start position, the printer engine 507 feeds the sheet in accordance with a print width from the start position, emits the ink, and forms an image.

As mentioned above, the flow of the printing process shown in FIG. 41 shows fundamentals of the invention, the printer 302 once returns the sheet information obtained after the sheet was fed to the PC 301 side, and the PC 301 forms the print data. Since the print data can be formed on the PC 301 side, the printer 302 can be simply constructed at a low price. Further, since the mismatch between the sheet setting based on the sheet sensing result and the sheet setting by the user is discriminated in the printer driver 412 and the communication with the user is made, the preferable image creation to which the intention of the user is maximally reflected and in which the erroneous print setting is hardly executed can be performed. Thus, the user is released from the tiring operation, the wasteful consumption of the ink and the media can be prevented, and the efficient print environment can be obtained.

Figure 42:
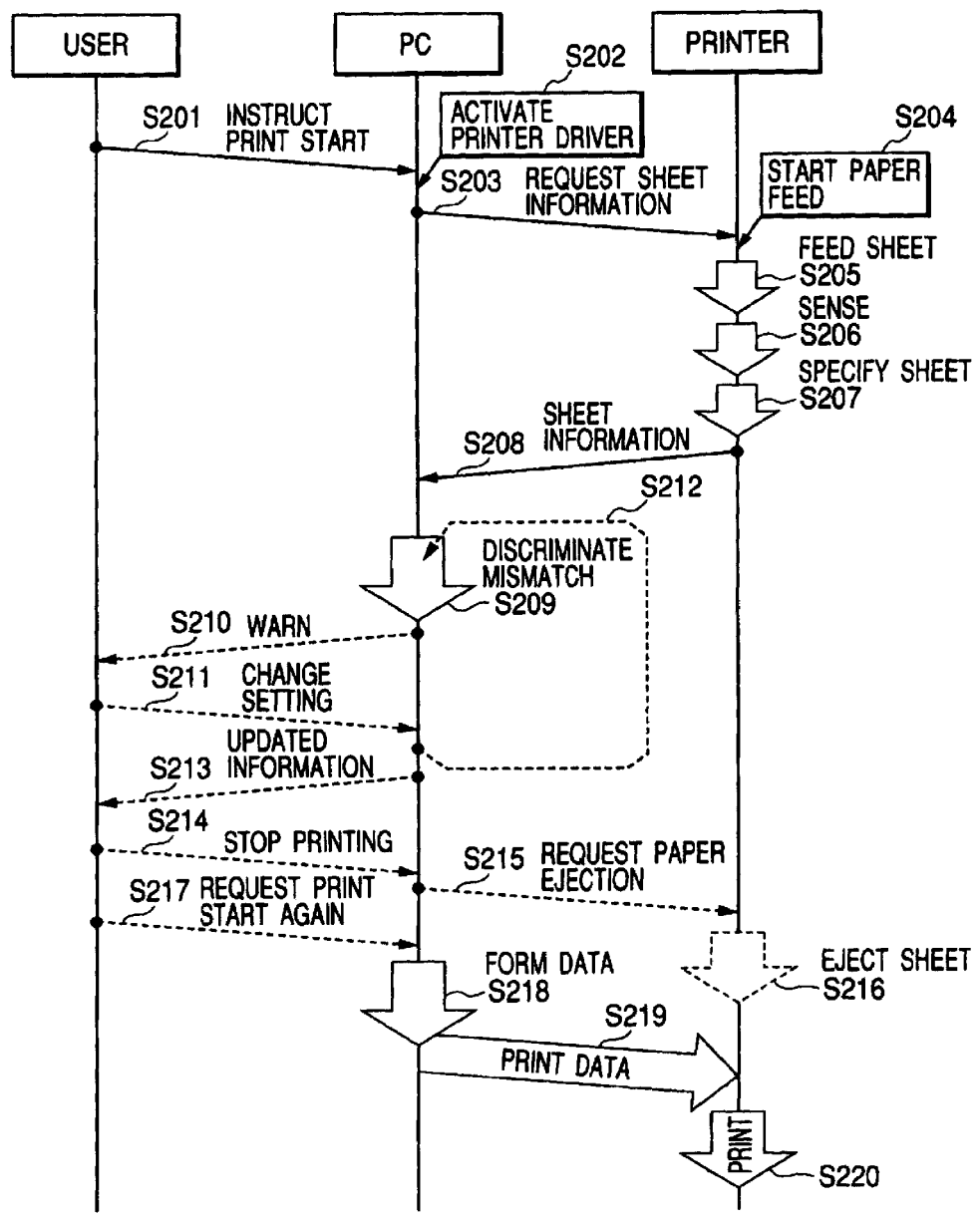
FIG. 42 is a sequence diagram showing a flow of a printing process in the case where there is no print instruction in the eighth embodiment.

FIG. 42 is a sequence diagram showing a flow of a printing process in the case where there is no print instruction in the eighth embodiment.

In step 201, the user instructs the print start. Thus, although the actual printing operation is started, in this case, the print setting is not changed but the printing process is executed on the basis of the preset setting contents. That is, the print data is formed and printed without confirming and setting the print set contents.

Since contents of processes in steps 202 to 208 are similar to those in steps 102 to 108 in FIG. 41, respectively, their description is omitted here. By those processes, the sheet is fed and conveyed to the sensing position and the sheet information is detected and transmitted to the PC 301.

In step 209, whether a mismatch has occurred between the sheet setting based on the sheet information and the set contents which have been preset by the user or the set contents as default designation or not is discriminated. A discrimination reference of the occurrence of the mismatch and a processing procedure of the discrimination will be explained hereinlater.

Since contents of processes in steps 210 to 216 are similar to those in steps 112 to 118 shown in FIG. 41, respectively, their detailed explanation is omitted here. By those processes, if it is determined in step 209 that the mismatch has occurred, the user is warned of such a fact so as to make an instruction and a judgment of the user. In dependence on a result of the judgment, the printing is stopped and the sheet conveyed to the sheet sensing position is ejected.

In step 217, if there is a change in print setting in the flow of processes so far, a trigger is made so as to start the printing under the conditions after the change. That is, the user requests again the PC 301 to start the printing.

Since contents of processes in steps 218 to 220 are similar to those in steps 120 to 122 shown in FIG. 41, respectively, their detailed explanation is omitted here. By those processes, if there is a change in set contents, the PC 301 which received the re-request of the print start performs the subsequent print data creation and print control.

As mentioned above, also in the case where the printing is directly started without displaying the detail setting display screen of the printing from the application which is being operated on the PC 301, the sheet information obtained after the printer 302 fed the sheet is once returned to the PC 301 side and the PC 301 forms the print data in a manner similar to that described with reference to FIG. 41. As compared with the conventional printing system, since it is necessary to change the set contents again and issue the start instruction after the print start, it seems that the burden on the user increases. However, actually, the burden on the user does not increase unless a mismatch of the setting occurs.

A type of sheet (media type) serving as a target in the eighth embodiment is similar to that in FIG. 6.

A size of sheet (media size) serving as a target in the eighth embodiment is similar to that in FIG. 7.

A flowchart showing a procedure for a discriminating process of the type of sheet (media type) in the eighth embodiment and a print setting process to which its discrimination result has been reflected are similar to those in FIGS. 8A and 8B.

A reference table for deciding print quality on the basis of the media type is similar to that in FIG. 9.

An example of a dialog which is displayed onto the display apparatus 518 when the mismatch is pointed out is similar to that in FIG. 15.

Figure 44:
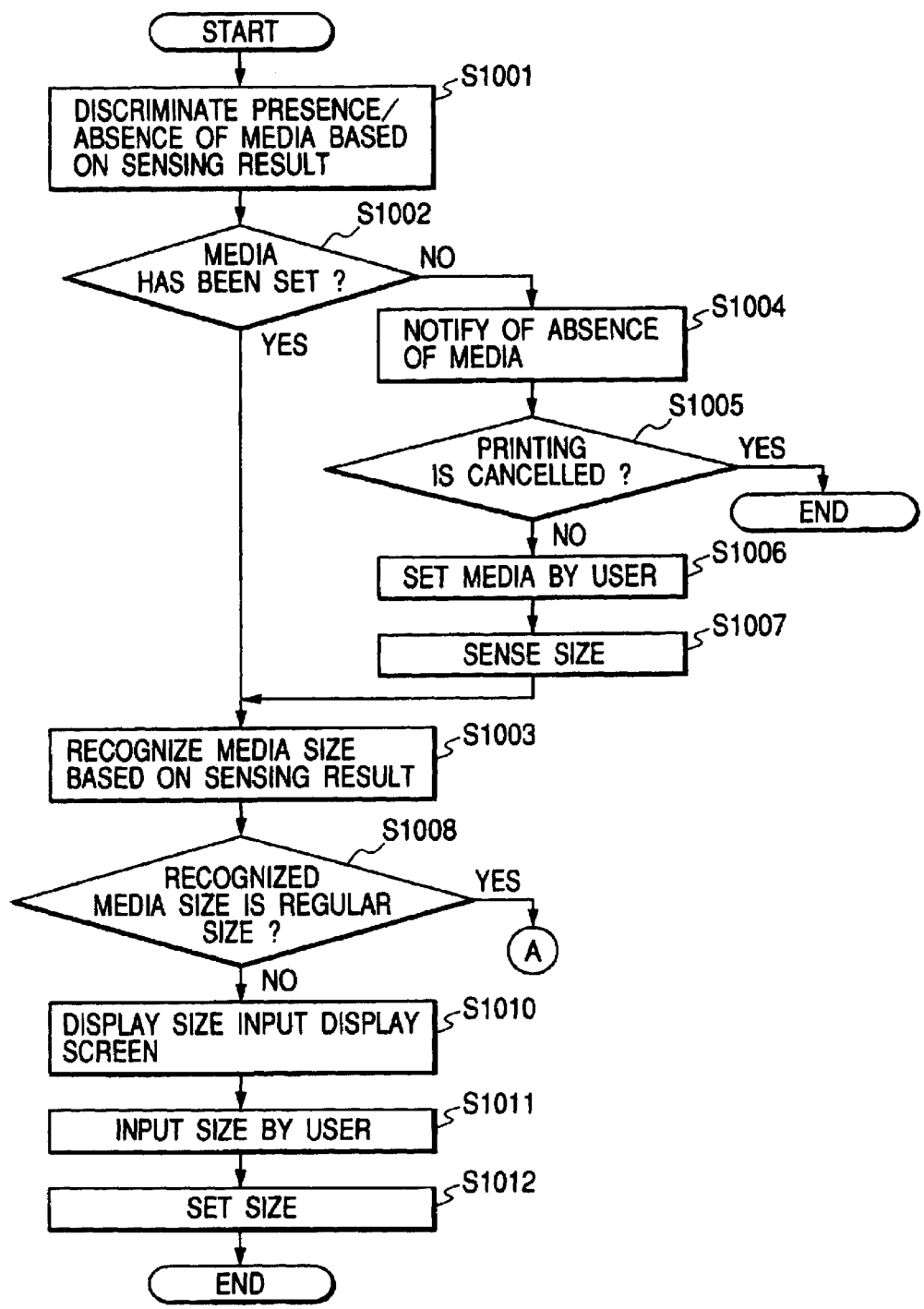
FIG. 44 is a flowchart (1/2) showing a procedure for discriminating processes of a size of sheet (media size) and the presence or absence of the sheets and a media size setting process in the eighth embodiment.
Figure 45:
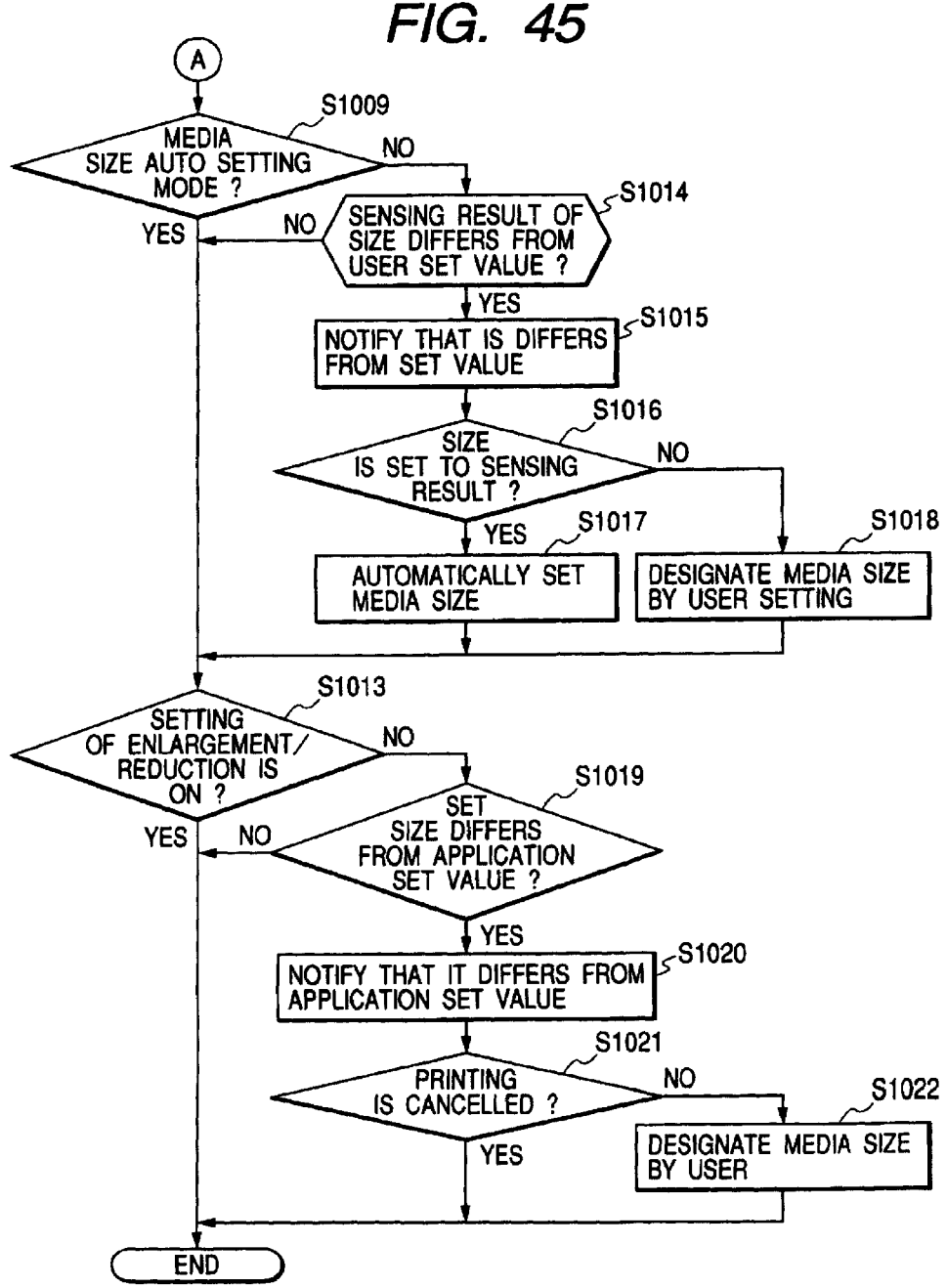
FIG. 45 is a flowchart (2/2) showing the procedure for the discriminating processes of the size of sheet (media size) and the presence or absence of the sheets and the media size setting process in the eighth embodiment.

FIGS. 44 and 45 are flowcharts showing a procedure for the discriminating processes of the size of sheet (media size) and the presence or absence of the sheets and a media size setting process in the eighth embodiment.

In step 1001, whether the sheets have been set in the tray or cassette of the printer 302 or not is discriminated on the basis of the sensing result of the media sensor 509.

In step 1002, if it is determined that the sheets have been set in the tray or cassette of the printer 302 as a result of the discrimination in step 1001, step 1003 follows. If no sheet is set, step 1004 follows.

In step 1003, the size of sheet (media size) is recognized on the basis of the sensing result of the media sensor 509.

In step 1004, in response to the discrimination result showing that no sheet is set, the user is notified of "absence of sheet (media)".

In step 1005, in response to the notification of the absence of sheet, the user discriminates whether the printing is cancelled or not. If the printing is cancelled, the processing routine is finished. In the case of printing, step 1006 follows.

In step 1006, the user sets the sheets onto the tray or cassette of the printer 302 in order to continue the printing. It is also possible that after a dialog for confirming whether the sheets have been set or not was displayed onto the display apparatus 518, the process which is executed after the setting of the sheets is restarted via the PC 301. It is also possible to automatically detect that the sheets have been set and restart the process. A button to restart the process can be also provided for the printer 302. At this time, such a restart button is constructed so as to have not only the print restarting function but also other functions in consideration of costs of the printer 302.

In step 1007, the size of the set sheet is detected by the media sensor 509 and step 1003 follows.

In step 1008, whether the sheet size detected in step 1003 or 1007 coincides with a size of sheet which can be set by the printer driver 412 shown in FIG. 7 or not is discriminated, that is, whether it is the regular size or not is discriminated. In the case of the regular size, step 1009 follows. In the case of the irregular size which does not coincide with the sheet size shown in FIG. 7, step 1010 follows.

In step 1009, whether the sheet (media) size auto setting mode for automatically setting the sheet size has been selected or not is discriminated. The sheet size auto setting mode is a mode for automatically setting the sheet size in accordance with the sensed sheet information. When the auto setting mode is selected, step 1013 follows. If a manual setting mode in which the sheet size is designated by the user has been selected, step 1014 follows.

In step 1010, since it is determined that the media size is the irregular size, an input dialog for allowing the user to manually input the sheet size is displayed onto the display apparatus 518. A construction of the input dialog will be explained hereinlater with reference to FIG. 17.

In step 1011, the user inputs the media size In accordance with the input dialog displayed on the display apparatus 518.

In step 1012, the media size is set in accordance with the media size inputted in step 1011.

In step 1013, whether a function for enlarging or reducing an image or document serving as a print target in accordance with the media size, that is, the enlarging/reducing function is valid or invalid is discriminated. If the enlarging/reducing function is valid, even if the size of sheets set in the printer 302 differs from that designated by the application under operation, the enlarging/reducing process according to the sheet size is executed, thereby realizing the printing in which blanks are proper and a print area does not exceed the media size. Therefore, if the enlarging/reducing function is valid, the media size setting process is finished. If the enlarging/reducing function is invalid, step 1019 follows.

In step 1014, since the media size is manually set by the user, whether the media size which has automatically been set on the basis of the sensing result differs from the media size which has manually been set by the user or not is discriminated. If the media sizes are different, step 1015 follows. If the media sizes are the same, step 1013 follows.

In step 1015, since the media sizes are different, such a fact is notified to the user.

In step 1016, the user determines to select the media size which has automatically been set on the basis of the sensing result or the media size which has manually been set by the user as a media size. In the case of selecting the media size which has automatically been set on the basis of the sensing result, step 1017 follows. In the case of intentionally selecting the media size which has manually been set by the user, step 1018 follows.

In step 1017, the media size which has automatically been set on the basis of the sensing result is used as setting of the media size.

In step 1018, the media size which has manually been set by the user is used as setting of the media size. In this instance, not only the media size which has already been set is designated as a set value but also another sheet size is designated and the set contents can be changed.

In step 1019, whether the media size set by the printer driver 412 differs from that specified in the application or not is discriminated. If the media sizes are different, step 1020 follows. If they are the same, the setting process is finished.

In step 1020, since the media sizes are different, such a fact is notified to the user.

In step 1021, whether the printing itself is cancelled or not is discriminated. In the case of cancelling the printing, the media size setting process is finished. The fed sheet is ejected as it is. In the case of continuing the process, step 1022 follows.

In step 1022, the user manually sets the media size. Specifically speaking, the application is opened and the operation to set the designated media size to the media size set by the printer driver 412 is executed.

As mentioned above, if no sheet is set to the printer 302, such a fact is notified to the user before the print start so that he judges whether the printing is continued or not. In the case of continuing, a procedure which is executed until the user sets the sheets into the printer 302 and restarts the process is supported by the user interface of the printer driver 412.

If the setting mode of the media size is the auto setting mode and the enlarging/reducing function is valid, the media size is set on the basis of the sensing result of the media sensor and an image is formed in accordance with the set media size. Even if the media size specified by the application differs from the media size set by the printer driver 412, the printing according to the actual media size can be automatically performed by the enlarging/reducing function without burdening the user.

If the enlarging/reducing function is invalid, the media size based on the sheet setting of the printer driver 412 is compared with the media size specified by the application. If the media sizes are the same as a result of the comparison, the user does not need to be particularly aware of the setting of the media size. If they differ, such a fact is notified to the user, thereby enabling the media size to be set while the intention of the user is reflected. If such a notification is not performed and the media size on the application side has been set to be larger than that by the sheet setting of the printer driver 412, an image larger than the sheet is formed. In the case of the printer of the ink jet type, consequently, the ink is adhered into the printer such as platen, conveying guide, or the like. The adhered ink dirties the sheet to be fed next, so that a serious problem is caused. The embodiment can avoid such a problem.

The setting of the media size is performed on the basis of the sheet information according to the sensing result as mentioned above.

FIG. 12 is a diagram showing a print dialog which is displayed when the print command is executed from the application under operation.

Reference numeral 1201 denotes the print dialog which is constructed by display areas 1202 to 1208.

Reference numeral 1202 denotes the area in which the name, status, and the like of the printer which prints are displayed.

Reference numeral 1203 denotes the field in which a selected one of names of makers and apparatus names of a plurality of printers is displayed. By clicking a mark on the right side, the user selects a desired printer from a list of the plurality of printers which are displayed. When he does not click the right-side mark, the printer which is default-set as a printer which is ordinarily used is displayed.

Reference numeral 1204 denotes the button to display a property of the printer displayed in the field 1203. By pressing the button 1204, the printer driver 412 is activated and detailed contents of the print setting such as type, size, print quality, and the like of the sheet are displayed. The print setting can be performed by using this display.

Reference numeral 1205 denotes the area for displaying the print range. One of the mode to print all pages, the mode to print only the page opened at present, and the mode to print only the designated pages can be selected.

Reference numeral 1206 denotes the area for displaying the number of sheets to be printed. The user can designate the number of sheets to be printed by inputting a desired numerical value.

Reference numeral 1207 denotes the "OK" button. If it is determined that there is no problem under the above set conditions in the areas 1202 and 1205, the printing is started by pressing the "OK" button 1207.

Reference numeral 1208 denotes the "Cancel" button. If there is a problem under the set conditions in the areas 1202 and 1205, the printing is stopped by pressing the "Cancel" button 1208.

The display contents shown in FIG. 12 are merely shown as an example. It should be noted that when the user tries to print, the printer driver 412 is activated at certain timing.

That the functions for performing the various settings and making the discrimination about the mismatch described so far are realized by the program codes constructing the printer driver 412. However, a part or all of the functions can be realized by software such as OS, application, or the like other than the printer driver 412. If those functions are supported by the OS, the functions can be realized in every printer or its connecting environment instead of the specific printer.

A print mode and a setting dialog which is displayed when various sheet settings are performed are similar to those in FIG. 13.

A warning dialog which is displayed when the media type specified on the basis of the sensing result differs from the manual setting by the user is similar to that in FIG. 14.

An example of a dialog which is displayed when it is detected that no sheet is set in the tray or cassette of the printer 302 is similar to that in FIG. 16.

An example of an input dialog which is displayed when the user selects the sheet of the irregular size is similar to that in FIG. 17.

A warning dialog which is displayed when the sheet size set in the printer 302 differs from the setting by the user is similar to that in FIG. 18.

A warning dialog which is displayed when it is determined that the mismatch has occurred between the size of sheet set in the printer 302 and that designated by the application is similar to that in FIG. 19.

As described above, in the eighth embodiment, the information such as type, size, and the like of the sheet which are necessary for setting the sheet in the print setting is obtained by sensing the sheet fed from the tray, cassette, or the like during the conveyance and used, so that the print setting in which the ink and media are not wasted and which is suitable for the sheet can be automatically performed without burdening the user.

Particularly, by performing the creation of the print data and the control of the printer on the data processing apparatus side of a high speed and high performance such as a PC or the like, the printing system can be constructed at a high speed and at a low price.

By discriminating the mismatch between the print setting based on the sheet information obtained as a sensing result and the print quality which has manually been set by the user, the printing system to which the intention of the user is reflected and the improper printing is hardly executed can be provided.

Although the flow of the setting has been described on the assumption that the targets to be sensed are set to the type of sheet (media type) and the size of sheet (media size) in the embodiment, it is also possible to construct the system in a manner such that by sensing only the media type as one of the information, a notification or the like to the user according to the auto setting of the print quality and the discrimination of the mismatch is performed. That is, since the media size cannot be automatically set, the perfect automation of the print setting cannot be realized. However, the object of the invention can be sufficiently accomplished with respect to the setting of the print quality.

Ninth Embodiment

The ninth embodiment will now be described.

A construction of the ninth embodiment is fundamentally the same as that of the eighth embodiment. Therefore, in an explanation of the ninth embodiment, the same portions as those in the construction of the eighth embodiment are designated by the same reference numerals, their descriptions are omitted, and only different portions will be described.

Figure 46:
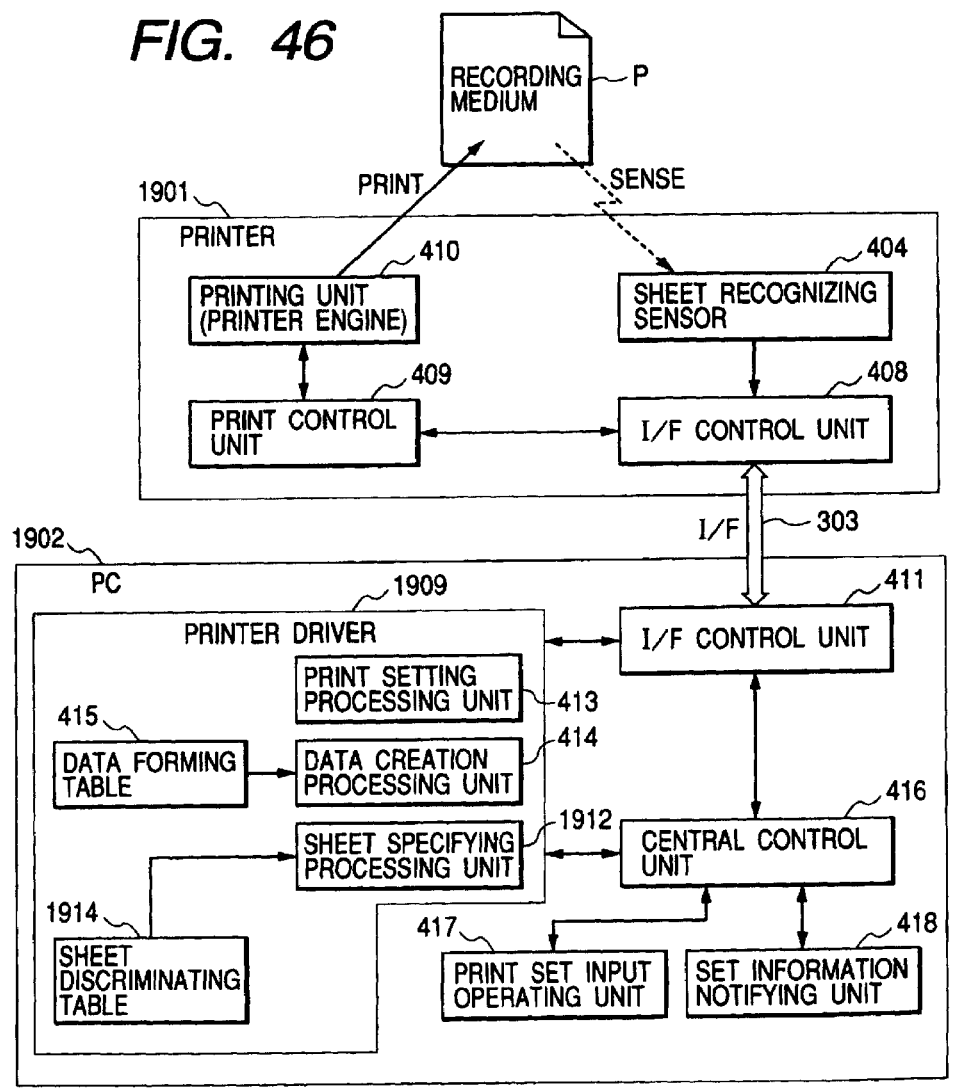
FIG. 46 is a functional block diagram of a printing system in the ninth embodiment.

FIG. 46 is a functional block diagram of a printing system in the ninth embodiment.

In the ninth embodiment, a sheet specifying processing unit 1912 and a table 1914 for sheet discrimination are provided on the side of a PC 1902, and the sheet specifying processing unit 405 and the table 406 for sheet discrimination provided on the printer 302 side in the eighth embodiment are deleted.

Since the sheet specifying process is executed on the PC 1902 side, in a printer 1901, the output value of the sheet recognizing sensor 404 is transmitted to the PC 1902 side via the I/F control unit 408.

Reference numeral 1909 denotes a printer driver for performing the various settings for printing, the creation of print data, and control of the printer 1901 on the PC 1902. This printer driver is constructed by software.

The sheet specifying processing unit 1912 specifies the type and size of the sheet on the basis of the output information of the sheet recognizing sensor 404 with reference to the table 1914 for sheet discrimination. The output information from the sheet recognizing sensor 404 is sent to the PC 1902 via the communication interface 303.

As mentioned above, the printing system in the ninth embodiment is constructed by: the printer 1901 for which the sheet recognizing sensor 404 for outputting parameters to specify the sheet has been provided; the PC 1902 having the function for specifying the sheet on the basis of the parameters obtained on the printer 1901 side and the function for forming the print data and the control command on the basis of the instruction and selection of the user; and the communication interface 303 which connects those two apparatuses and can bidirectionally communicate.

In this construction, since the sheet specifying processing unit 1912 is provided on the PC 1902 side instead of the printer 1901 side, the parameters to specify the sheet and the discrimination reference can be easily changed merely by updating the software of the printer driver 1909.

Figure 47:
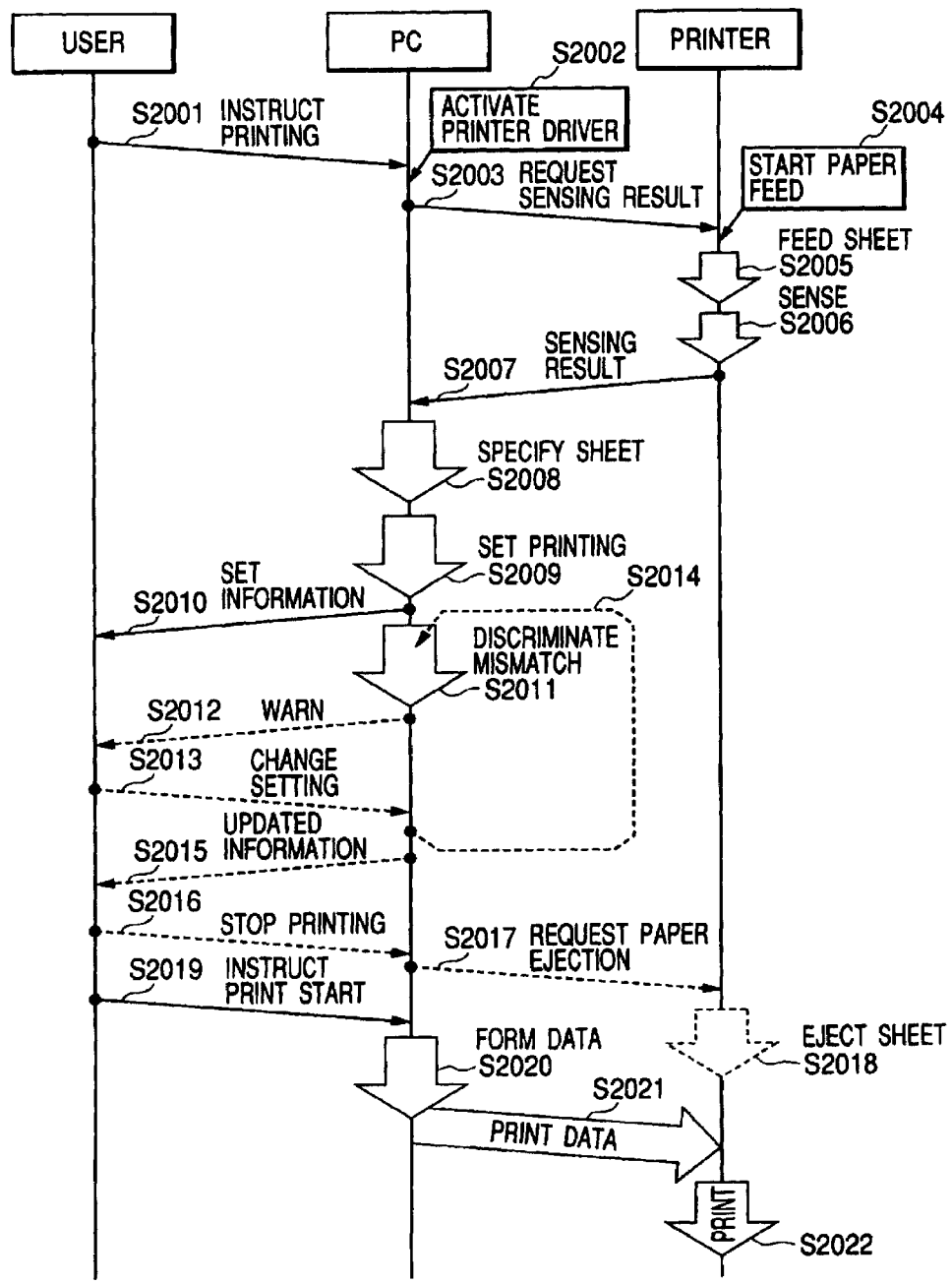
FIG. 47 is a sequence diagram showing a flow of a printing process in the case where there is a print instruction in the ninth embodiment.

FIG. 47 is a sequence diagram showing a flow of a printing process in the ninth embodiment. This flow shows the printing process which is executed among the user, the PC 1902, and the printer 1901 in the case where there is a print instruction.

The flow of the printing process in the ninth embodiment is fundamentally the same as that in the eighth embodiment shown in FIG. 41. It differs from the eighth embodiment with respect to a point that the sheet specifying process is executed on the PC 1902 side instead of the printer 1901 side. Specifically speaking, the sheet specifying process which is executed in the printer 302 after the sensing operation in step 106 in the eighth embodiment is executed in the PC 1902 just before the print setting process in step 2009 as shown in step 2008 in the ninth embodiment.

In the ninth embodiment, the sheet discriminating table 1914 and a discrimination processing algorithm which are used when the sheet specifying processing unit 1912 executes the sheet specifying process can be changed on the PC 1902 side. Thus, there is an advantage such that as compared with the case where it is executed on the printer 302 side as in the eighth embodiment, it is possible to flexibly cope with such a change.

Figure 48:
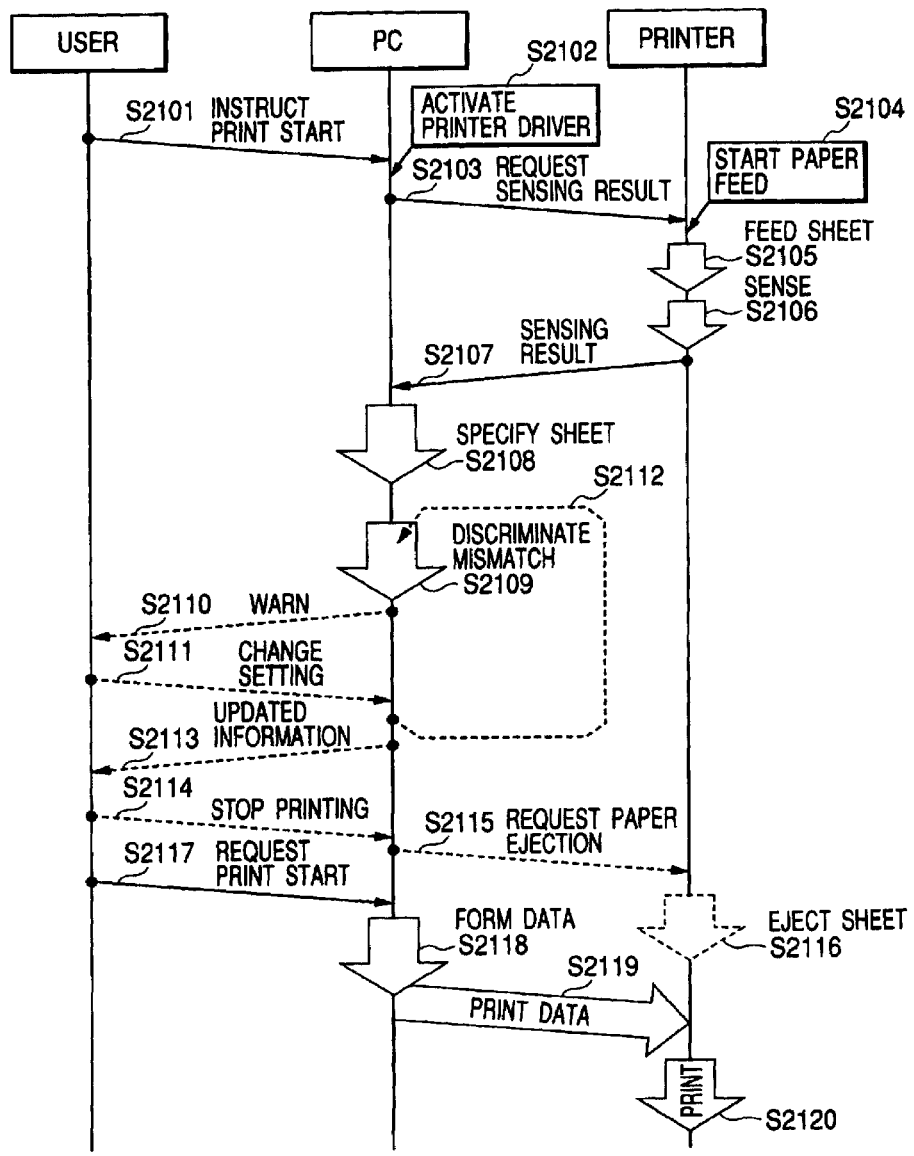
FIG. 48 is a sequence diagram showing a flow of a printing process in the case where there is no print instruction in the ninth embodiment.

FIG. 48 is a sequence diagram showing a flow of a printing process in the case where there is no print instruction in the ninth embodiment.

The flow of the printing process in the ninth embodiment is fundamentally the same as that in the eighth embodiment shown in FIG. 42. It differs from the eighth embodiment with respect to a point that the sheet specifying process is executed on the PC 1902 side instead of the printer 1901 side. Specifically speaking, the sheet specifying process which is executed in the printer 302 after the sensing operation in step 206 in the eighth embodiment is executed in the PC 1902 just before the mismatch discriminating process in step 2109 as shown in step 2108 in the ninth embodiment.

Also in the case where the printing is directly started by the application which is being executed on the PC 1902 without displaying the detail setting display screen of the printing, by once returning the sheet information obtained after the feed of the sheet to the PC 1902 side and forming the print data, effects similar to those by the flow of the processes shown in FIG. 47 can be obtained.

In a manner similar to the eighth embodiment, according to the ninth embodiment, the sheet information (output value of the sheet recognizing sensor 404) obtained after the sheet was fed is once returned to the PC 1902 side and print data is formed. Thus, since the print data can be formed on the PC 1902 side, the printer 1901 can be simply constructed at a low price. Further, by discriminating the mismatch with the user's manual setting in the printer driver 1909 and making the communication with the user, the printing system to which the intention of the user is maximally reflected and in which the erroneous printing is hardly executed can be constructed. Thus, even in the ninth embodiment, the user is released from the tiring operation, the wasteful consumption of the ink and media can be prevented, and an efficient print environment can be obtained.

Particularly, in the ninth embodiment, since the sheet specifying process is executed on the PC 1902 side instead of the printer 1901 side, its processing contents and the discrimination reference can be easily changed. Although it is difficult on the printer 1901 side to cope with the case such as recognition of a new media or the like, it can be realized merely by updating the printer driver 1909 on the PC 1902 side.

Tenth Embodiment

The tenth embodiment will now be described.

A construction of a printing system in the tenth embodiment is similar to that of FIG. 27.

Figure 49:
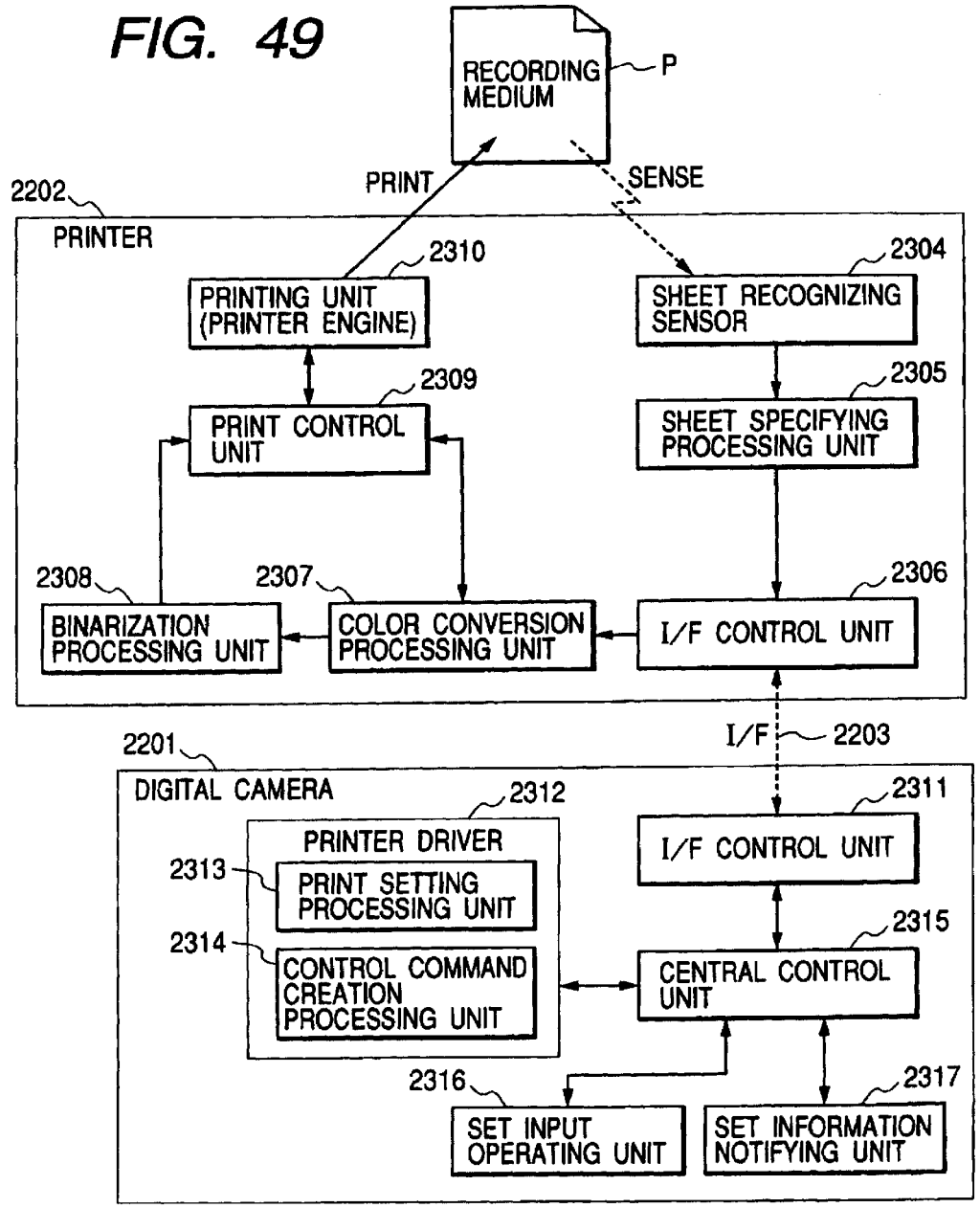
FIG. 49 is a functional block diagram of a printing system in the tenth embodiment.

FIG. 49 is a functional block diagram of the printing system in the tenth embodiment.

A printer 2202 is a printer of the ink jet type and constructed by various functional blocks 2304 to 2310. A digital camera 2201 is constructed by various functional blocks 2311 to 2317. In both of the printer 2202 and the digital camera 2201, functions which are considered to be particularly unnecessary when explaining the tenth embodiment are omitted here.

A communication interface 2203 is assumed to be an interface of Bluetooth as a wireless standard which uses the band of 2.4 GHz.

In the printer 2202, reference numeral 2304 denotes a sheet recognizing sensor (media sensor) for detecting information to specify the type and size of the recording medium P. It is assumed that the recording media P have been stacked in the paper feed tray, cassette, or the like provided for the printer 2202. Since explanation about the means for specifying the type and size of the sheet is similar to that in the first embodiment, it is omitted here.

Reference numeral 2305 denotes a sheet specifying processing unit for specifying the sheet on the basis of an output result of the sheet recognizing sensor 2304. In the tenth embodiment, the sheet specifying processing unit 2305 specifies the type and size of the sheet by a numerical value arithmetic operation using output values of the sensor as parameters. The user can change numerical expressions which are used in the numerical value arithmetic operation.

Reference numeral 2306 denotes an I/F control unit having an interface function of the printer 2202. Since the communication interface 2203 is the Bluetooth interface, the I/F control unit 2306 comprises a base band chip, an RF module, and a link controller. By this I/F control unit, transmission of the sheet information, reception of the print data and control command, and the like are performed. Status information such as error generated in the printer 2202, communication status, and the like is also transmitted to the digital camera 2201 if it is requested.

Reference numeral 2307 denotes a color conversion processing unit for converting the color image data of RGB multivalues sent from the digital camera 2201 into data of YMCK. Various image corrections are also performed in the color conversion processing unit 2307.

Reference numeral 2308 denotes a binarization processing unit for converting the image data converted into the multivalue data of YMCK by the color conversion processing unit 2307 into binary data. Although there are many binarizing methods, it is assumed that the error diffusion method is used in the binarization processing unit 2308.

Reference numeral 2309 denotes a print control unit for developing the data to be printed into a printing unit 2310. The printing unit 2310 is controlled by using the print data binarized in the binarization processing unit 2308 in accordance with a command for print control sent from the digital camera 2201. Specifically speaking, various control which are changed in accordance with characteristics of the sheet, for example, control of the implant amount of the ink and a change in the number of paths are executed.

Reference numeral 2310 denotes the printing unit which is also called a printer engine. This printer engine executes the printing onto the recording medium P on the basis of the print data developed by the print control unit 2309.

In the digital camera 2201, reference numeral 2311 denotes an I/F control unit having an interface function of the digital camera 2201. This I/F control unit is constructed by a controller of Bluetooth. A partial function can be also realized by firmware.

Reference numeral 2312 denotes a printer driver for performing various settings for printing, creation of the print data, and control of the printer 2202 on the digital camera 2201 and this printer driver is constructed by software. The printer driver 2312 is constructed by a print setting processing unit 2313 and a control command creation processing unit 2314. The printer driver 2312 is not constructed by another software as a printer driver like a printer driver 412 of the PC 301 described in the first embodiment but is constructed as a part of a firmware function in the digital camera 2201.

The print setting processing unit 2313 performs various print settings including the setting of the sheet, the setting of the print quality, and the like. That is, the print setting processing unit 2313 has a function for displaying or notifying the set contents in response to an instruction or an input from the user and a function for automatically performing the sheet setting on the basis of the sheet information sent from the printer 2202. Contents of the print auto setting function including the sheet setting and the discriminating function of the occurrence of the mismatch are similar to those in the first embodiment.

The control command creation processing unit 2314 forms the printer control command for making the print control.

Reference numeral 2315 denotes a central control unit for controlling various functions of the digital camera 2201. This central control unit is constructed by a CPU.

Reference numeral 2316 denotes a set input operating unit constructed by a button for reflecting the intention of the user to the print setting and the like.

Reference numeral 2317 denotes a set information notifying unit for notifying the user of the print set contents. This set information notifying unit is also used as a liquid crystal display apparatus provided for previewing the photographed images or displaying a menu.

As mentioned above, the printing system in the tenth embodiment is constructed by: the printer 2202 in which the sheet recognizing sensor 2304 is provided and which has the function for specifying the type and size of the sheet and the function for converting the multivalue image data into the binary data for printing; the digital camera 2201 having the function for forming the image data and the control command on the basis of the sheet information specified on the printer 2202 side and the instruction or selection made by the user; and the communication interface 2203 which connects those two apparatuses and can bidirectionally communicate.

Figure 50:
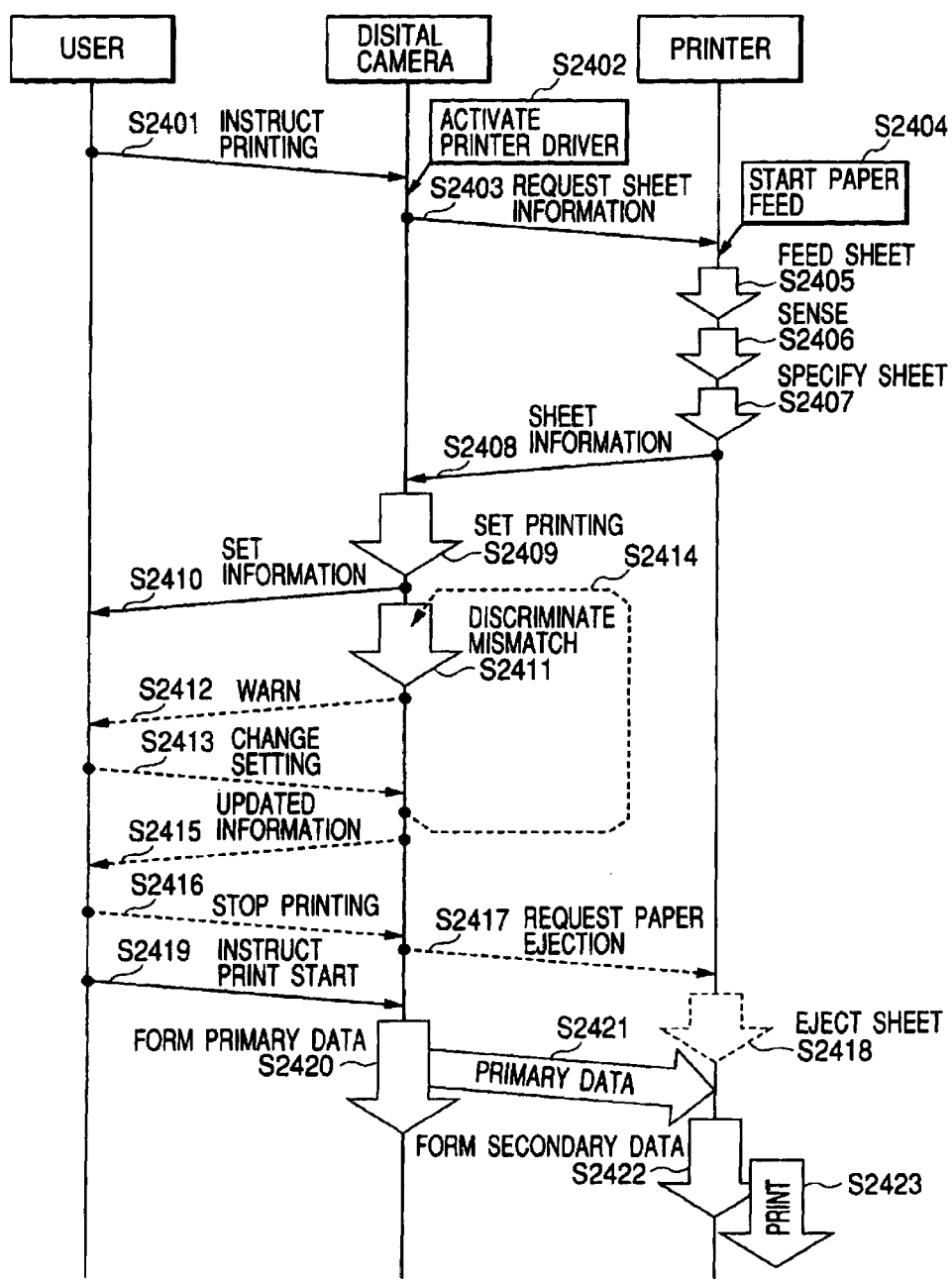
FIG. 50 is a sequence diagram showing a flow of a printing process in the case where there is a print instruction in the tenth embodiment.

FIG. 50 is a sequence diagram showing a flow of a printing process in the tenth embodiment. This flow shows the printing process among the user, the digital camera 2201, and the printer 2202 in the case where there is a print instruction.

The flow of the printing process in the tenth embodiment is fundamentally the same as that in the eighth embodiment shown in FIG. 41. Although the creation of the binary data which can be immediately used on the printer 302 side has been executed on the PC 301 side in the eighth embodiment, in the tenth embodiment, the image process and the conversion from the multivalue data into the binary data are executed on the printer 2202 side.

Since processes in steps 2401 to 2419 are similar to those in steps 101 to 119 in the eighth embodiment shown in FIG. 41, respectively, their description is omitted here. In the processes in steps 2401 to 2419, the sheet information is obtained, discrimination about a mismatch is made, and the user issues a final print start instruction. A construction of obtaining the sheet information before the user starts the printing is also similar to that in the eighth embodiment.

In step 2420 in the tenth embodiment, the printer driver 2312 on the digital camera 2201 receives the print start instruction and forms primary data corresponding to the print setting. The tenth embodiment differs from the eighth embodiment with respect to a point that the creation of the print data according to the sheet type is executed in the printer 2202 instead of the digital camera 2201 side as a data processing apparatus. In the digital camera 2201, only the creation of the print data which does not depend on the sheet type is executed. However, the control command according to the sheet type is formed in the digital camera 2201. Specifically speaking, since the various image processes such as color conversion, binarization, and the like are executed in the printer 2202, positioning of a print object, creation of the printer control command suitable for the sheet, and the like are performed. Upon printing of image data of a photograph or the like, the multivalue data of RGB is transmitted as it is to the printer 2202.

In step 2421, the primary data formed in step 2420 is transmitted to the printer 2202.

In step 2422, the printer 2202 forms secondary data according to the sheet type on the basis of the control command formed in step 2420. Specifically speaking, processes for converting the transmitted RGB data into YMCK data and converting the multivalue data into binary data are executed.

In step 2423, the printer 2202 transmits the print data (secondary data) formed by itself to the printer engine 2310 and prints it. At this time, print control suitable for the sheet information is also made.

In such a printing system, since it is necessary to process the multivalue data on the printer 2202 side, a higher-speed arithmetic operation processing apparatus or dedicated hardware needs to be provided on the printer 2202 side. Although it is disadvantageous in terms of costs, if it is considered as a printing system, it is sufficiently practical because the PC having the high processing function is not used as a data processing apparatus unlike the eighth embodiment is not used. This is because if it is intended to provide the printing function for a general digital camera, it is very difficult that various image processes depending on the type of printer are executed by the digital camera. It is necessary that many printer profiles are held on the digital camera side and a data process is executed at a high speed similar to that of the PC, and unlike the PC, the profile cannot be easily updated. Rather by using such a construction, similar effects can be obtained also in a printing system in which a device without high processing ability like a PC is used as a data processing apparatus. As compared with the conventional system, by previously obtaining the sheet information, the printing system to which the intention of the user is maximally reflected and in which the preferable image can be formed can be constructed.

Figure 51:
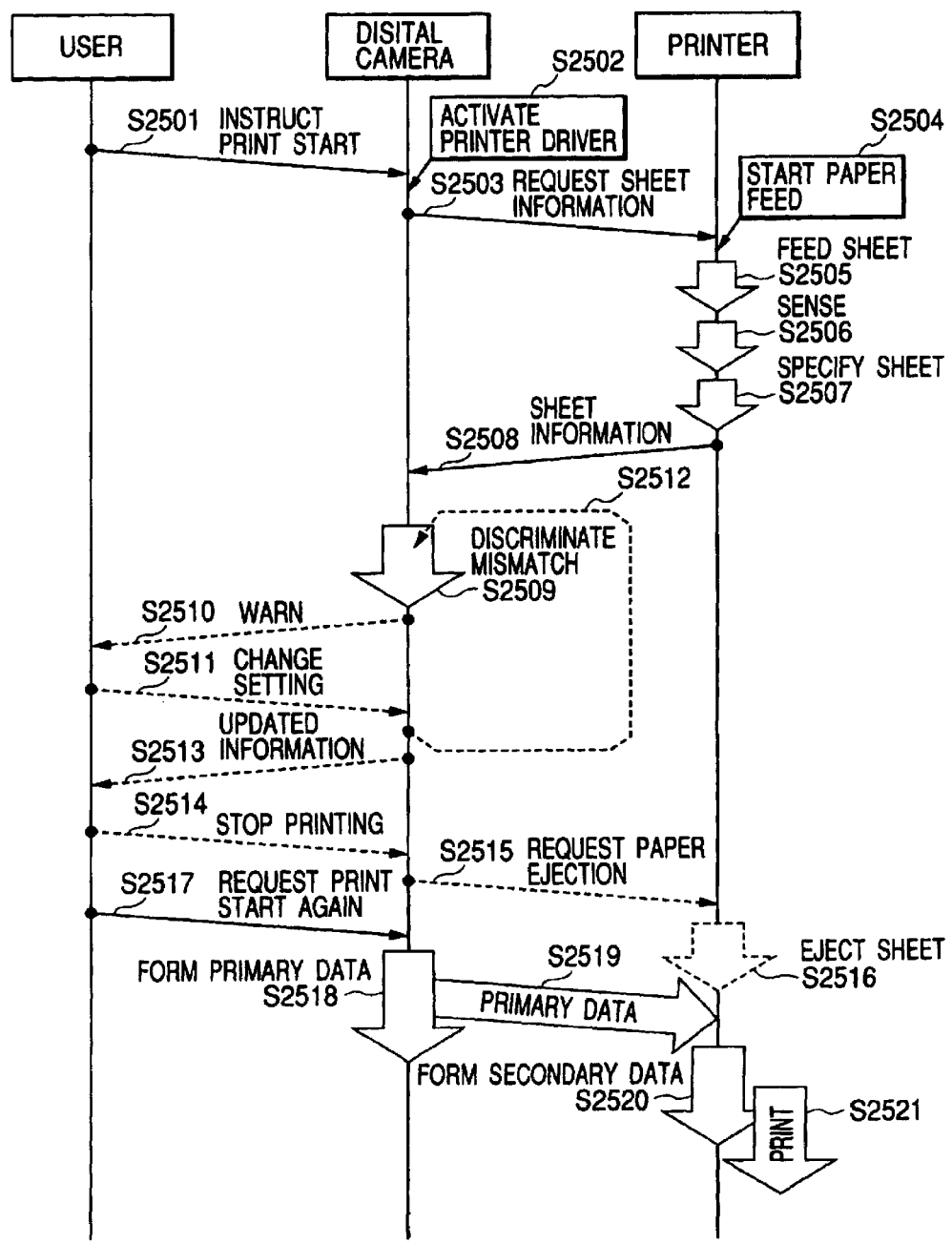
FIG. 51 is a sequence diagram showing a flow of a printing process in the case where there is no print instruction in the tenth embodiment.

FIG. 51 is a sequence diagram showing a flow of a printing process in the case where there is no print instruction in the tenth embodiment.

The flow of the printing process in the tenth embodiment is fundamentally the same as that in the eighth embodiment shown in FIG. 42. Although the creation of the binary data which can be immediately used on the printer 302 side has been executed on the PC 301 side in the eighth embodiment, in the tenth embodiment, the image process and the conversion from the multivalue data into the binary data are executed on the printer 2202 side.

Since processes in steps 2501 to 2517 in the tenth embodiment are similar to those in steps 201 to 217 in the eighth embodiment shown in FIG. 42, respectively, their description is omitted here.

Also in the case of directly starting the printing from the digital camera 2201 without confirming the setting, similar effects can be obtained by obtaining the media sensing result (data) after the instruction of the print start request in a manner similar to the processes shown in FIG. 50.

In the tenth embodiment, a part of the effects described in the eighth embodiment can be realized. That is, in the tenth embodiment, even in the construction such that the conversion from the multivalue data into the binary data is executed in the printer 2202, by discriminating the mismatch with the user setting and making the communication with the user in a manner similar to the other embodiments, the printing system to which the intention of the user is maximally reflected and in which the unpreferable printing is hardly executed can be constructed. There are advantages such that the whole printing system can be constructed at a low price and the general digital camera can be used. Thus, the user is released from the tiring operation, the wasteful consumption of the ink and media can be prevented, and an efficient print environment can be obtained.

Although the case where the digital camera is used as a data processing apparatus has been described in the tenth embodiment, similar effects can be also obtained if the PC is used as a data processing apparatus in a manner similar to the eighth embodiment.

Eleventh Embodiment

The eleventh embodiment will now be described.

The print setting process including the mismatch discrimination executed on the data processing apparatus (PC, digital camera) side in the eighth to tenth embodiments is executed on the printer side in the eleventh embodiment.

A functional block diagram of a printing system in the eleventh embodiment is similar to that of FIG. 31.

Figure 52:
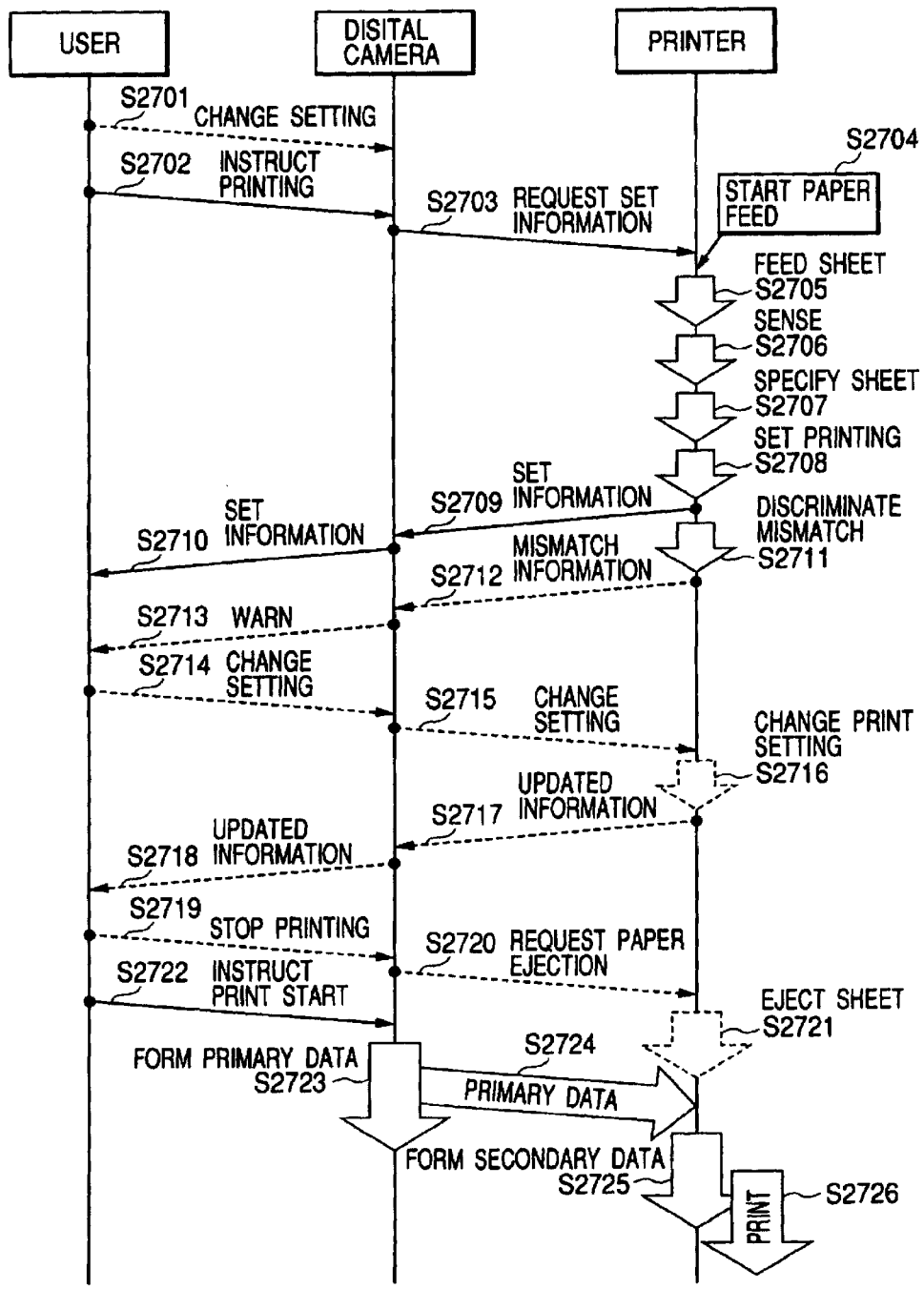
FIG. 52 is a sequence diagram showing a flow of a printing process in the case where there is a print instruction in the eleventh embodiment.

FIG. 52 is a sequence diagram showing a flow of a printing process in the eleventh embodiment. This flow shows the printing process which is executed among the user, the digital camera, and the printer in the case where there is a print instruction.

The flow of the printing process in the eleventh embodiment is fundamentally the same as that in the tenth embodiment shown in FIG. 50. Although the print setting including the sheet setting has been executed on the digital camera side as a data processing apparatus in the tenth embodiment, in the eleventh embodiment, all image processes as well as the data creation are executed on the printer side. In the eleventh embodiment, the data which is transmitted and received between the digital camera and the printer is separated into the image data of a large capacity and other data such as a control command and the like and they are transmitted and received via other means, that is, the memory card and the communication interface, respectively.

In step 2701, when the user wants to change the print set contents, the user instructs the digital camera with respect to its change portions and contents.

In step 2702, the user instructs the print request to the digital camera.

In step 2703, the digital camera makes the obtaining request of the print set information to the printer in response to the print request instruction in step 2702. In this instance, it can make the obtaining request of not only the print set information but also information regarding the presence/absence of the sheets to be set in the printer, the status of the interface between the digital camera and the printer and information of the printer engine such as type of ink cartridge and residual amount of the ink, and the like. Upon requesting, fundamental print setting conditions such as print quality, media size, and the like which have been set on the digital camera side are also sent to the printer side.

Since contents of processes in steps 2704 to 2707 are similar to those in steps 2404 to 2407 shown in FIG. 50, respectively, their explanation is omitted here. In the processes in steps 2704 to 2707, in the printer, the sheet is conveyed to the sensing position of the sheet recognizing sensor, the sensing operation is executed, and the type and size of the sheet are specified on the basis of the sensing result. A construction to obtain the sheet information before the print start is similar to that of the tenth embodiment.

In step 2708, the printer executes the auto print setting on the basis of the sheet information obtained in step 2707. Contents of the print setting and the flow of processes are similar to those in the other embodiments. Whether a mismatch has occurred between the sheet setting and the sheet setting which has arbitrarily been designated by the user when the sheet setting based on the sheet information in the print setting is executed or not is also discriminated here.

In step 2709, the printer transmits the print set information including the contents automatically set in step 2708 to the digital camera.

In step 2710, the digital camera displays the received print set information onto a display apparatus such as a liquid crystal monitor or the like. If the mismatch has occurred between the contents of the auto sheet setting and those of the user setting in step 2708, such a fact is displayed and the user is noticed or warned of it.

In step 2711, the printer discriminates whether a mismatch has occurred between the print quality which has automatically been set on the basis of the sheet information and the print quality which has manually been set by the user or not. Since a discrimination reference of the occurrence of the mismatch and a discriminating process are similar to those in the other embodiments, their description is omitted here.

In step 2712, if it is determined in step 2711 that the mismatch has occurred, the printer transmits such a fact to the digital camera.

In step 2713, if it is determined in step 2711 that the mismatch has occurred, the digital camera notifies or warns the user of such a fact. Although the notification and warning are given by displaying it onto the display screen, the warning can be displayed together with an audio sound so as to notify the user.

In step 2714, in the case where the user changes the contents of the print setting by confirming the print set information displayed in step 2710 or in accordance with the warning displayed in step 2713, information regarding the change portions and contents is transmitted to the digital camera.

In step 2715, the digital camera transmits the information sent in step 2714 to the printer.

In step 2716, the printer receives the change instruction information and changes the contents of the print setting. Although not explained in detail here, since there is also a case where informalities exist in the set contents according to the user instruction, the mismatch discrimination can be also executed again after completion of the setting change in this step.

In step 2717, the print set information after the updating to which the Instruction Information obtained in step 2714 has been reflected is transmitted to the digital camera.

In step 2718, the digital camera displays the received print set information after the updating onto the monitor.

The user can repeat the process In step 2714 and perform desired setting.

Since contents of processes In steps 2719 to 2726 are similar to those in steps 2416 to 2423 shown in FIG. 50, respectively, their explanation Is omitted here. In the processes in steps 2719 to 2726, the printing Is started, data according to the sheet is formed, and the printing is performed. In the case of stopping the printing, the sheet conveyed to the sensing position is ejected.

Since almost all of the processes regarding the print setting are executed on the printer side as mentioned above, it is very easy to construct the digital camera as a part of the printing system or change the print setting.

Figure 53:
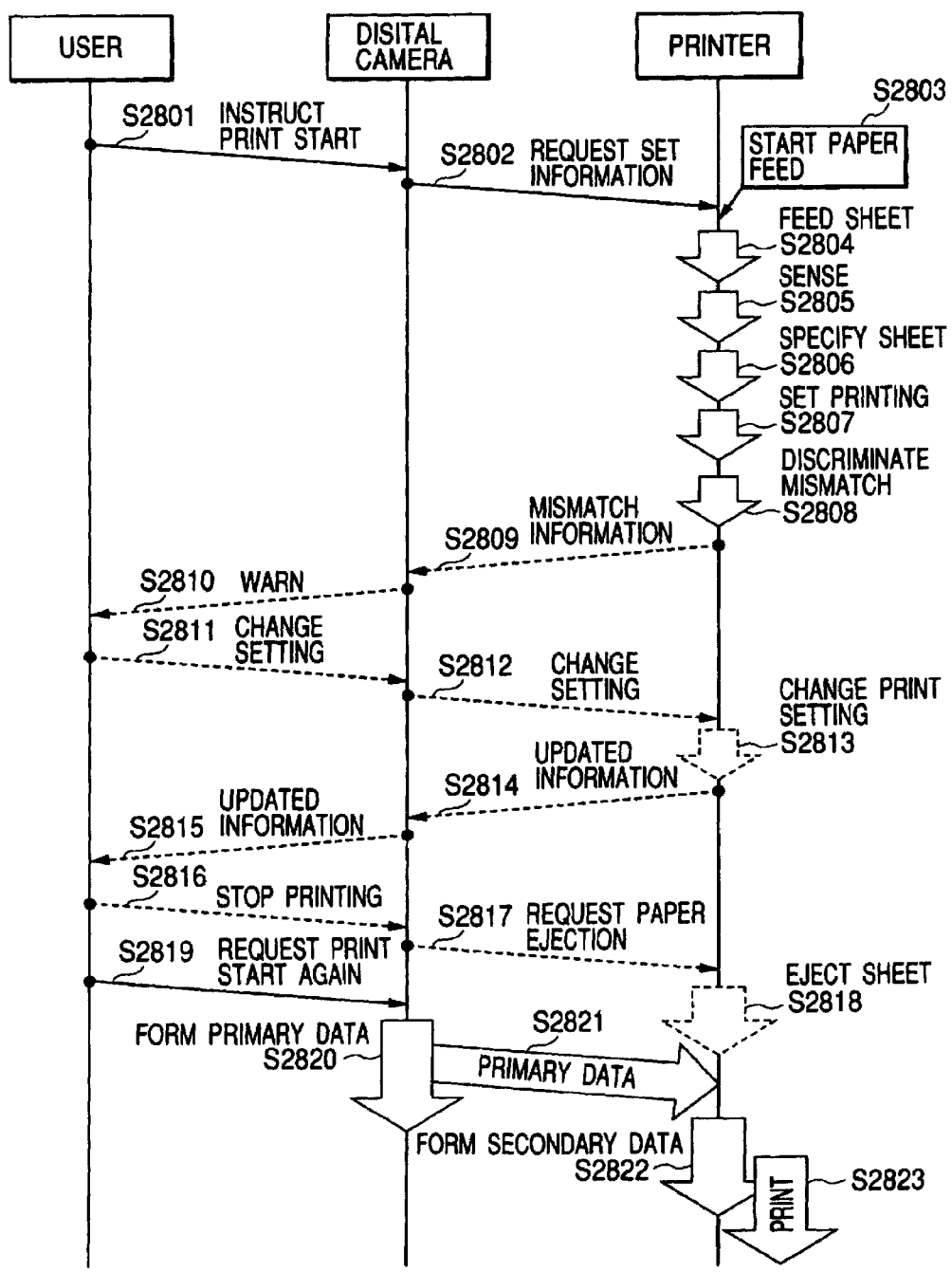
FIG. 53 is a sequence diagram showing a flow of a printing process in the case where there is no print instruction in the eleventh embodiment.

FIG. 53 Is a sequence diagram showing a flow of a printing process In the case where there is no print instruction in the eleventh embodiment.

The flow of the printing process In the eleventh embodiment is fundamentally the same as that in the tenth embodiment shown in FIG. 51. Although the print setting including the sheet setting has been performed on the digital camera side as a data processing apparatus in the tenth embodiment, all processes including the data creation are executed on the printer side in the eleventh embodiment.

Although the printing is directly started without displaying the detail setting display screen of the printing in the processes shown in FIG. 53, effects similar to those of the processes shown in FIG. 52 can be obtained.

In the eleventh embodiment, effects similar to those in the tenth embodiment can be realized. That is, the printing system to which the intention of the user is maximally reflected and in which the preferable image can be formed can be constructed. There is also an advantage such that the general digital camera can be used. Thus: the user is released from the tiring operation, the wasteful consumption of the ink and the media can be prevented, and the efficient print environment can be obtained.

Although the effects have been described with respect to the case where the digital camera is used as an example of the data processing apparatus in the eleventh embodiment, similar effects can be also obtained in the case of using the PC as a data processing apparatus in a manner similar to the eighth embodiment.

Although two interfaces of the memory card for image data and the communication interface for confirming the print setting have been used as an interface between the data processing apparatus (digital camera) and the printer in the eleventh embodiment, even if the interface is realized by using only one type of them, there is no problem so long as data communication of a large capacity can be made.

Twelfth Embodiment

The twelfth embodiment for realizing the invention will be described with reference to the drawings.

Figure 36:
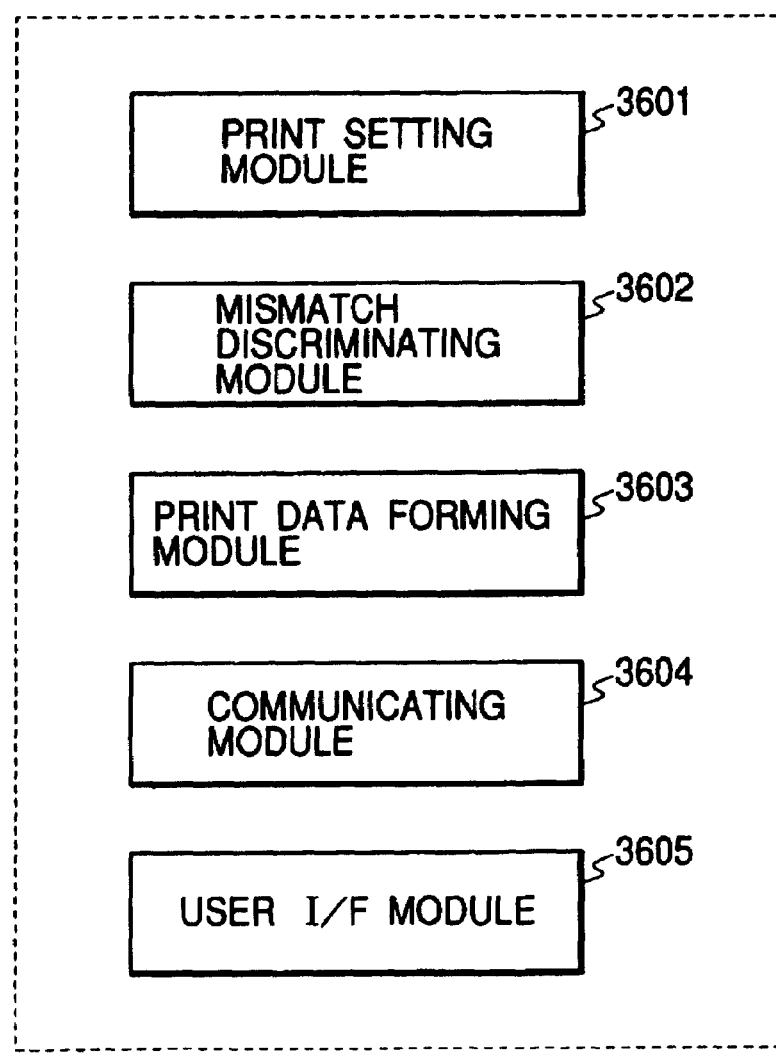
FIG. 36 is a diagram showing a memory map in a recording medium in the twelfth embodiment.
Figure 37:
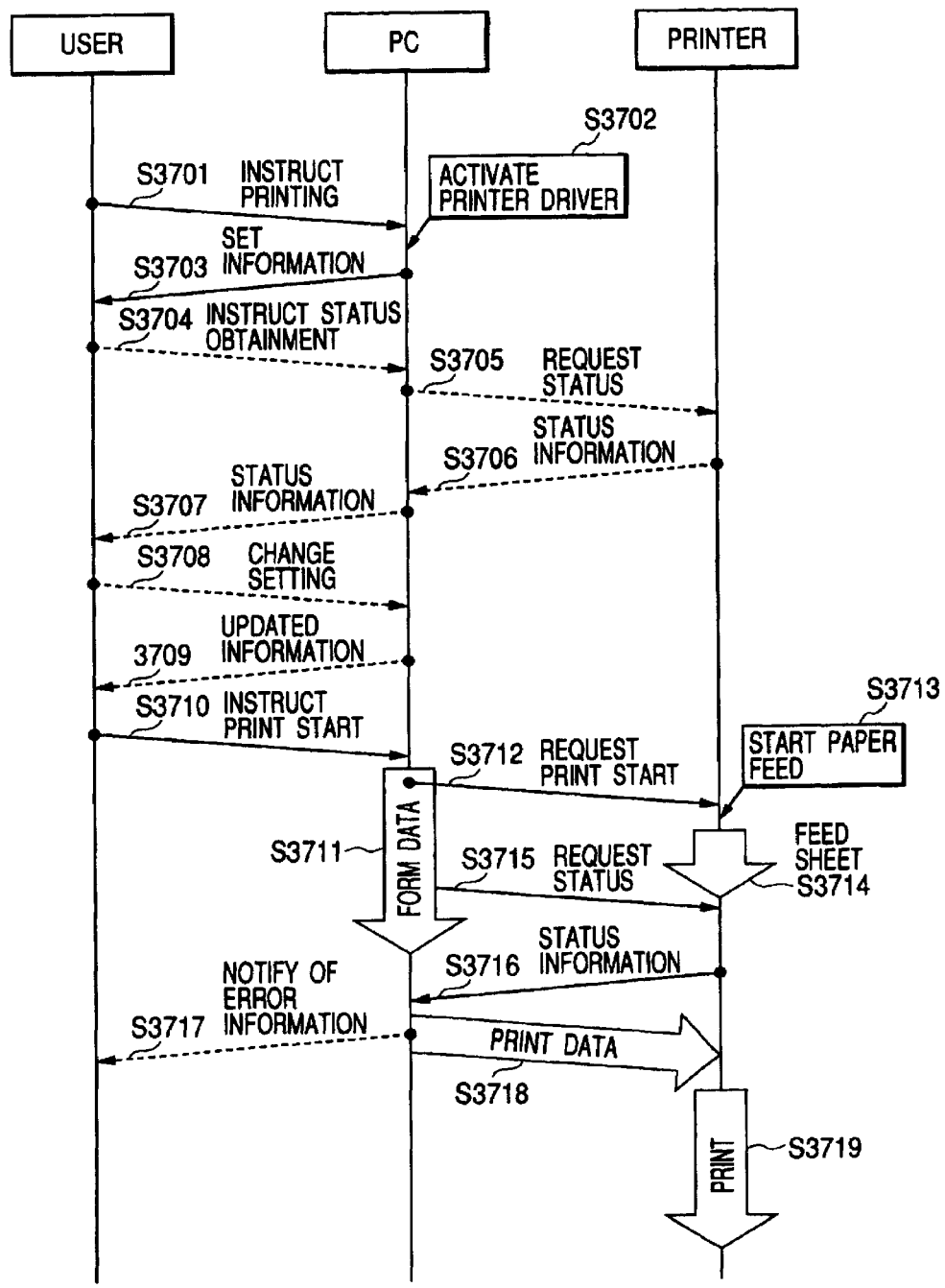
FIG. 37 is a diagram showing a flow of processes of a prior art general ink jet printer.
Figure 38:
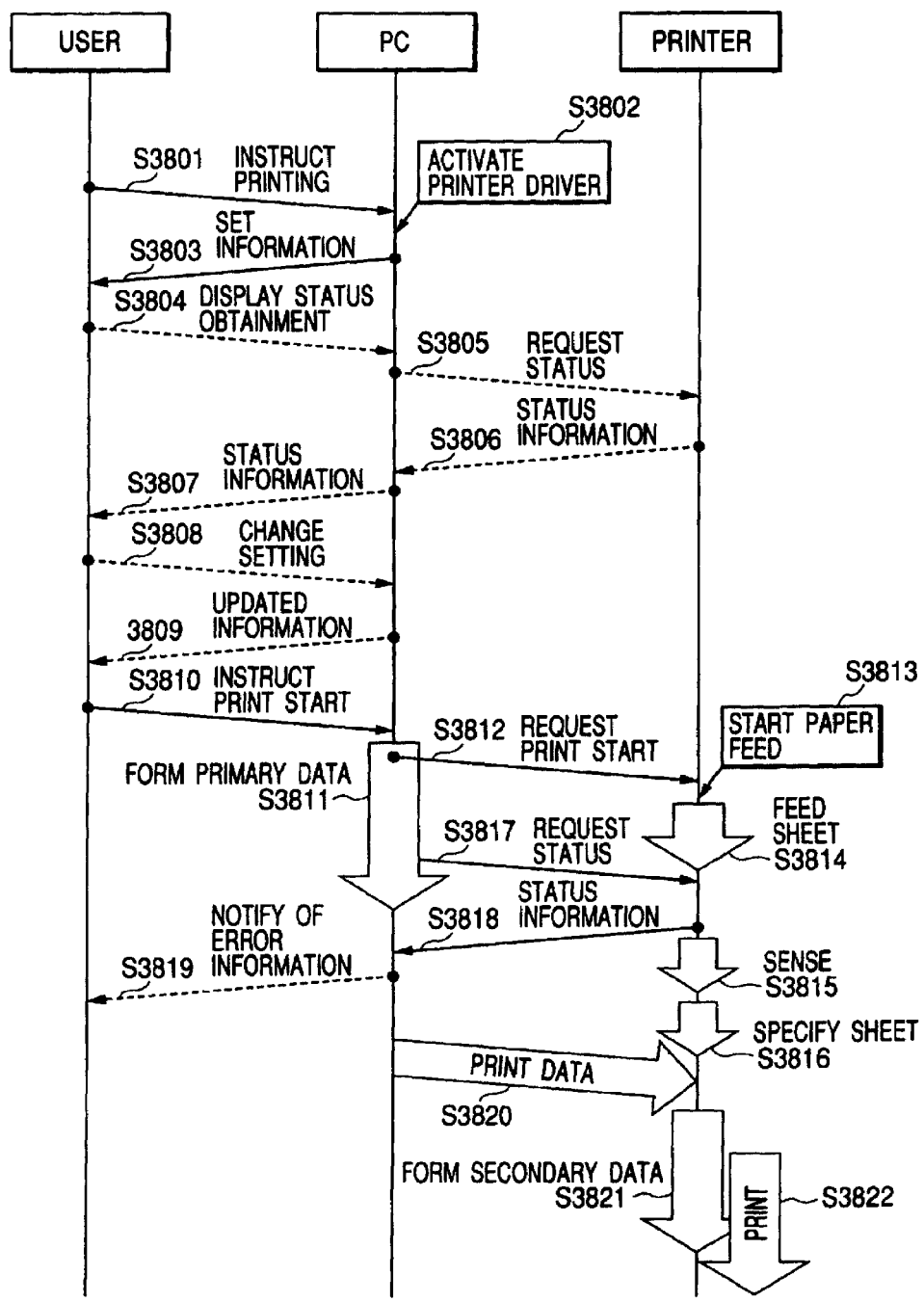
FIG. 38 is a diagram showing a flow of processes of a prior art ink jet printer with a media sensor.
Figure 39:
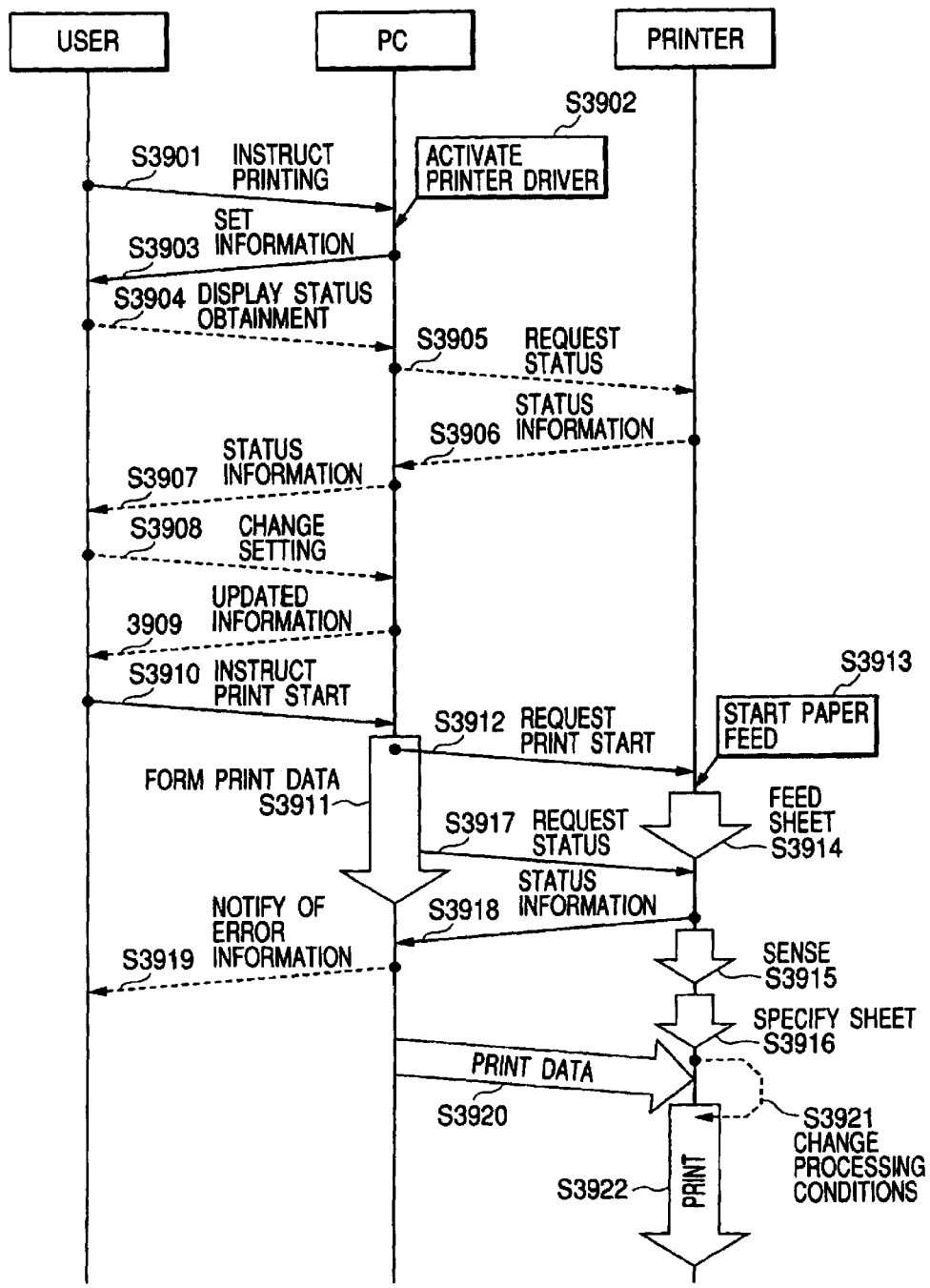
FIG. 39 is a diagram showing a flow of processes of a prior art laser beam printer with a media sensor.
Figure 40:
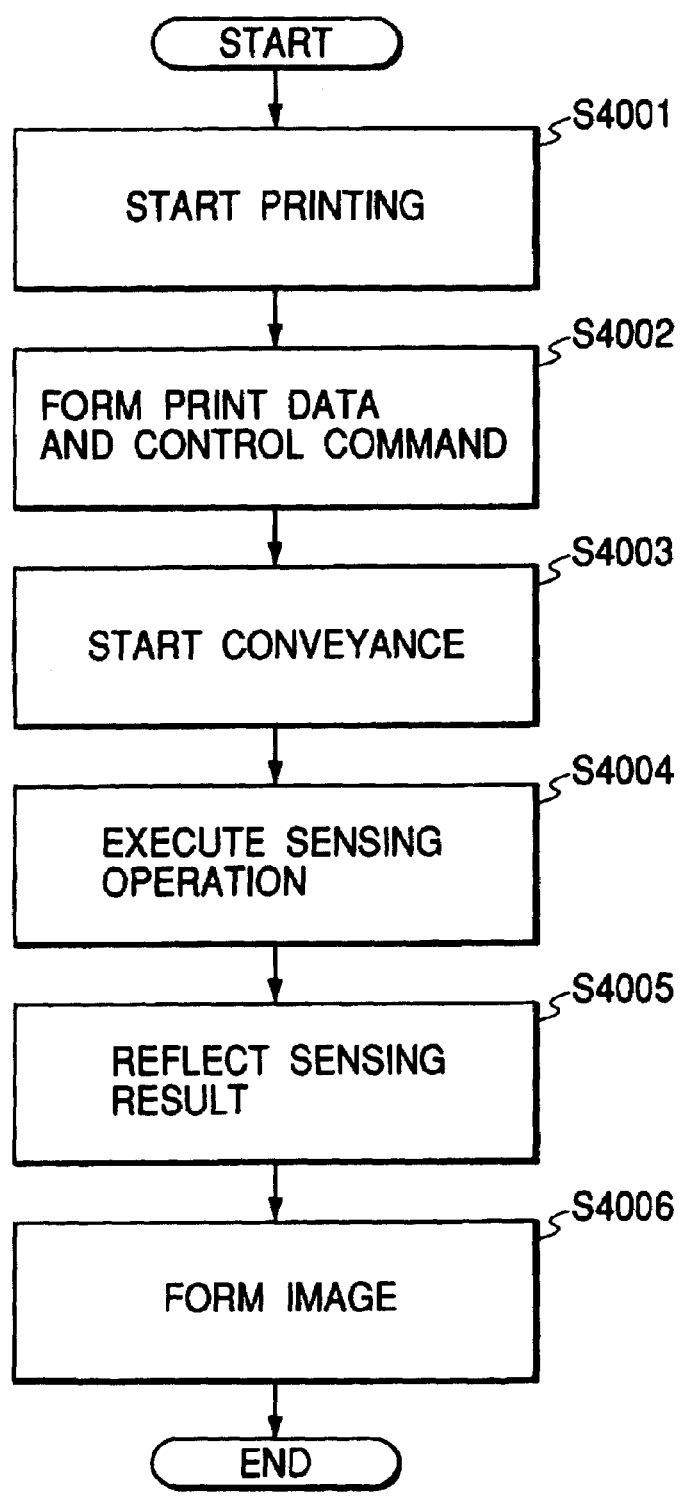
FIG. 40 is a flowchart showing an outline of processes of a prior art printer with a media sensor.

FIG. 36 is a diagram showing a memory map in a recording medium in the twelfth embodiment.

The objects of the invention are also accomplished by a method whereby a memory medium in which program codes of software to realize the functions of the embodiments mentioned above have been recorded is supplied to a system or an apparatus and a computer (or a CPU or an MPU) of the system or apparatus reads out the program codes stored in the memory medium and executes them.

In this case, the program codes themselves read out from the memory medium realize the functions of the embodiments mentioned above, and the memory medium in which the program codes have been stored constructs the invention.

As a memory medium for supplying the program codes, for example, an FD (floppy disk), a hard disk, an optical disk such as CD-ROM, CD-R, CD-RW, DVD-RAM, DVD-RW, or the like, a magnetooptic disk such as an MO or the like, a magnetic tape, a non-volatile memory card such as a flash memory or the like, a ROM, or the like corresponds to such a medium and they can be used.

Naturally, the invention incorporates not only a case where a computer executes the read-out program codes, so that the functions of the embodiments mentioned above are realized but also a case where an OS (Operating System) or the like which is operating on the computer executes a part or all of actual processes on the basis of instructions of the program codes and the functions of the embodiments mentioned above are realized by those processes.

Further, naturally, the invention incorporates a case where the program codes read out from the memory medium are written into a memory provided for a function expanding board inserted into a computer or a function expanding unit connected to a computer and, thereafter, a CPU or the like provided for the function expanding board or the function expanding unit executes a part or all of actual processes on the basis of instructions of the program codes and the functions of the embodiments mentioned above are realized by those processes.

In the case of applying the invention to the memory medium, the program codes corresponding to the flowcharts described above are stored into the memory medium. When simply explaining it, each module shown in the memory map as an example of FIG. 36 is stored into the memory medium. That is, it is sufficient that the program codes of at least a print setting module 3601, a mismatch discriminating module 3602, a print data forming module 3603, a communicating module 3604, and a user interface module 3605 are stored into the memory medium.

As described above, even if the construction to realize the functions is the memory medium in which the program codes that can be read out by a computer or software serving as program codes themselves, the information such as type and size of the sheet and the like which are necessary for sheet setting in the print setting is obtained in a state where the sheet has been set into the tray, cassette, or the like, that is, at the stage before the paper feed and utilized. Thus, it is possible to realize the printing system with excellent operability and use convenience in which the print setting suitable for the sheet can be automatically performed without burdening the user and wasting the ink and the media.

Particularly, in the case where the creation of the print data and the control of the printer are performed on the high-speed and high-performance data processing apparatus side such as a PC or the like, the flexible printing system of a higher speed can be constructed at a lower price.

By presenting the sheet information to the user before the print start and discriminating the mismatch between the print setting based on the sheet information obtained as a sensing result and the print quality set by the user, the printing system to which the intention of the user is more reflected and in which the improper printing is hardly executed can be constructed.

Other Embodiments

Another embodiment for realizing the invention will be described hereinbelow.

As features of the invention, to explain the data processing apparatus as one of the component elements of the printing system, the PC has been presumed in the first to fourth and the seventh embodiments and the digital camera has been presumed in the fifth and sixth embodiments, respectively. However, the data processing apparatus does not always have the functions which are peculiar to those PC and digital camera.

As described in the first to fourth embodiments, if the data processing apparatus side has the function such that it can discriminate the mismatch between the auto print setting and the print quality, its type is not limited. As described in the fifth and sixth embodiments, by presuming the case where the processes until the creation of the print data including the image processes are executed on the printer side, the number of functions which are required on the data processing apparatus side decreases and the effects can be also realized in the existing household appliances, an Internet connecting apparatus, and communication tools such as cellular phones and the like which have been widespread. The individual device and apparatus are not limited so long as the total functions are satisfied as a printing system.

From the above explanation, it seems that a number of data processing apparatuses which can realize the invention other than the PC and the digital camera exist. For example, there are a Set-Top Box, a digital video camera, a digital TV, a BS/CS tuner, a game machine, a cellular phone, a PDA, and the like.

In the case where the user tries to print by such a digital apparatus in which the connection to the printer is not ordinarily largely presumed, the print setting is complicated and there is also a possibility that the unpreferable printing is executed. In such a case as well, by certainly grasp the information of the recording medium serving as a print target prior to printing and automating the complicated print setting so as to reduce the burden on the user as much as possible, large effects can be obtained. The user designates only the portion such as print quality which is entrusted to the intention of the user, so that the printing system which can realize the more preferable image creation from the correspondence to the sheet information while reflecting the user's intention can be provided.

Particularly, in a device such as a cellular phone or the like in which it is presumed in future to handle contents of a large capacity, it is very important to prepare a mechanism for printing the contents. The embodiments contribute largely to the construction of a printing system which can satisfy the expect of the user as mentioned above.

As described above, according to the embodiments of the invention, the following effects are obtained.

1. By providing the media sensor, previously grasping the information of the sheet, and presenting it to the user, the image creation which is optimum to the sheet can be performed. Thus, the expensive ink and media are not wasted. A problem such that it takes a long time for printing more than it is needed can be also prevented.
2. The tiring process such that the user selects the sheets set in the printer from a large number of types of sheets is unnecessary. The user does not need to have a knowledge of the sheet and there is no anxiety that he erroneously sets it. .
3. The high-speed and high-performance data processing apparatus such as a PC or the like is used as a component element of the printing system and the various image processes such as color conversion, binarization, and the like according to the sheet are executed on the PC side, so that the high-speed arithmetic operation processing apparatus and the hardware such as dedicated DSP, ASIC, or the like are also unnecessary on the printer side. The printing system can be constructed at a lower price.
4. Although the media sensor itself is provided for the printer, as shown in the second and fourth embodiments, by providing the sheet specifying portion for the data processing apparatus side instead of the printer, the PC side can hold the reference table serving as a discrimination reference which is necessary when the sheet is specified and the various values such as parameters or the like which are used at the time of the numerical value arithmetic operation. In the case of changing the parameters in the printer, it is accompanied with a risk due to the rewriting of the ROM. However, since it is sufficient to merely change the software on the PC, it is possible to safely and flexibly cope with a new media.
5. Since the information such as type, size, and the like of the sheets set in the printer is obtained before the printing is started and the user is released from the process, whether the print quality suitable for the sheet has been set or not is automatically discriminated. If there is a fear that the unpreferable image is formed, the user is notified so as to make an instruction, so that the printing which is more suitable for the sheet can be performed.
6. Since the information such as type, size, and the like of the sheets set in the printer is obtained before the printing is started, as compared with the case of sensing the media after the print start, the print time is shortened by the time that is required for the sensing operation and the time that is required for executing the subsequent image processes according to the sheet. In the case of printing a plurality of pages, particularly, a time difference between them is typical. In a system in which only the first page is sensed, even if another sheet is fed during the printing operation, it is impossible to cope with such a case. However, the present invention can cope with it.
7. Although the type of sensor is not specified, the sheet information can be obtained before the paper feed. Thus, the various effects described in the embodiments can be obtained.
8. By using the construction such that the conveyance amount which differs depending on the sheet type is accurately detected before the start of the conveyance, a sensor to decide a head position of the sheet is unnecessary. By controlling the proper conveyance amount, picture quality is also improved.
9. In the case where the printer of the electrophotographic type is used as a component element of the printing system, by previously grasping information of the sheets stacked in the cassette, a time which is necessary to execute the sensing operation and the sheet specifying operation can be set to a sufficiently longer time than that in the case of sensing it during the conveyance. Thus, the invention can be realized by an arithmetic operation processing apparatus having processing ability which is not enough higher than that in the case of sensing it during the conveyance. A system in the printer can be also easily designed.
10. By specifying the sheet type, the conveyance amount which differs depending on the sheet type can be accurately grasped. Thus, the conveyance amount can be properly controlled and the print picture quality is improved.
11. By arranging the sensing position of the media sensor to a halfway position of the sheet, a distance between the media sensor and the sheet can be specified. Since the distance between the media sensor and the sheet becomes constant, designing also including the case of using an optical sensor becomes easy.

As mentioned above, the information such as type, size, and the like of the sheet which are necessary for the sheet setting in the print setting is obtained at the stage before the paper feed as a state where the sheets have been set in the tray, cassette, or the like and utilized, so that the printing system and method, the computer-readable memory medium, and software with the excellent operability and use convenience in which the proper print setting according to the sheet can be automatically executed without burdening the user and wasting the ink and the media are provided. By performing the creation of the print data and the printer control on the high-speed and high-performance data processing apparatus side such as a PC or the like, the higher-speed printing system can be constructed at a lower price.

By discriminating the mismatch between the print setting based on the sheet information obtained as a sensing result and the print quality which has arbitrarily been set by the user, the printing system to which the intention of the user is reflected, the erroneous printing is reduced, and the preferable image can be formed is provided.

Further, since the time which is required for the sensing operation is not included in the print time, effects such that the print time is reduced, the system can flexibly cope with a new media, and the like can be obtained.

Particularly, in the first invention, since the construction such that the print quality is presumed and specified on the basis of the sheet information is used, the printing system which enables the perfect auto setting of the printing without further burdening the user can be realized.

In the second invention, since the user can select the print quality, the print setting is performed on the basis of the sheet information obtained by the sensor and the print quality selected by the user, so that the printing system which can perform the printing to which the intention of the user has been reflected from the setting result can be realized.

Further, in the third invention, when the print setting is performed on the basis of the sheet information obtained by the sensor and the print quality selected by the user, by discriminating whether the mismatch has occurred in the print setting or not, the printing system which can prevent the error that is not intended by the user and form the preferable image can be realized.

As described above, according to the invention, the information such as type, size, and the like of the sheet which are necessary for the sheet setting in the print setting is obtained in a state where the sheets have been set in the tray, cassette, or the like, that is, at the stage before the paper feed and utilized, so that it is possible to provide the data processing apparatus, printing apparatus, printing system, data processing method, printing method, and program, in which the print setting suitable for the sheet can be automatically performed.

Further, by presenting the sheet information to the user, it is possible to provide the data processing apparatus, printing apparatus, printing system, data processing method, printing method, and program with excellent operability and use convenience, in which the print setting suitable for the sheet can be automatically performed without burdening the user and wasting the ink and the media.

Particularly, in the case where the creation of the print data and the printer control are performed on the high-speed and high-performance data processing apparatus side such as a PC or the like, the higher-speed printing system can be constructed at a low price.

By discriminating the mismatch between the print setting based on the sheet information obtained as a sensing result and the print quality which has arbitrarily been set by the user, the printing system to which the intention of the user is further reflected and the improper printing is hardly executed as much as possible, that is, the preferable image can be formed anytime can be provided.

In the embodiments of the invention, the information such as type, size, and the like of the sheet which are necessary for the sheet setting in the print setting is obtained during the conveyance of the sheet and utilized, so that the auto print setting can be performed without burdening the user and the proper print setting according to the sheet can be performed without wasting the ink and the media.

What is claimed is:

1. A print control apparatus for controlling a printer, comprising:
    a first discrimination unit configured to discriminate whether there is a mismatch between a media type sensed at the printer and a media type designated by a user;
    a first display unit configured to display a first screen on which a message is displayed indicating that there is a mismatch between the two media types, and on which the user is allowed to select the sensed media type or the designated media type, if said first discrimination unit discriminates that there is a mismatch between the two media types;
    a sheet setting unit configured to set the sensed media type or the designated media type as sheet setting, in accordance with the selection made on the first screen displayed by said first display unit;
    a second discrimination unit configured to discriminate whether there is a mismatch between the media type set by said sheet setting unit and print quality;
    a second display unit configured to display a second screen on which a message is displayed indicating that there is a mismatch between the media type and print quality, and on which the user is allowed to select or not to select adapting of print quality to the media type, if said second discrimination unit discriminates that there is a mismatch between the media type and print quality;
    a print quality setting unit configured to set print setting using print quality determined based on the media type if the adapting of print quality to the media type is selected on the second screen displayed by said second display unit, or print quality determined based on designation by the user if the adapting of print quality to the media type is not selected on the displayed second screen;
    a generation unit configured to generate print data based on the print setting set by said print quality setting unit; and
    an output unit configured to output the print data generated by said generation unit to the printer.

2. A print control apparatus according to claim 1, wherein said print control apparatus is provided with an automatic media type setting mode, and wherein said first discrimination unit discriminates whether there is a mismatch between the two media types if the automatic media type setting mode is not selected.

3. A print control apparatus according to claim 1, wherein said print control apparatus is provided with an automatic print quality setting mode, and wherein said second discrimination unit discriminates whether there is a mismatch between the media type and print quality if the automatic print quality setting mode is not selected.

4. A print control apparatus according to claim 1, wherein said print control apparatus is provided with a table indicating matching between media types and print qualities, and wherein said second discrimination unit discriminates whether there is a mismatch between the media type and print quality based on the table.

5. A print control apparatus according to claim 1, wherein said print control apparatus is provided with an automatic print quality setting mode, wherein said second discrimination unit discriminates whether there is a mismatch between the media type and print quality if the automatic print quality setting mode is not selected and wherein said print quality setting unit sets the print setting using print quality determined based on the media type if the automatic print quality setting mode is selected.

6. A print control apparatus according to claim 1, wherein said print control apparatus is provided with an automatic media type setting mode and an automatic print quality setting mode, wherein said second discrimination unit discriminates whether there is a mismatch between the media type and print quality if the automatic media type setting mode is selected and if the automatic print quality setting mode is not selected and wherein said print quality setting unit sets the print setting using print quality determined based on the media type if the automatic media type setting mode is selected and if the automatic print quality setting mode is selected.

7. A method of a print control apparatus for controlling a printer, comprising:

a first discrimination step of discriminating whether there is a mismatch between a media type sensed at the printer and a media type designated by a user;

a first display of displaying a first screen on which a message is displayed indicating that there is a mismatch between the two media types, and on which the user is allowed to select the sensed media type or the designated media type, if said first discrimination step discriminates that there is a mismatch between the two media types;

a sheet setting step of setting the sensed media type or the designated media type as sheet setting, in accordance with the selection made on the first screen displayed by said first display step;

a second discrimination step of discriminating whether there is a mismatch between the media type set by said sheet setting step and print quality;

a second display step of displaying a second screen on which a message is displayed indicating that there is a mismatch between the media type and print quality, and on which the user is allowed to select or not to select adapting of print quality to the media type, if said second discrimination step discriminates that there is a mismatch between the media type and print quality;

a print quality setting step of setting print setting using print quality determined based on the media type if the adapting of print quality to the media type is selected on the second screen displayed by said second display step, or print quality determined based on designation by the user if the adapting of print quality to the media type is not selected on the displayed second screen;

a generation step of generating print data based on the print setting set by said print quality setting unit; and an output step of outputting the print data generated by said generation step to the printer.

8. A method of a print control apparatus according to claim 7, wherein said print control apparatus is provided with an automatic media type setting mode, and wherein said first discrimination step discriminates whether there is a mismatch between the two media types if the automatic media type setting mode is not selected.

9. A method of a print control apparatus according to claim 7, wherein said print control apparatus is provided with an automatic print quality setting mode, and wherein said second discrimination step discriminates whether there is a mismatch between the media type and print quality if the automatic print quality setting mode is not selected.

10. A method of a print control apparatus according to claim 7, wherein said print control apparatus is provided with a table indicating matching between media types and print qualities, and wherein said second discrimination step discriminates whether there is a mismatch between the media type and print quality based on the table.

11. A method of a print control apparatus according to claim 7, wherein said print control apparatus is provided with an automatic print quality setting mode, wherein said second discrimination step discriminates whether there is a mismatch between the media type and print quality if the automatic print quality setting mode is not selected and wherein said print quality setting step sets the print setting using print quality determined based on the media type if the automatic print quality setting mode is selected.

12. A method of a print control apparatus according to claim 7, wherein said print control apparatus is provided with an automatic media type setting mode and an automatic print quality setting mode, wherein said second discrimination step discriminates whether there is a mismatch between the media type and print quality if the automatic media type setting mode is selected and if the automatic print quality setting mode is not selected and wherein said print quality setting step sets the print setting using print quality determined based on the media type if the automatic media type setting mode is selected and if the automatic print quality setting mode is selected.

13. A computer-readable storage medium storing a computer program executed by a print control apparatus for controlling a printer, the computer program comprising:

a first discrimination step of discriminating whether there is a mismatch between a media type sensed at the printer and a media type designated by a user;

a first display of displaying a first screen on which a message is displayed indicating that there is a mismatch between the two media types, and on which the user is allowed to select the sensed media type or the designated media type, if said first discrimination step discriminates that there is a mismatch between the two media types;

a sheet setting step of setting the sensed media type or the designated media type as sheet setting, in accordance with the selection made on the first screen displayed by said first display step;

a second discrimination step of discriminating whether there is a mismatch between the media type set by said sheet setting step and print quality;

a second display step of displaying a second screen on which a message is displayed indicating that there is a mismatch between the media type and print quality, and on which the user is allowed to select or not to select adapting of print quality to the media type, if said second discrimination step discriminates that there is a mismatch between the media type and print quality;

a print quality setting step of setting print setting using print quality determined based on the media type if the adapting of print quality to the media type is selected on the second screen displayed by said second display step, or print quality determined based on designation by the user if the adapting of print quality to the media type is not selected on the displayed second screen;

a generation step of generating print data based on the print setting set by said print quality setting unit; and an output step of outputting the print data generated by said generation step to the printer.

14. A computer-readable storage medium storing a computer program executed by a print control apparatus for controlling a printer according to claim 13, wherein said print control apparatus is provided with an automatic media type setting mode, and wherein said first discrimination step discriminates whether there is a mismatch between the two media types if the automatic media type setting mode is not selected.

15. A computer-readable storage medium storing a computer program executed by a print control apparatus for controlling a printer according to claim 13, wherein said print control apparatus is provided with an automatic print quality setting mode, and wherein said second discrimination step discriminates whether there is a mismatch between the media type and print quality if the automatic print quality setting mode is not selected.

16. A computer-readable storage medium storing a computer program executed by a print control apparatus for controlling a printer according to claim 13, wherein said print control apparatus is provided with a table indicating matching between media types and print qualities, and wherein said second discrimination step discriminates whether there is a mismatch between the media type and print quality based on the table.

17. A computer-readable storage medium storing a computer program executed by a print control apparatus for controlling a printer according to claim 13, wherein said print control apparatus is provided with an automatic print quality setting mode, wherein said second discrimination step discriminates whether there is a mismatch between the media type and print quality if the automatic print quality setting mode is not selected and wherein said print quality setting step sets the print setting using print quality determined based on the media type if the automatic print quality setting mode is selected.

18. A computer-readable storage medium storing a computer program executed by a print control apparatus for controlling a printer according to claim 13, wherein said print control apparatus is provided with an automatic media type setting mode and an automatic print quality setting mode, wherein said second discrimination step discriminates whether there is a mismatch between the media type and print quality if the automatic media type setting mode is selected and if the automatic print quality setting mode is not selected and wherein said print quality setting step sets the print setting using print quality determined based on the media type if the automatic media type setting mode is selected and if the automatic print quality setting mode is selected.

* * * * *